US012574625B2

(12) United States Patent
Bryll et al.

(10) Patent No.: US 12,574,625 B2
(45) Date of Patent: Mar. 10, 2026

(54) SYSTEM WITH LIGHTING CONTROL INCLUDING GROUPED CHANNELS

(71) Applicant: Mitutoyo Corporation, Kanagawa-ken (JP)

(72) Inventors: Robert Kamil Bryll, Bothell, WA (US); William Todd Watson, Kirkland, WA (US); Elham Eslami, Kirkland, WA (US); Shannon Roy Campbell, Woodinville, WA (US); Yuhua Ding, Bellevue, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 58 days.

(21) Appl. No.: 18/400,840

(22) Filed: Dec. 29, 2023

(65) Prior Publication Data

US 2025/0220290 A1 Jul. 3, 2025

(51) Int. Cl.
*H04N 23/00* (2023.01)
*H04N 23/56* (2023.01)
*H04N 23/62* (2023.01)

(52) U.S. Cl.
CPC ............. *H04N 23/56* (2023.01); *H04N 23/62* (2023.01)

(58) Field of Classification Search
CPC ................................ H04N 23/56; H04N 23/62
See application file for complete search history.

(56) References Cited

U.S. PATENT DOCUMENTS

| 5,982,920 | A | 11/1999 | Tobin, Jr. et al. |
| 6,542,180 | B1 | 4/2003 | Wasserman et al. |
| 6,718,526 | B1 | 4/2004 | Eldredge et al. |
| 6,885,977 | B2 | 4/2005 | Gavra et al. |

(Continued)

FOREIGN PATENT DOCUMENTS

| EP | 2503325 A1 | 9/2012 | |
| EP | 3637058 A1 * | 4/2020 | ........... G06T 19/006 |
| WO | 2019133234 A1 | 7/2019 | |

OTHER PUBLICATIONS

Cerpentier et al., "Controlling the target pattern of projected LED arrays for smart lighting," Opt. Express 31, 37316-37324 (2023).*

(Continued)

*Primary Examiner* — Frank F Huang
(74) *Attorney, Agent, or Firm* — Seed Intellectual Property Law Group LLP

(57) ABSTRACT

A system is provided including a lens, a camera, a lighting configuration, one or more processors, and a memory. The lens is configured to input image light arising from a workpiece, and to transmit the image light along an imaging optical path. The camera is configured to receive image light transmitted along the imaging optical path and to provide images of the workpiece. The lighting configuration comprises lighting channels configured to illuminate the workpiece for producing the image light. In various implementations, representations of groups of lighting channels are provided in a display area. When it is determined that a group of lighting channels has been selected, current lighting settings may be displayed for the selected group of lighting channels. Adjustments to the lighting settings for a group of lighting channels may apply to all of the lighting channels in the group.

20 Claims, 21 Drawing Sheets

(56) References Cited

U.S. PATENT DOCUMENTS

| | | | | |
|---|---|---|---|---|
| 7,003,161 | B2 | 2/2006 | Tessadro | |
| 7,030,351 | B2 | 4/2006 | Wasserman et al. | |
| 7,324,682 | B2 | 1/2008 | Wasserman | |
| 7,359,544 | B2 | 4/2008 | Gao et al. | |
| 7,454,053 | B2 | 11/2008 | Bryll et al. | |
| 7,522,763 | B2 | 4/2009 | Tessadro | |
| 7,567,713 | B2 | 7/2009 | Ding | |
| 7,570,795 | B2 | 8/2009 | Yu et al. | |
| 7,602,962 | B2 | 10/2009 | Miyamoto et al. | |
| 7,627,162 | B2 | 12/2009 | Blanford et al. | |
| 7,676,077 | B2 | 3/2010 | Kulkarni et al. | |
| 7,884,977 | B2* | 2/2011 | Mori | H04N 19/12 358/538 |
| 8,086,044 | B2* | 12/2011 | Feng | H04N 19/176 382/220 |
| 8,111,905 | B2 | 2/2012 | Campbell | |
| 8,111,938 | B2 | 2/2012 | Bryll et al. | |
| 8,135,204 | B1 | 3/2012 | Chen et al. | |
| 8,165,837 | B1 | 4/2012 | Paramasivam et al. | |
| 8,194,307 | B2 | 6/2012 | Arnold et al. | |
| 8,254,661 | B2 | 8/2012 | Auerbach | |
| 8,255,172 | B2 | 8/2012 | Auerbach | |
| 8,315,453 | B2 | 11/2012 | Shlain et al. | |
| 8,437,534 | B2 | 5/2013 | Shibuya et al. | |
| 8,452,076 | B2 | 5/2013 | Nakagaki et al. | |
| 8,553,970 | B2 | 10/2013 | Auerbach | |
| 8,581,162 | B2 | 11/2013 | Campbell | |
| 8,711,220 | B2* | 4/2014 | Tiana | H04N 7/18 348/148 |
| 8,803,727 | B2* | 8/2014 | Muensterer | G01S 17/93 342/63 |
| 8,878,773 | B1* | 11/2014 | Bozarth | G06F 3/042 382/103 |
| 9,013,574 | B2 | 4/2015 | Saylor et al. | |
| 9,143,674 | B2 | 9/2015 | Gladnick | |
| 9,167,215 | B2 | 10/2015 | Delaney et al. | |
| 9,274,597 | B1* | 3/2016 | Karakotsios | G06F 3/0346 |
| 9,304,089 | B2 | 4/2016 | Gladnick | |
| 9,390,559 | B2* | 7/2016 | Feyereisen | B64D 45/00 |
| 9,430,743 | B2 | 8/2016 | Plihal | |
| 9,430,824 | B2 | 8/2016 | Sezginer et al. | |
| 9,557,568 | B1* | 1/2017 | Ouderkirk | G02B 27/144 |
| 9,607,233 | B2 | 3/2017 | Kaizerman et al. | |
| 9,613,255 | B2 | 4/2017 | Amzaleg et al. | |
| 9,613,411 | B2 | 4/2017 | Konuru et al. | |
| 9,639,083 | B2 | 5/2017 | Tseo et al. | |
| 9,646,425 | B2 | 5/2017 | Yu et al. | |
| 9,715,723 | B2 | 7/2017 | Shlain et al. | |
| 9,726,876 | B2 | 8/2017 | Bryll | |
| 9,736,355 | B1 | 8/2017 | Bryll | |
| 9,830,694 | B2 | 11/2017 | Bryll | |
| 9,930,243 | B2 | 3/2018 | Gladnick et al. | |
| 9,961,253 | B2 | 5/2018 | Bryll et al. | |
| 10,001,376 | B1* | 6/2018 | Tiana | G01C 21/005 |
| 10,043,264 | B2 | 8/2018 | Greenberg et al. | |
| 10,101,572 | B2 | 10/2018 | Bryll et al. | |
| 10,178,321 | B2 | 1/2019 | Emtman et al. | |
| 10,217,286 | B1* | 2/2019 | Angel | G06F 3/013 |
| 10,298,840 | B2* | 5/2019 | Guenter | H04N 23/667 |
| 10,341,646 | B2 | 7/2019 | Gladnick et al. | |
| 10,354,140 | B2* | 7/2019 | Guenter | G06F 18/22 |
| 10,436,720 | B2 | 10/2019 | He et al. | |
| 10,466,484 | B1* | 11/2019 | Yoon | H04N 13/332 |
| 10,466,779 | B1* | 11/2019 | Liu | G02B 27/0093 |
| 10,482,590 | B2 | 11/2019 | He et al. | |
| 10,502,963 | B1* | 12/2019 | Noble | B29D 11/0073 |
| 10,504,397 | B2* | 12/2019 | Guenter | G09G 3/006 |
| 10,520,301 | B1 | 12/2019 | Tobiason | |
| 10,748,271 | B2 | 8/2020 | Asbag et al. | |
| 10,880,468 | B1 | 12/2020 | Bryll | |
| 10,920,749 | B2* | 2/2021 | Grunnet | G06T 17/00 |
| 11,150,200 | B1 | 10/2021 | Watson et al. | |
| 11,176,367 | B1* | 11/2021 | Fix | G06T 7/521 |
| 11,187,909 | B2* | 11/2021 | Guenter | G02B 27/0179 |
| 11,430,105 | B2 | 8/2022 | Watson et al. | |
| 11,499,817 | B2 | 11/2022 | Eiles | |
| 11,587,246 | B2 | 2/2023 | Campbell et al. | |
| 11,756,186 | B2 | 9/2023 | Delaney | |
| 2004/0156540 | A1 | 8/2004 | Gao et al. | |
| 2007/0156379 | A1 | 7/2007 | Kulkarni et al. | |
| 2007/0230770 | A1 | 10/2007 | Kulkarni et al. | |
| 2007/0288219 | A1 | 12/2007 | Zafar et al. | |
| 2008/0013314 | A1 | 1/2008 | Ashdown et al. | |
| 2008/0143820 | A1* | 6/2008 | Peterson | G06T 7/97 348/E7.001 |
| 2008/0212942 | A1* | 9/2008 | Gordon | H04N 21/2365 348/E7.071 |
| 2009/0080759 | A1 | 3/2009 | Bhaskar et al. | |
| 2009/0097018 | A1 | 4/2009 | Watanabe | |
| 2009/0196460 | A1* | 8/2009 | Jakobs | G06V 40/19 382/103 |
| 2010/0158343 | A1 | 6/2010 | Bryll | |
| 2011/0103679 | A1 | 5/2011 | Campbell | |
| 2011/0133054 | A1 | 6/2011 | Campbell | |
| 2011/0234750 | A1* | 9/2011 | Lai | G03B 37/04 348/E7.001 |
| 2011/0310244 | A1 | 12/2011 | Schweitzer et al. | |
| 2012/0154571 | A1 | 6/2012 | Bryll | |
| 2012/0243790 | A1 | 9/2012 | Campbell et al. | |
| 2012/0249957 | A1* | 10/2012 | Shibata | A61B 3/0025 351/206 |
| 2012/0250980 | A1* | 10/2012 | Gillard | H04N 19/46 382/173 |
| 2012/0254369 | A1* | 10/2012 | Gillard | H04N 21/4622 709/219 |
| 2012/0257005 | A1* | 10/2012 | Browne | G02B 27/017 348/E7.001 |
| 2013/0050485 | A1* | 2/2013 | Tiana | G06T 7/0002 348/148 |
| 2013/0162807 | A1 | 6/2013 | Bryll et al. | |
| 2013/0182066 | A1* | 7/2013 | Ishimoto | E02F 9/261 348/38 |
| 2013/0279795 | A1 | 10/2013 | Shlain et al. | |
| 2014/0037213 | A1* | 2/2014 | Niederberger | G06T 11/00 382/195 |
| 2014/0049452 | A1* | 2/2014 | Maltz | G02B 27/017 345/8 |
| 2015/0254832 | A1 | 9/2015 | Plihal | |
| 2015/0355103 | A1 | 12/2015 | Ando | |
| 2016/0029883 | A1* | 2/2016 | Cox | G06V 40/19 351/209 |
| 2016/0085300 | A1* | 3/2016 | Robbins | H04N 23/673 345/633 |
| 2016/0189055 | A1 | 6/2016 | Zvitia | |
| 2016/0241892 | A1* | 8/2016 | Cole | G06T 17/20 |
| 2016/0299493 | A1 | 10/2016 | Yu et al. | |
| 2016/0342205 | A1* | 11/2016 | Shigeta | G06V 40/197 |
| 2018/0046859 | A1* | 2/2018 | Jarvenpaa | A61B 3/113 |
| 2018/0130197 | A1 | 5/2018 | Weiss et al. | |
| 2018/0130199 | A1 | 5/2018 | Brauer et al. | |
| 2018/0197714 | A1 | 7/2018 | Plihal et al. | |
| 2018/0204315 | A1 | 7/2018 | Plihal et al. | |
| 2018/0275409 | A1* | 9/2018 | Gao | G02B 27/0172 |
| 2018/0307048 | A1* | 10/2018 | Alexander | G03H 1/26 |
| 2019/0067060 | A1 | 2/2019 | Plihal et al. | |
| 2019/0073566 | A1 | 3/2019 | Brauer | |
| 2019/0086674 | A1* | 3/2019 | Sinay | G06T 19/006 |
| 2019/0104302 | A1 | 4/2019 | Gladnick et al. | |
| 2019/0132567 | A1 | 5/2019 | Li et al. | |
| 2019/0147283 | A1 | 5/2019 | Giering et al. | |
| 2019/0188543 | A1 | 6/2019 | Tamai | |
| 2019/0228519 | A1 | 7/2019 | Guo et al. | |
| 2020/0064278 | A1 | 2/2020 | Safai | |
| 2020/0183174 | A1* | 6/2020 | Noui | G06F 3/013 |
| 2020/0234428 | A1 | 7/2020 | George et al. | |
| 2020/0368616 | A1* | 11/2020 | Delamont | H04N 13/239 |
| 2021/0011284 | A1* | 1/2021 | Andreev | G02B 27/0179 |
| 2021/0041948 | A1* | 2/2021 | Berkner-Cieslicki | G06F 3/011 |
| 2021/0063897 | A1 | 3/2021 | Gladnick et al. | |
| 2021/0078062 | A1 | 3/2021 | Takahashi et al. | |
| 2021/0118091 | A1 | 4/2021 | Betz et al. | |

(56)        References Cited

U.S. PATENT DOCUMENTS

| | | |
|---|---|---|
| 2021/0191228 A1 | 6/2021 | Gladnick |
| 2021/0264147 A1 | 8/2021 | Kadambi et al. |
| 2021/0364447 A1 | 11/2021 | Naruse |
| 2022/0138976 A1* | 5/2022 | Campbell .............. G01B 11/24 |
| | | 348/86 |
| 2022/0197376 A1* | 6/2022 | Boyle ................ G02B 27/0093 |
| 2022/0382064 A1* | 12/2022 | Rohn ..................... G02B 1/002 |
| 2022/0394234 A1* | 12/2022 | Etigson .................. G02B 30/10 |
| 2022/0397956 A1* | 12/2022 | Lundell .............. G02B 27/0093 |
| 2022/0413302 A1* | 12/2022 | Meitav .............. G02B 27/0172 |
| 2022/0413603 A1* | 12/2022 | Held .................. G02B 27/0093 |
| 2023/0144705 A1 | 5/2023 | Martins Loureiro et al. |
| 2023/0304940 A1 | 9/2023 | Isken et al. |
| 2023/0421909 A1 | 12/2023 | Hamner |
| 2024/0305893 A1 | 9/2024 | Naruse et al. |

OTHER PUBLICATIONS

Mermillod-Blondin et al., "High speed varifocal imaging with a tunable acoustic gradient index of refraction lens," Optics Letters 33(18):2146-2148, Sep. 15, 2008, (3 pages).
Mitutoyo Corporation & Micro Encoder Inc., "QVPAK—3D CNC Vision Measuring Machine—User's Guide," Manual No. 99MCB225A, Version 7, Series No. 359, Jan. 2003. (326 pages).
Quazi, et al., "Laser-based Surface Modifications of Aluminum and its Alloys," Critical Reviews in Solid State Materials Sciences, 1-26, Oct. 19, 2015.
Zeiler et al., "Visualizing and Understanding Convolutional Networks," arXiv:1311.2901v3, Nov. 28, 2013. (11 pages).

\* cited by examiner

SYSTEM WITH LIGHTING CONTROL INCLUDING GROUPED CHANNELS

BACKGROUND

Technical Field

This disclosure relates to inspection systems, and more particularly to precision systems for inspecting workpieces (e.g., for metrology, defect detection, etc.)

Description of the Related Art

Inspection systems such as machine vision inspection systems (or "vision systems" for short) may be utilized to obtain images of workpieces for inspection. Such systems may be utilized for various types of applications (e.g., metrology applications for determining precise dimensional measurements of workpieces, defect detection applications, general workpiece inspection applications, etc.) Such systems generally include a computer, a camera and an optical system. In certain configurations, a movement mechanism (e.g., a precision stage, a conveyor, etc.) may be included that moves to allow workpiece traversal and inspection. One exemplary prior art machine vision inspection system is the QUICK VISION® series of PC-based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of workpieces.

Such systems have typically faced various types of challenges for inspecting workpieces (e.g., due to variations in the types or surfaces of the workpieces being inspected, different types of inspection operations to be performed, changing inspection conditions, etc.) A system that can provide improvements with respect to such issues for various types of inspection operations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, a system is provided including a lens, a camera, a lighting configuration, one or more processors, and a memory. The lens (e.g., an objective lens) is configured to input image light arising from a workpiece, wherein the lens is configured to transmit the image light along an imaging optical path and has an optical axis. The camera is configured to receive image light transmitted along the imaging optical path and to provide images of the workpiece. The lighting configuration comprises lighting channels configured to illuminate the workpiece for producing the image light.

The memory is coupled to the one or more processors and stores program instructions that when executed by the one or more processors cause the one or more processors to at least: provide representations of groups of lighting channels in a display area; determine that a group of lighting channels has been selected, wherein the selected group of lighting channels comprises a plurality of lighting channels; and display current lighting settings for the selected group of lighting channels, wherein adjustments to the lighting settings for a group of lighting channels apply to all of the lighting channels in the group.

In accordance with another aspect, a method is provided for operating the system. The method includes: providing representations of groups of lighting channels in a display area; determining that a group of lighting channels has been selected, wherein the selected group of lighting channels comprises a plurality of lighting channels; and displaying current lighting settings for the selected group of lighting channels, wherein adjustments to the lighting settings for a group of lighting channels apply to all of the lighting channels in the group.

In accordance with another aspect, the system is provided including the lens, the camera, the lighting configuration, the one or more processors, and the memory. The memory is coupled to the one or more processors and stores program instructions that when executed by the one or more processors cause the one or more processors to at least: provide an option for selecting a lighting optimization mode that that is at least one of an edge detection lighting optimization mode, a defect detection lighting optimization mode or a points from focus lighting optimization mode; receive a selection of a lighting optimization mode; and perform a lighting optimization process based on the selected lighting optimization mode, wherein the lighting optimization process determines lighting for illuminating the workpiece and the determined lighting comprises settings for the lighting channels of the lighting configuration. In various implementations, the option may be for selecting the lighting optimization mode from a set of lighting optimization modes.

In accordance with another aspect, a method is provided for operating the system for performing a lighting optimization process. The method includes: providing an option for selecting a lighting optimization mode that is at least one of an edge detection lighting optimization mode, a defect detection lighting optimization mode or a points from focus lighting optimization mode; receiving a selection of the lighting optimization mode; and performing a lighting optimization process based on the selected lighting optimization mode, wherein the lighting optimization process determines lighting for illuminating the workpiece and the determined lighting comprises settings for the lighting channels of the lighting configuration.

DETAILED DESCRIPTION

Figure 1:
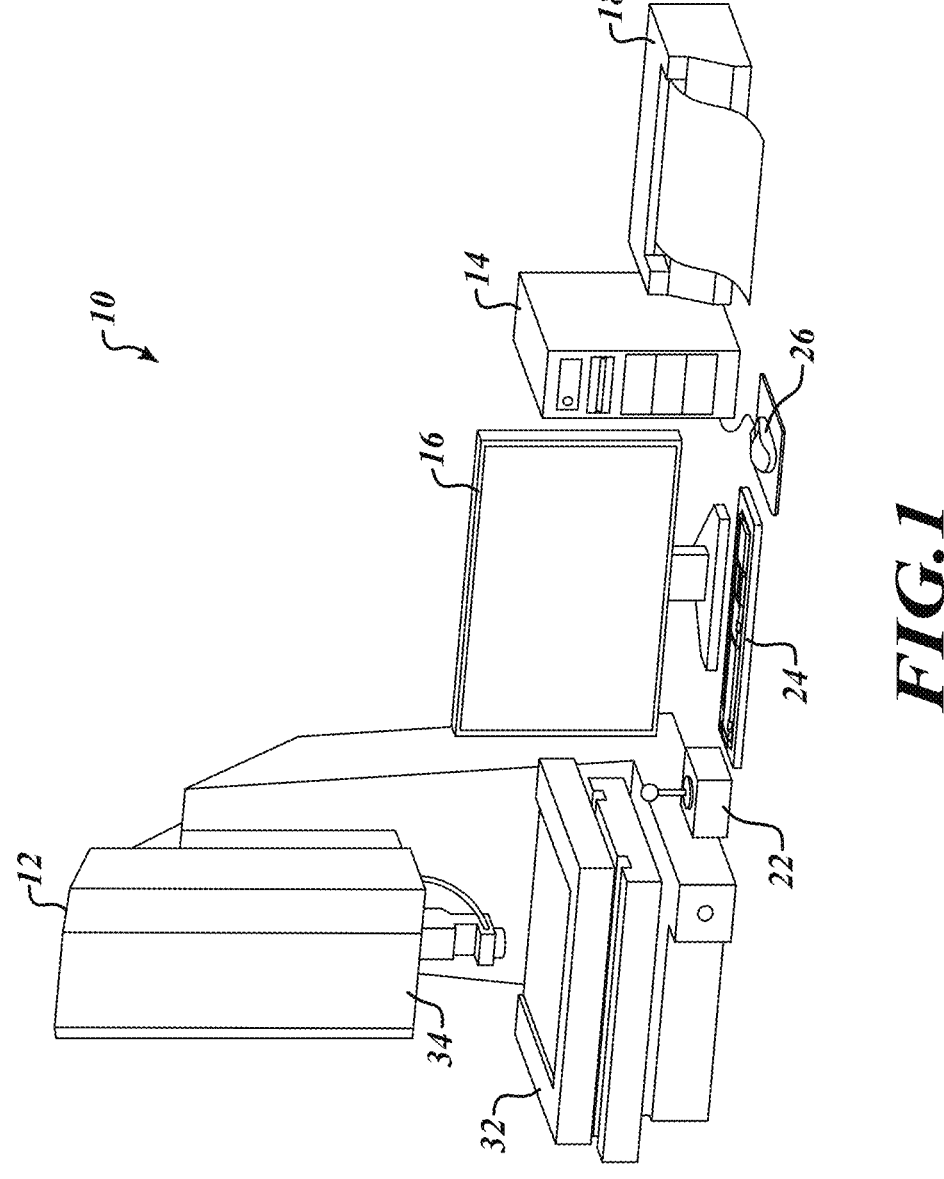
FIG. 1 is a diagram showing various typical components of a general-purpose precision machine vision inspection system.

FIG. 1 is a diagram showing various typical components of a general-purpose precision machine vision inspection system 10. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision inspection system 10 are also described in commonly assigned U.S. Pat. Nos. 7,454, 053; 7,324,682; 8,111,905; and 8,111,938, each of which is hereby incorporated herein by reference in its entirety.

As will be described in more detail below, for various applications (e.g., including in which a variable focal length (VFL) lens, such as a tunable acoustic gradient (TAG) lens, is utilized), it may be desirable to provide illumination from multiple directions, such as in order to better enable the imaging of non-planar workpieces (e.g., workpieces including at least some surfaces that are not orthogonal to an optical axis of the system, such as surfaces that may be angled/sloped and/or parallel, etc. in relation to the optical axis). As will be described in more detail below, a lighting configuration (e.g., including lighting configuration 230, etc.) may include lighting channels which provide such illumination from multiple directions.

Figure 2:
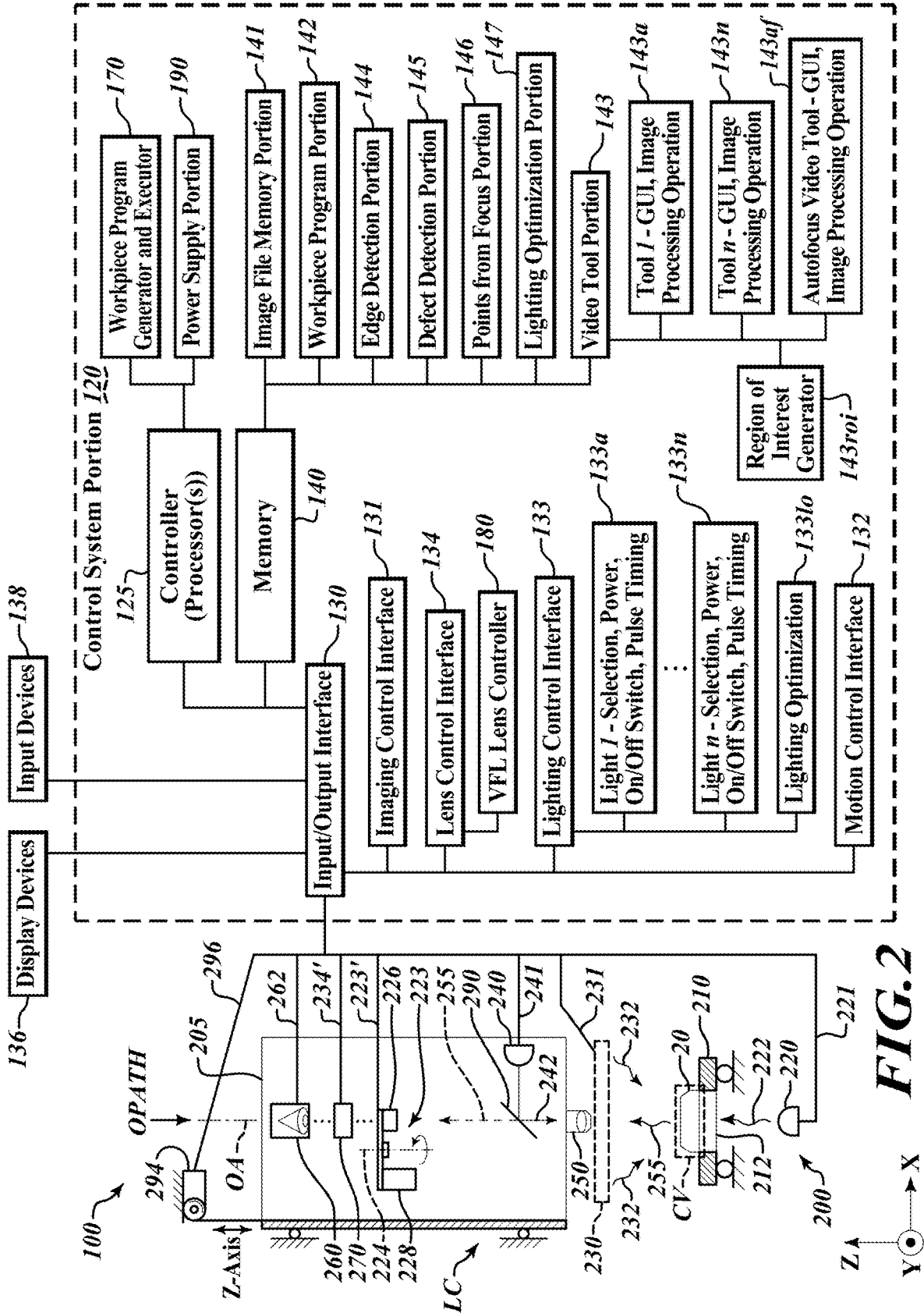
FIG. 2 is a block diagram of a control system portion and a vision components portion of a machine vision inspection system similar to that of FIG. 1.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along X and Y axes that lie in a plane that is generally parallel to the surface of the stage where a workpiece 20 may be positioned.

The optical assembly portion 205 includes a camera system 260 (i.e., including a camera), an interchangeable objective lens 250 and a variable focal length (VFL) lens 270. In various implementations, the VFL lens 270 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. The TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis to change the focus of the image of a workpiece 20. The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180, as described in greater detail below. A workpiece 20 may be placed on the workpiece stage 210. The workpiece stage 210 may be controlled to move relative to the optical assembly portion 205, such that the field of view of the interchangeable objective lens 250 moves between locations on a workpiece 20, and/or among a plurality of workpieces 20, etc.

One or more of a stage light source 220, a lighting configuration 230, and a coaxial light source 240 may emit source light 222, 232, and/or 242, respectively, to illuminate a workpiece 20 or workpieces 20. In various exemplary embodiments, pulsed (e.g., strobed) illumination may be used. For example, during an image exposure, the lighting configuration 230 may emit strobed source light 232 toward a central volume CV in which at least part of the workpiece 20 is located. In another example, during an image exposure, the coaxial light source 240 may emit strobed source light 242 along a path including a beam splitter 290 (e.g., a partial mirror/reflective surface). The source light 232, 242 is reflected as image light 255, and the image light used for imaging passes through the interchangeable objective lens 250, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

In various implementations, the lighting configuration 230 includes a plurality of lighting channels configured to illuminate the workpiece 20 for producing image light 255, wherein each lighting channel is configured to direct light toward a central volume CV (e.g., in which at least part of the workpiece 20 may be positioned). As noted above, the objective lens 250 is configured to input image light 255 arising from the workpiece 20, wherein the objective lens 250 is configured to transmit the image light along an imaging optical path, and has an optical axis OA. In the example of FIG. 2, the objective lens 250 transmits the image light along the imaging optical path that passes through the VFL lens 270 to the camera 260. The camera 260 is configured to receive the image light transmitted along the imaging optical path and to provide images of the workpiece 20. As will be described in more detail below, a focus position that corresponds to the focus of the images is configured to be variable within a focus range along the optical axis. In various implementations, the lighting configuration 230 is controlled through a lighting control interface 133 (e.g., including a light controller portion for controlling the lighting configuration 230, such as light controller portion 133n).

Various light sources (e.g., the light sources 220, 230, 240) may be characterized as comprising lighting channels and may be connected to the lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125 (e.g., comprising or operating as part of one or more processors), the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

The lighting control interface 133 may include lighting control elements 133a-133n that control, for example, the selection, power, on/off switch, and pulse/strobe timing, if applicable, for the various corresponding light sources/lighting channels of the machine vision inspection system 100. In various implementations, an instance of strobed illumination may be regarded as a type of pulsed illumination, as the terms are utilized herein. In some implementations, the lighting control interface 133 may provide pulse/strobe timing signals to one or more of the lighting control elements 133a-133n, such that they provide an image exposure pulse/strobe timing (e.g., which may synchronized with a desired phase time of the VFL lens focus position modulation in accordance with certain stored calibration data).

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143*roi* that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143*af* that determines the GUI, image-processing operation, etc., for focus height (i.e., effective focus position (Z-coordinate/Z-height)) measurement operations. In various implementations, the autofocus video tool 143*af* may additionally include a high-speed focus height tool that may be utilized to measure focus heights with high speed using hardware illustrated in FIG. 3, as described in more detail in U.S. Pat. No. 9,143,674 as incorporated above. In various implementations, the high-speed focus height tool may be a special mode of the autofocus video tool 143*af* that may otherwise operate according to conventional methods for autofocus video tools, or the operations of the autofocus video tool 143*af* may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection/measurement operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

In various implementations, an imaging optical path OPATH (also called a workpiece imaging optical path herein) comprises various optical components arranged along a path that conveys image light 255 from the workpiece 20 to the camera 260. The image light is generally conveyed along the direction of their optical axes OA. In the implementation shown in FIG. 2, all of the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 20 using a camera (e.g., the camera 260) according to known principles. In the illustrated implementation, the imaging optical path OPATH includes the VFL lens 270 (which may be included in a 4f imaging configuration) and is utilized at least in part for imaging the workpiece 20 during a workpiece image exposure. In various implementations, a Z-height (e.g., of a surface point on a workpiece) may correspond to and/or alternatively be referenced as a Z-coordinate, and/or a focus position, for which these terms may be utilized interchangeably in certain instances herein.

In various implementations, the VFL lens controller 180 may control a drive signal of the VFL lens 270 to periodically modulate optical power of the VFL lens 270 over a range of optical powers that occur at respective phase timings within the periodic modulation. Alternatively, the controllable motor 294 may be utilized to move the optical assembly portion 205 along the Z axis to change the effective focus position of the optical assembly portion 205. In either case, the camera 260 (e.g., including an image sensor) receives light transmitted along an imaging optical path OPATH during an image exposure and provides a corresponding camera image. The objective lens 250 inputs image light arising from a workpiece 20 during an image exposure, and transmits the image light along the imaging optical path OPATH through the VFL lens 270 to the camera 260 during the image exposure, to provide a workpiece image in a corresponding camera image. In implementations utilizing the VFL lens 270, an effective focus position in front of the objective lens 250 during an image exposure corresponds to the optical power of the VFL lens 270 during that image exposure. The lighting control interface 133 may be configured to control an image exposure timing used for a camera image.

In various implementations, the lighting configuration LC (e.g., including the lighting configuration 230, the light source/lighting channel 240, etc.) is configured to emit the source light 232/242 (e.g., in some instances with pulsed/strobed illumination) toward a central volume CV including at least part of a workpiece 20. The objective lens 250 receives the image light 255 (e.g., workpiece light) that is focused at an effective focus position proximate to the workpiece 20, and outputs the image light 255 to travel along the optical path OPATH.

In various implementations, the lighting configuration 230 of FIG. 2 includes a plurality of lighting channels configured to illuminate the workpiece 20 for producing the image light 255, wherein each lighting channel is configured to direct light 232 toward the central volume CV (e.g., in which at least part of the workpiece 220 may be positioned). The objective lens 250 is configured to input the image light 255 arising from the workpiece 20, and is configured to transmit the image light 255 along the imaging optical path in OPATH, wherein the objective lens 250 has an optical axis OA. The camera 260 is configured to receive the image light 255 transmitted along the imaging optical path OPATH and to provide images of the workpiece 20, wherein a focus position that corresponds to the focus of the images is configured to be variable within a focus range along the optical axis OA.

In various implementations, the VFL lens controller 180 is configured to control the VFL lens to periodically modu- late the optical power of the VFL lens 270 over a range of optical powers at an operating frequency so as to vary the focus position of the system over a plurality of positions within the focus range. Alternatively, the controllable motor 294 may be utilized to move the optical assembly portion 205 along the Z axis to change the effective focus position of the optical assembly portion 205. In either case, in various implementations, the camera 260 may be utilized to acquire an image stack comprising a plurality of images of the workpiece 20 (e.g., as described in more detail below with respect to FIGS. 14A and 14B), wherein each image of the image stack corresponds to a different focus position along the optical axis OA (e.g., as each corresponding to a different Z-height in the example of FIG. 2). Focus curve data may be determined based at least in part on an analysis of the images of the image stack, wherein the focus curve data indicates three dimensional positions of a plurality of surface points on the workpiece 20 (e.g., as part of a points from focus process as performed by the points from focus portion 146, etc.)

In some implementations, the data or signals from the camera 260 may be utilized to determine when an imaged surface region (e.g., including one or more surface points of a workpiece 20) is at an effective focus position. For example, a group of images acquired by the camera 260 at different effective focus positions (Z-heights), such as part of an image stack, may be analyzed using a known "maximum contrast" or "best focus image" analysis to determine when an imaged surface region of a workpiece 20 is at a corre- sponding effective focus position (Z-height). However, more generally, any other suitable known image focus detection configuration may be used. In any case, in implementations in which the VFL lens 270 is utilized, an image or images acquired during the periodic modulation of the effective focus position (during the sweeping of multiple effective focus positions) of the VFL lens 270, may be utilized to determine an image and/or image timing at which a target feature (e.g., including one or more surface points of a workpiece) is best focused.

In various implementations, the lighting control interface 133 controls an image exposure time of the system 100 (e.g., relative to a phase timing of the periodically modulated effective focus position). More specifically, during an image exposure, the lighting control interface 133 may use effec- tive focus position (Z-height) calibration data and control the lighting configuration LC (e.g., including the lighting configuration 230, etc.) to pulse/strobe at a respective time.

For example, the lighting control interface 133 may control the lighting configuration LC to pulse/strobe at a respective phase timing within a period of a standard imaging resonant frequency of the VFL lens 270, so as to acquire an image having a particular effective focus position within the sweeping (periodic modulation) range of the VFL lens 270. It will be appreciated that the operations of the lighting control interface 133 and other features and elements out- lined above may be implemented to govern workpiece image acquisitions.

As will be described in more detail below, certain lighting control and lighting optimization features and processes may be provided and performed, in accordance with principles as described herein. In various implementations, such features and processes may be implemented in and/or performed by certain portions of the control system portion 120 of FIG. 2. For example, in various implementations the lighting control interface 133 and/or the lighting optimization portions 133*lo* or 147 may be utilized to implement such features. In various implementations, such features and processes may include controlling various lighting channels of the system 100, for which a corresponding lighting configuration LC may be designated as including certain lighting channels of the system that are represented and controlled, such as lighting channels of the lighting configuration 230 and/or the axial lighting channel 240, etc. In addition, an edge detection portion 144, a defect detection portion 145 and a points from focus portion 146 may be utilized to perform various edge detection, defect detection and/or points from focus pro- cesses, operations and/or features, respectively, for which such processes, operations and/or features will also be described in more detail below.

In various implementations, the defect detection portion 145 performs various defect detection operations, as will be described in more detail below. In various implementations, the defect detection portion 145 utilizes models that require training data (e.g., training images). For example, the defect detection portion 145 may be trained using a set of training images captured using specified imaging, lighting and work- piece conditions. In various exemplary implementations, the models may be supervised models. In various implementa- tions, the defect detection portion 145 processes image data corresponding to labeled images of defects (e.g., as labeled by a user and/or automated process) to train a classification model.

In various exemplary implementations, the defect detec- tion portion 145 may implement a defect detection process that is performed along with a metrology process (e.g., such as performed at least in part by the edge detection portion 144 and/or the points from focus portion 146). In various implementations, it may be desirable to include the defect detection portion 145 in a system which is configured to perform a metrology process, in that the system can generate image data that are input to the defect detection process implemented by the defect detection portion 145. Accord- ingly, a single machine is configured to perform both a metrology process and a defect detection process, which can provide advantages over conventional metrology systems. For example, if a defect is detected in a workpiece while the defect detection process is performed, there may be no reason to perform the metrology process on the workpiece, which can save time. More specifically, if a defect is detected in a workpiece while the defect detection process is performed, it may not be necessary to measure a clearly defective part. Thus, it may be advantageous to perform the defect detection process prior to starting the metrology process.

Also, some defects may warrant further metrology or inspection to determine additional defect parameters. For example, a 2D image could enable a likely defect to be quickly recognized, on the basis of which certain metrology operations may be performed (e.g., for determining a precise XY position of the defect and/or an approximate XY size/area of the defect, such as performed at least in part by the edge detection portion 144). If the 3D nature of a potential defect is important, the defect detection portion 145 may cause additional processing (e.g., metrology operations) to be performed to determine whether the potential defect is an actual defect. For example, if a scratch in a surface of a workpiece must be deeper than a particular threshold value to be considered a defect, the defect detection portion 145 could cause a more time consuming 3D point cloud of the affected region to be acquired (e.g., at least in part utilizing the points from focus portion 146), to learn if the depth of the scratch is sufficient to cause the part to be rejected. As will be described in more detail below, in various implementations different lighting optimization may correspond to and be determined for the different types of processes (e.g., such as the processes performed by each of the edge detection portion 144, the defect detection portion 145 and the points from focus portion 146, etc.)

In various implementations, a lighting channel as described herein may be regarded as a lowest independently controllable element of a light source configuration (e.g., an RGB light emitting diode (LED)). A group of lighting channels may be a set of lighting channels, such as either pre-defined, or defined by a user, and which may be controlled as a group so as to share the same settings (e.g., RGB settings). In accordance with various examples herein, a group of lighting channels may correspond to certain shapes, such as a ring, a pie wedge, a non-symmetric shape, etc. Such shapes may be regarded as corresponding to an appearance on a surface of the lighting configuration. A lighting layout may be regarded as a set of groups of lighting channels and/or individual lighting channels. In some implementations, lighting layouts may be regarded as partitioning some or all of the lighting channels of a lighting configuration into an arrangement (e.g., that can be saved or loaded to a controller of a graphical user interface and utilized in a lighting optimization process, etc.). As one simplified example, one particular lighting layout may include a collection of ring-shaped groups of lighting channels, which in combination include all of the lighting channels of the lighting configuration.

In various implementations, various graphical user interface elements and principles are described herein for improving a process of manual, semi-automatic or automatic lighting adjustments in a system with many (e.g., tens) of independently controllable lighting channels. One example of a lighting configuration with such features is a dome light (e.g., such as with fifty lighting channels). In accordance with certain examples as described herein, the lighting channels are displayed in the graphical user interface (e.g., as illustrated in the display area 360 for the light source display of FIGS. 3A and 3C) in a geometric arrangement that corresponds to the physical arrangement of the lighting channels and for which the graphical user interface representation can be manipulated and adjusted (e.g., by a user).

In accordance with principles as described herein, a group of lighting channels may include a plurality of lighting channels, for which each group of lighting channels may be adjusted as a single entity. By enabling the lighting channels to be included in groups, and by adjusting each group of lighting channels as a single entity, certain processes such as manual, semi-automatic or automatic lighting optimization may be made faster and/or easier by reducing the effective number of entities to be adjusted. In some implementations, each lighting channel may be included in a single group, or in some implementations a lighting channel may be able to be assigned to multiple groups. In various implementations, when a group is determined (e.g., as created, selected, etc.), the settings (e.g., the current RGB settings) for the group may be displayed in a display area of the graphical user interface (e.g., such as in the display area 350 of FIGS. 3A and 3C).

In various implementations, groups of lighting channels and/or lighting layouts may be stored and recalled, in some implementations including predefined lighting layouts (e.g., pie segments, rings, etc.) with an ability to quickly adjust parameters (e.g., such as a number of pie segments or rings, etc.). In various implementations, certain controls may be provided, such as rotation of elements, expanding or contracting (e.g., of lighting rings), control of certain lighting directions (e.g., with track ball-like control), or negation of certain portions (e.g., of a current lighting pattern). Such variations and adjustments may be achieved by coordinated changes of settings of the different lighting channels, such as in response to operations performed in a graphical user interface 300 (e.g., as illustrated in FIGS. 3A-3C).

Figure 3A:
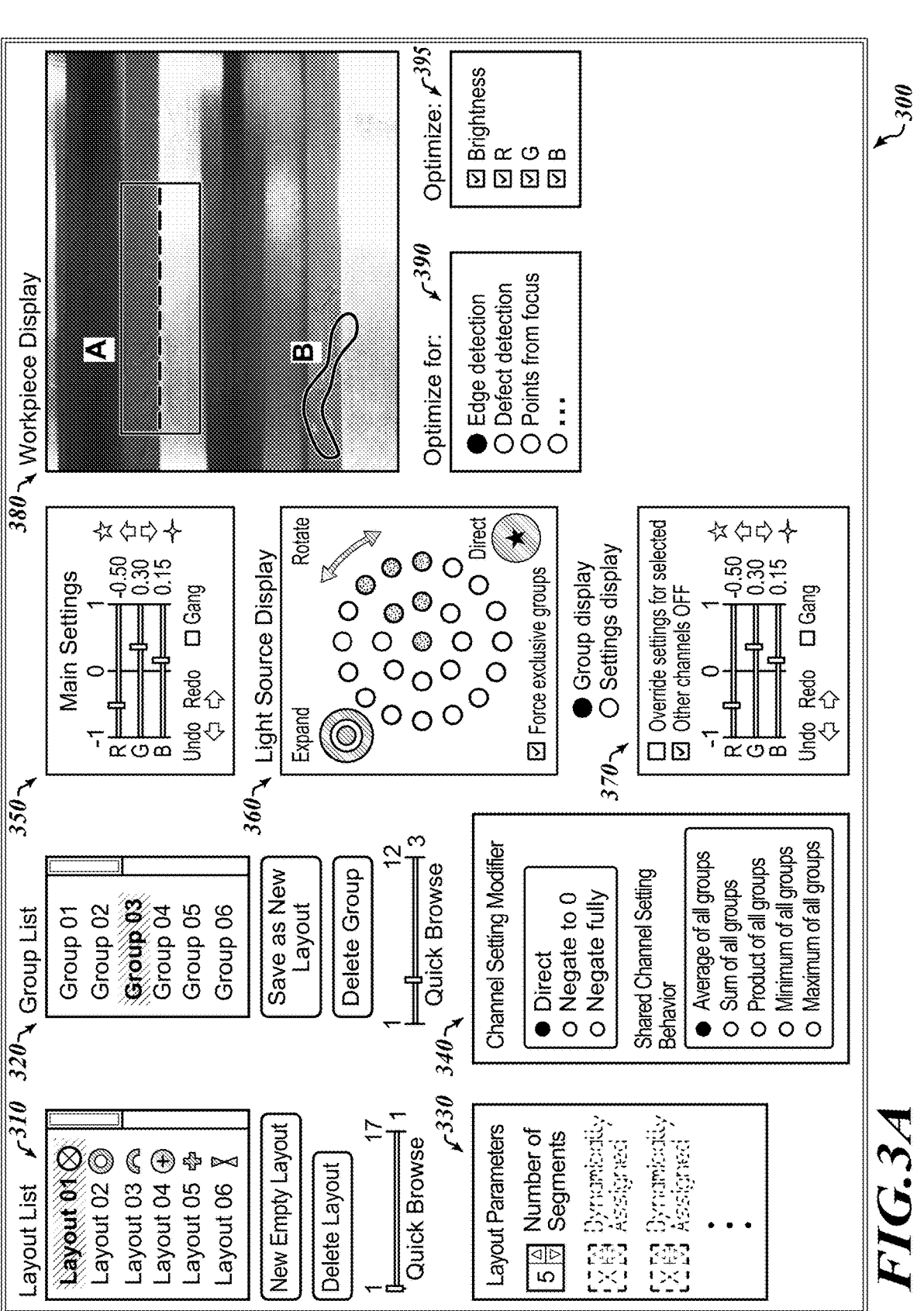
FIG. 3A-3C are diagrams of a graphical user interface for lighting control.
Figure 3B:
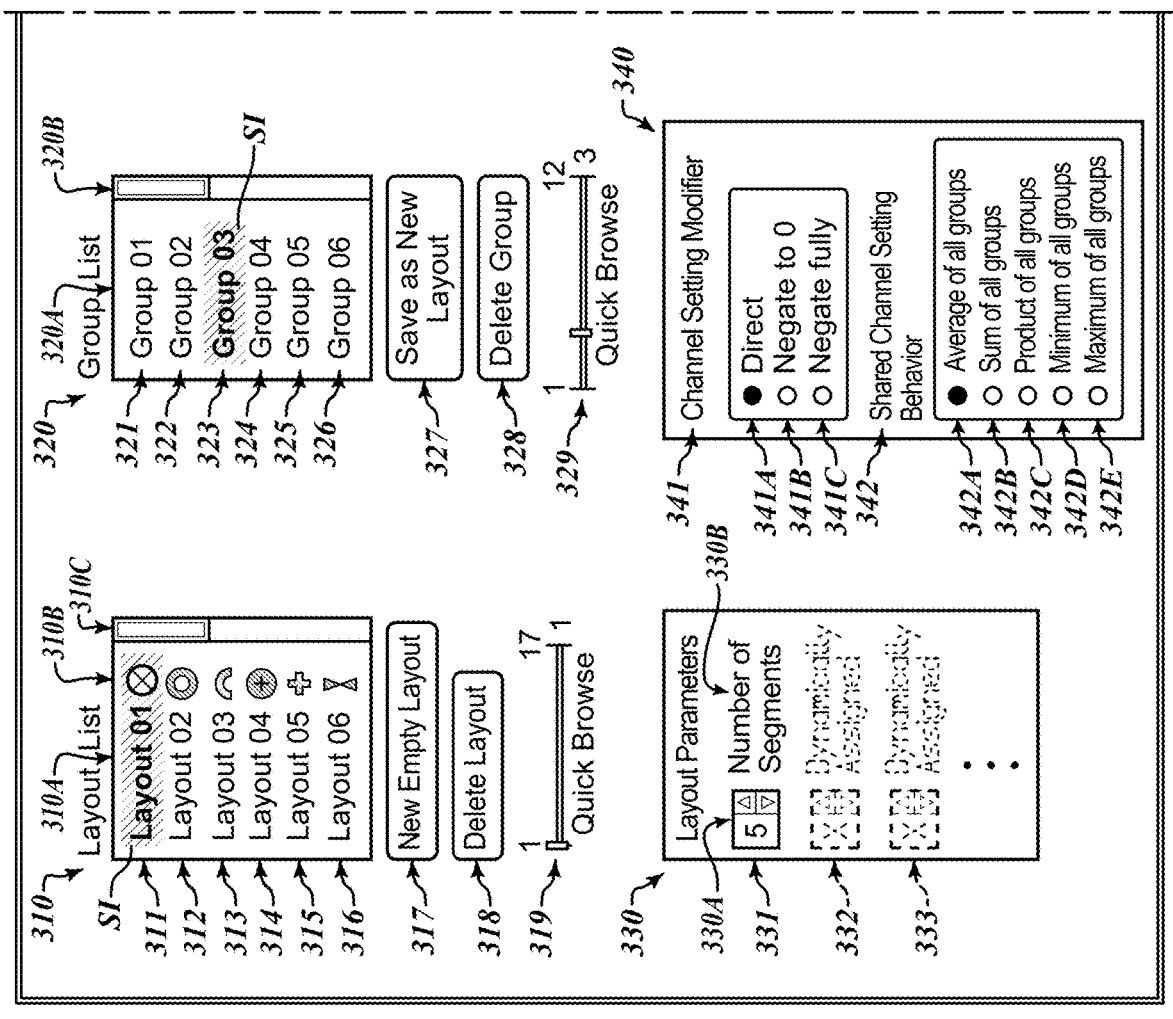
Figure 3C:
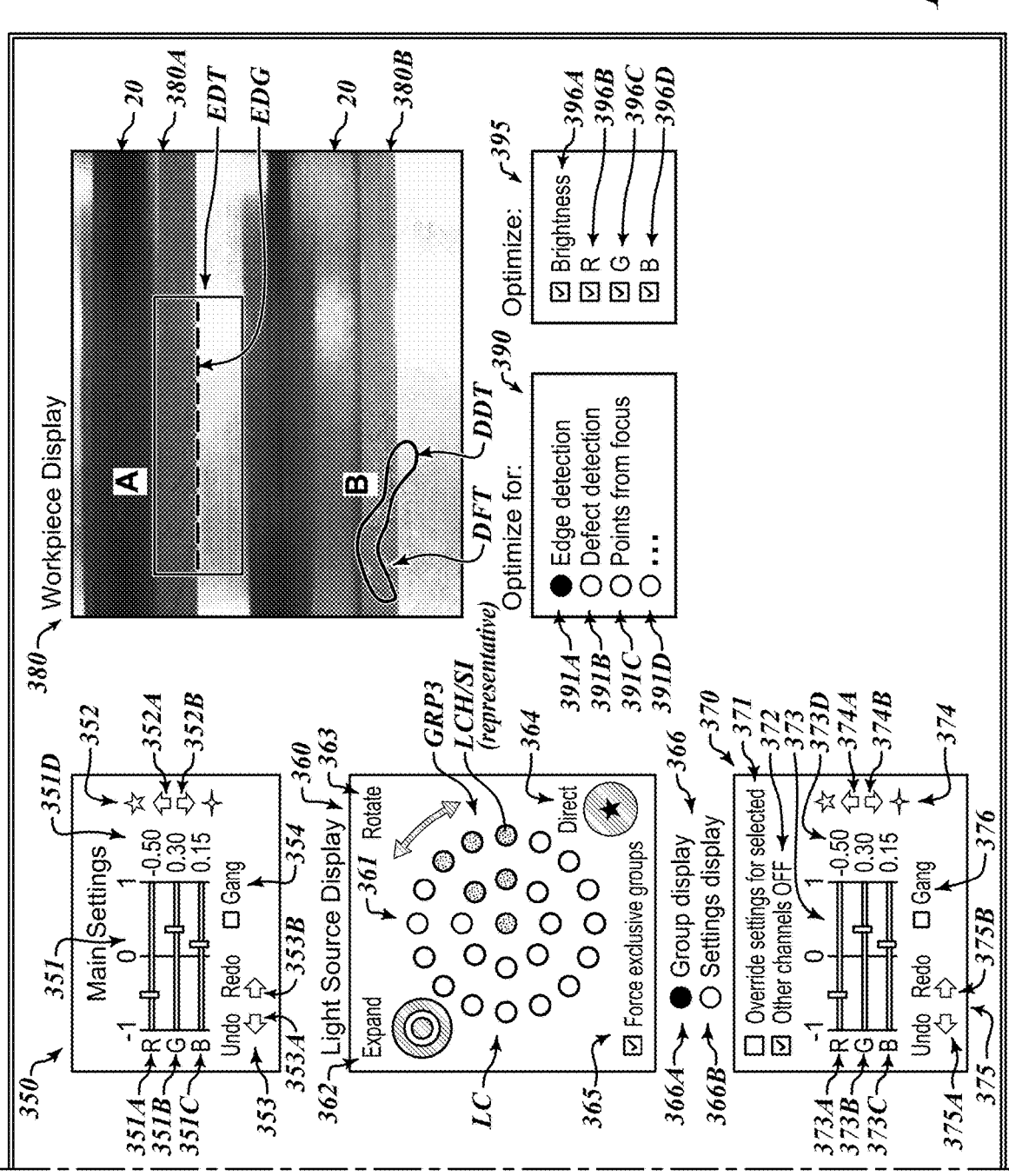

FIG. 3A-3C are diagrams of a graphical user interface 300 for lighting control of the system (e.g., such as may be provided on the display 16 of FIG. 1, and/or the display devices 136 of FIG. 2, etc.). FIG. 3A includes the full graphical user interface 300, while FIGS. 3B and 3C include respective left and right halves, with additional labeling. The graphical user interface 300 includes display areas 310, 320, 330, 340, 350, 360, 370, 380, 390, and 395. The display area 310 includes a "layout list" and includes selection areas 311-316 (i.e., as shown in FIG. 3B), for which each of the selection areas includes a label indicator in a column 310A, and a graphical indicator in a column 310B. As indicated, the selection areas 311-316 currently correspond to layouts 1-6, as indicated by the label indicators in column 310A. In column 310B, a graphical indicator for each of the layouts is provided, which may provide a graphical representation of the layout. A selection area 310C on the righthand side of the display area 310 includes a scroll area, which may be utilized to scroll to additional layouts not currently shown in the display area 310.

As one specific example, in the illustrated implementation, the layout list may include a total of 17 layouts, for which the user may scroll between the layouts 1-17. Also included beneath and proximate to the display area 310 are selection areas 317, 318, and 319. The selection area 317 provides an option for creating a new empty layout. The selection area 318 provides an option for deleting a selected layout. A selection area 319 provides an additional quick browse scrollbar, that may be utilized to scroll through the layouts. In the selection area 319, the quick browse range is indicated to span from a layout 1 to a layout 17, and for which a current scroll indicator is at the start of the range, as corresponding to the layout 1 (i.e., as also indicated by the number "1" to the right of the scrollbar). The position of the scroll indicator is also consistent with the layout 1 having been selected in the selection area 311, as indicated by the selection indicator SI (i.e., for which the selection indicator SI in the selection area 311 corresponds to a highlighting of the selected layout).

The display area 320 includes a "group list", and includes selection areas 321-326 (i.e., as shown in FIG. 3B). A column 320A includes label indicators for a currently displayed set of groups (e.g., of the selected layout 1), and a column 320B includes a scroll area, by which a user may scroll to have different groups displayed in the display area 320. In the illustration of FIG. 3B, the selection areas 321-326 are currently shown as corresponding to groups 1-6. As a specific example, in the illustrated implementation, the group list for the layout 1 may include twelve groups, including groups 1-12. In the illustrated implementation, the group list of the display area 320 indicates a current selection corresponding to the selection area 323, as corresponding to group 3 (i.e., of the layout 1).

Beneath and proximate to the display area 320 are selection areas 327, 328, and 329. The selection area 327 provides an option for saving a current layout as a new layout. The selection area 328 provides an option for deleting a selected group. The selection area 329 provides a quick browse scroll option for scrolling between the different groups. As indicated in the selection area 329, the quick browse range is from group 1 (i.e., indicated on the far left) to the group 12 (i.e., as indicated by the end of the range on the far right). A current position of the scroll indicator (i.e., as moved approximately 25 percent across the available range) is at the group 3 (i.e., as also indicated by the number "3" to the right of the scroll bar). The position of the scroll indicator is also consistent with the group 3 having been selected in the selection area 323, as indicated by the selection indicator SI, which is similar to the selection indicator SI on the display area 310.

The display area 330 includes "layout parameters", and includes selection areas 331-333, and for which additional selection areas may be provided. In a current state, only the selection area 331 has been assigned (e.g., dynamically) and is currently indicated in a column 330B to be for a number of segments (i.e., as a first layout parameter of the currently selected layout 1 as indicated in the display area 310). The selection area 331 in the column 330A indicates that the current number of segments is set to five segments, and includes up and down arrows which may be utilized for increasing or decreasing (e.g., in this case for increasing or decreasing the number of segments).

The display area 340 includes a selection area 341 for a "channel setting modifier" and a selection area 342 for "shared channel setting behavior." The section area 341 includes selection areas 341A-341C, and the selection area 342 includes selection areas 342A-342E. Radio buttons are included for each of the corresponding selection options. In the selection area 341, the selection area 341A is for a "direct" option, the selection area 341B for a "negate to zero" option, and the selection area 341C is for a "negate fully" option. In the selection area 342, the selection area 342A is for a "average of all groups" option, the selection area 342B is for a "sum of all groups" option, the selection area 342C is for a "product of all groups" option, the selection area 342D is for a "minimum of all groups" option, and the selection area 342E is for a "maximum of all groups" option.

The display area 350 is for "main settings" and includes selection areas 351-354. The selection area 351 is for color settings and includes a selection area 351A for a red light setting, a selection area 351B for a green light setting, and a selection area 351C for a blue light setting. As indicated, the color settings may be set between a range of values from −1 to +1. A setting in a range between −1 and 0 indicates a negative setting for the corresponding light color, and a setting between 0 and +1 indicates a positive setting for the corresponding light color. Numerical indicators in a column 351D indicate corresponding values of the settings for the different light colors, such as a value of −0.50 for the red light setting, a value of 0.30 for the green light setting, and a value of 0.15 for the blue light setting, which are also indicated by the positions of the sliders along the ranges between −1 and +1 in the selection areas 351A, 351B, and 351C.

A selection area 352 includes a selection option 352A, corresponding to an upward pointing arrow, for increasing a current brightness setting, and a selection option 352B, corresponding to a downward pointing arrow, for decreasing a current brightness setting. In a selection area 353, a selection option 353A, corresponding to a backward pointing arrow, corresponds to an option for undoing a change, and a selection option 353B, corresponding to a forward pointing arrow, corresponds to an option for redoing a change (e.g., that had been undone by the undo selection option 353A). A selection area 354 provides an option for making a gang selection.

A display area 360 includes a "light source display" and includes selection areas 361-365. Selection area 361 corresponds to a display area, in which representations of the lighting channels LCH of the lighting configuration LC are displayed, and can be selected or unselected. In one implementation, the representation may be of a lighting configuration LC, for which the two rings of lighting channels may correspond to the lighting configuration 230 of FIG. 2, and with the center axial lighting channel corresponding to the light source 240. The selection area 362 corresponds to an "expand" option, the selection area 363 corresponds to a "rotate" option, the selection area 364 corresponds to a "direct" option, and the selection area 365 corresponds to a "force exclusive groups" option. A selection area 366 is beneath and proximate to the display area 360, and includes a selection option 366A for a "group display" and a selection option 366B for a "settings display," wherein a radio button is provided for each selection option.

A display area 370 has certain similarities to the display area 350, and will be understood to operate similarly, except as otherwise described below. The display area 370 includes selection areas 371-376. The selection area 371 includes an "override settings for selected" option. The selection area 372 includes an "other channels off" option. Similar to the selection area 351, the selection area 373 includes a selection option 373A for the red light setting, a selection option 373B for the green light setting, and a selection option 373C for the blue light setting. The color settings may be made between a range of values from −1 to +1. In a column 373D, indicators are provided of the corresponding values of the settings, indicating a value of −0.50 for the red light setting, a value of 0.30 for the green light setting, and a value of 0.15 for the blue light setting. These setting values are also indicated by the positions of the sliders along each of the corresponding ranges (i.e., between −1 and +1) as may be adjusted by a user for adjusting the different color light settings in the selection areas 373A, 373B and 373C.

In the selection area 374, a selection option 374A, corresponding to an upward pointing arrow, is for increasing a brightness setting, and a selection option 374B, corresponding to a downward pointing arrow, is for decreasing a current brightness setting. The selection area 375 includes a selection option 375A, corresponding to a backward pointing arrow, for undoing a change, and a selection option 375B, corresponding to a forward pointing arrow, for redoing a change. The selection area 376 provides an option for a "gang" selection.

The display area 380 includes a "workpiece display" (e.g., as displaying an image of the workpiece 20 as illuminated by the current lighting settings). In the illustrated implementation, the display area 380 includes an upper display area 380A and a lower display area 380B. The upper display area 380A illustrates a workpiece portion as illuminated by the current lighting settings, and for which, in accordance with an example "A", an edge EDG on the workpiece is being detected by an edge detection tool EDT. The location of the edge EDG approximately corresponds to a dotted line edge indicator in the edge detection tool EDT. In the lower display area 380B, in accordance with an example "B", a defect DFT on the workpiece is indicated as being detected by a defect detection tool DDT.

The display area 390 includes selection options 391A-391D. The selection option 391A is for optimizing for edge detection, the selection option 391B is for optimizing for defect detection, the selection area 391C is for optimizing for points from focus, and the selection option 391D, for a yet unspecified process to optimize the lighting for. Such options may be referenced as lighting optimization modes, as will be described in more detail below. For all of the selection options 391A-391D in the display area 390, radio buttons are provided for making the corresponding selections. The display area 395 includes further selection options 396A-396D. The selection option 396A is for selecting to optimize the brightness, the selection option 396B is for selecting to optimize the red light setting, the selection option 396C is for selecting to optimize the green light setting, and the selection option 396D is for selecting to optimize the blue light setting. For all of the selection options 396A-396D in the display area 395, checkboxes are provided for making the corresponding selections. The operations of each of the display areas 310-395 will be described in more detail below.

In various implementations, each layout in the layout list of the display area 310 includes at least one group of lighting channels (e.g., such as can be created, added, and/or configured, etc.), such as by user interaction in the light source display of the display area 360. In various implementations, each layout may have a descriptive icon (e.g., as illustrated in the column 310B) and in various implementations, descriptive names may be added in an additional column or substituted for the generic layout names as shown (e.g., a descriptive name substituted for the generic layout 1, layout 2, etc.) in order to provide a user with an idea of the purpose that the layout serves and/or how the layout looks, etc. As some examples, in various implementations some names that may be utilized for particular layouts and/or groups may include "dark field," "diffuse," "directional," "grazing," "defect detection (scratch\pit)," "concentric rings," "pie segments," etc.

As indicated above, the quick browse sliders in selection areas 319 and 329 allow a user to quickly browse through the layouts and groups (e.g., with the selected group or groups of the selected layout instantly displayed in the display area 360 for the light source display). In the current illustrated example of FIGS. 3A and 3B, in the display area 310, the layout list is indicated as having a total of 17 layouts, of which layout 1 is currently selected (e.g., as indicated in the column 310A) with the selection indicator SI, and as indicated to the right of the quick browse scrollbar in the selection area 319 for which the number 1 is displayed. As also indicated in the example, the layout 1 consists of 12 groups of lighting channels (e.g., as indicated by the number 12 on the far right of the range in the selection area 329) and with group 3 currently selected (e.g., as indicated by the selection indicator SI in the display area 320 and as indicated by the number 3 to the right of the selection area 329). Correspondingly, the group 3 of the layout 1 is displayed in the display area 360 (i.e., in a pie wedge shape) with selection indicators SI provided for each of the lighting channels that are included in the group of lighting channels corresponding to group 3 (i.e., as corresponding to six lighting channels in the illustrated example, including three lighting channels in an outer ring of the lighting configuration, two lighting channels in an inner ring of the lighting configuration and one lighting channel in the center of the lighting configuration, which in combination are in a pie wedge shape).

In one example, the lighting configuration corresponding to the light source display in the display area 360 may correspond to a type of dome light. In another example, (e.g., in relation to the example configuration of FIG. 2), the center lighting channel may correspond to the light source 240 (e.g., for which the arrangement provides coaxial illumination) and the remaining lighting channels may correspond to lighting channels in the lighting configuration 230 (e.g., which in various implementations may be an annular lighting configuration such as a ring light, or a dome light without a center lighting channel, etc.).

In various implementations, the system may be configured such that more than one group of lighting channels may be selected in the group list of the display area 320 (e.g., a user may perform a special action, such as shift-click, or control-click, etc. to select one or more additional groups of lighting channels after a first group has been selected, etc.). Once more than one group has been selected (e.g., a plurality of groups have been selected) the settings for the selected groups may be controlled together. In various implementations, all of the selected groups are indicated (e.g., highlighted or provided with another type of selection indicator) in both the display areas 320 and 360 (i.e., in the group list and in the light source display), and for which any RGB or brightness adjustment will affect all of the selected groups (e.g., as may make an adjusted setting equal for all of the groups that are currently selected). In addition, in various implementations more than one layout (e.g., of the layout list of the display area 310) may be selected at one time (e.g., in accordance with a selection process, such as a user performing a shift-click or a control-click for selecting the multiple layouts). In such an implementation, once a plurality of layouts have been selected, all of the groups from all of the layouts may be displayed in the group list of the display area 320, for which the groups can be browsed through, combined, edited, deleted, and for which the new combination of groups may then be saved as a new layout, if desired. In various implementations, one or more additional constraints that limit what can be done in the graphical user interface (e.g., enforcing mutually exclusive lighting channel groupings, color lighting channel/range limitations, etc.) may also be defined, stored and/or loaded in the parameters for the layouts (e.g., in the layout definitions, etc.).

Figure 4:
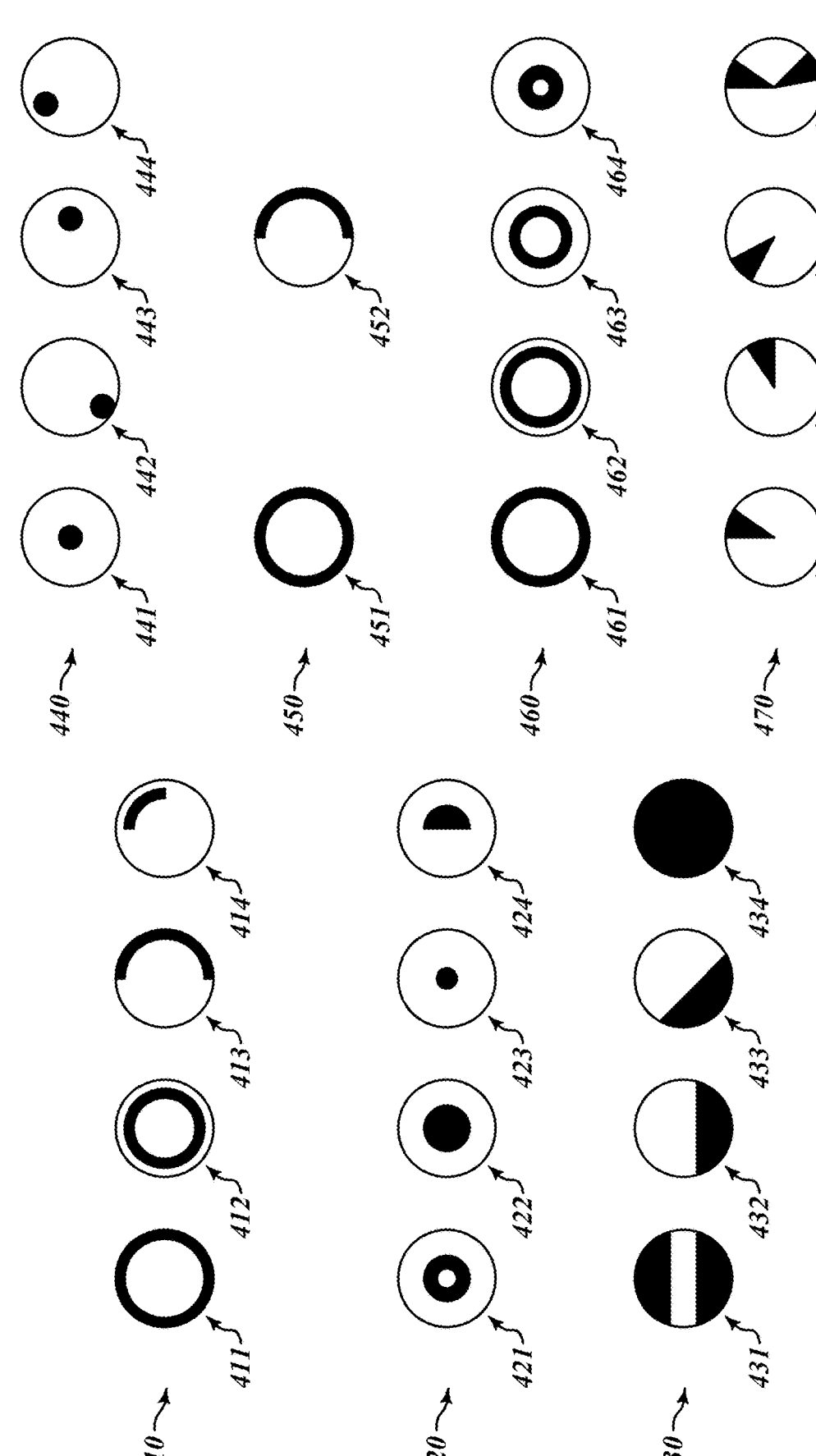
FIG. 4 illustrates examples of different groups of lighting channels.

In various implementations, the layout parameters of the display area 330 may enable modification of layout-specific parameters. In various implementations, the parameters may be configured dynamically based on information loaded with the selected layout (e.g., a number of segments for a pie segment lighting, a number of rings for ring lighting, a number of lighting channels grouped into a "point source" in directional lighting, for which certain examples of such groups of lighting channels are illustrated in FIG. 4). In various implementations, certain non-geometric parameters may also be represented.

In various implementations, current lighting settings for a layout may be saved, and may later be loaded (e.g., recalled from memory, etc.). In various implementations, a user is enabled to define and save/load multiple specific lighting settings for a particular layout. In various implementations, these setting may be stored in different files. For example, the system may be configured such that a user may load one layout and then save/load multiple lighting settings for the same layout. In various implementations, while some lighting settings (e.g., some default lighting settings) may be saved with a layout (e.g., as part of the same file for the layout), it will be appreciated that the ability to store and recall many lighting settings for a same layout provides additional flexibility. In various implementations, the lighting settings may be stored in files that are connected, linked or otherwise associated (e.g. via a naming convention, or as included in a directory named after the layout, etc.) with a layout (e.g., with a layout definition file). As one specific example, for a layout stored in a file named "RingLight", the corresponding lighting settings may be stored in files named "RingLight_scheme001", "RingLight_scheme002", etc. As an alternative to the term "scheme" in such file names and/or as otherwise referencing the lighting settings, terms such as "configuration", "pattern", "settings", "set", etc. may be utilized in such file names and/or otherwise utilized for referencing the lighting settings.

In various implementations, the display area 340 enables certain logical operations on all lighting channels at a same time (e.g., to enable modifying/experimenting with various settings, etc.). In various implementations, a user is also enabled to choose the behavior of all channels that belong to more than a single group of lighting channels (e.g., are shared between two or more groups of lighting channels). In various implementations, the direct setting of the selection area 341A applies to RGB settings selected for each lighting channel directly. In various implementations, the "negate to 0" of the selection area 341B computes 1—setting for each RGB component of a lighting channel and clamps the resulting numbers to [0,1]. The "negate fully" in the selection area 341C multiplies a setting of each RGB component of a lighting channel by –1. The "shared channel setting behavior" of the display area 342 is described below with respect to FIG. 5.

Figure 5:
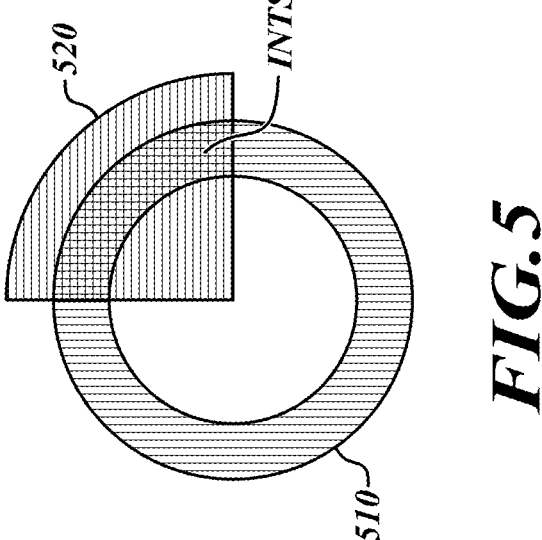
FIG. 5 is a diagram illustrating an example of an intersection between two groups of lighting channels.

Turning briefly to FIG. 5, an example is illustrated in relation to the display area 342 for the shared channel setting behavior, which in certain implementations may be utilized to established how a group of color light (e.g., RGB) settings affects lighting channels shared between the groups (e.g., as belonging to more than one group in implementations where such sharing is enabled). For example, as illustrated in FIG. 5 lighting channels belonging to an intersection INTS of a group of lighting channels 510 (e.g., corresponding to a ring shape) and a group of lighting channels 520 (e.g., corresponding to a pie segment shape), can be set according to one of the selection options 342A-342E. More specifically, the lighting channels corresponding to the intersection INTS (e.g., which correspond to the lighting channels within an overlap area between the groups of lighting channels 510 and 520) can be set according to the selection option 342A (i.e., for the average of the two groups), the selection option 342B (i.e., for the sum of the two groups), the selection option 342C (i.e., for the product of the two groups), the selection option 342D (i.e., for the minimum of the two groups), or the selection option 342E (i.e., for the maximum of the two groups), for the RGB settings of the two groups of lighting channels 510 and 520. The behavior selected for the shared lighting channels is used by the lighting control system (e.g., during an automatic lighting adjustment process, such as during a lighting optimization process, etc.).

Returning to FIGS. 3A and 3C, the "main settings" of the display area 350 correspond to the RGB lighting controls that display and allow adjustment of the group of lighting channels (e.g., or in some instances a single lighting channel) selected in the light source display of the display area 360. In various implementations, a selection of a single lighting channel in the light source display of the display area 360 may result in automatic selection of the entire group of lighting channels that the single lighting channel belongs to, if any. In various implementations, negative settings (e.g., for the RGB lighting controls) are enabled and may be displayed (e.g., in the workpiece display of the display area 380). For example, such display may include acquiring two images, one with any positive lighting channel weights, and the other with absolute values of any negative lighting channel weights, and then subtracting the image illuminated with the negative lighting channel weights from the image illuminated with the positive lighting channel weights and then displaying the resulting difference image utilizing a designated representation for any negative color weight areas in the image.

In various implementations, the undo and redo of the selection options 353A and 353B enable a user to change back and forth between any recent RGB setting changes. In various implementations, the gang selection option of the selection area 354 sets all three of the RGB sliders of the selection options 351 to a same setting (e.g., an average setting of the three sliders) and may allow the three sliders to be adjusted together. In various implementations, the up and down arrows of the selection options 352A and 352B enable a brightness adjustment while preserving the color (RGB) balance (e.g., of the selected lighting channel or group of lighting channels). In various implementations, a user selection (e.g., pressing) of one of the arrows multiplies the RGB components by a same coefficient and for which in various implementations the results may be clamped to [0, 1]. In various implementations, such controls may generally only be implemented or otherwise available when all of the RGB settings are positive. In various implementations, brightness adjustments utilizing the arrows may be blocked or otherwise indicated as not available when certain limits are reached, such as not allowing any further adjustments downward once any of the RGB values reaches 0, or not allowing any further adjustments upwards, once one of the RGB values reaches 1.

In various implementations, the selection options in the display area 370 may function essentially the same as the selection options in the display area 350, except as otherwise described below. In various implementations, the selection option 371 in the display area 370 may enable applying a pre-set "override" setting to groups of lighting channels while making certain types of adjustments. For example, a "maximum brightness" setting may be selected, such as by utilizing the up arrow of the selection option 374A, after which a scroll operation may be conducted, such as utilizing the quick browse slider of the selection area 329 through the different groups of lighting channels (e.g., ring groups, or pie segment groups, etc.) to see the effect of the selected setting (e.g., a maximum brightness setting) on the workpiece for the different groups of lighting channels with the selected setting. In various implementations, each group of lighting channels returns to its "normal" (e.g., main) setting when it is not selected (e.g., when the quick scroll operations move to a next group in the group list of the display area 320). In various implementations, the "other channels off" checkbox option in the selection area 372, if selected, switches off all not currently selected groups of lighting channels when the "override settings for selected" checkbox of the selection area 371 has been selected and is in effect.

In various implementations, the "light source display" of the display area 360 provides a visual representation of all of the lighting channels in a configuration resembling the actual hardware of the lighting configuration LC. In various implementations, the light source display may display the current settings when the radio button of the "settings display" of the selection area 366B is selected, and may show lighting channel groupings when the radio button for the "group display" is selected of the selection area 366A. In various implementations, when the settings display is selected in the selection area 366B, the true selected RGB color of a selected lighting channel may be displayed. In various implementations, lighting channels with at least one negative RGB weight may be denoted with an indicator (e.g., a special color, such as black, a boundary, a dynamic pattern such as a blinking color, etc.).

In various implementations, the "group display" of the selection area 366A, when selected, may highlight the currently selected group or groups of lighting channels (e.g., such as for group 3 as indicated by the selection indicator SI in the group list of the display area 320). This setting may allow a selection of lighting channels, creation and/or deletions of groups (e.g., by making a selection, such as a right click, after selecting lighting channels and selecting an action from a menu). In various implementations, selection and/or deselection of multiple lighting channels may be performed by various operations (e.g., utilizing a control-click, a lasso, bounding box, moving a selector utilizing a mouse over channels such as corresponding to path-based selection, etc.). In various implementations, lighting channels unassigned to any group in a currently selected layout may be marked with a special color or a pattern to indicate the corresponding status (e.g., for making them distinct, etc.).

In various implementations, the "expand," "rotate," "direct" controls of the selection areas 362, 363 and 364, may be adaptive controls (e.g., that may be enabled/disabled depending on a currently selected/loaded layout), and will act on the one or more selected groups of lighting channel. In various implementations, the "expand" option of the selection area 362 may be utilized for groups of lighting channels forming concentric rings, or other similar geometric formations, for which making a selection (e.g., dragging a mouse cursor) over this control may activate smaller and/or larger rings, (e.g., in an implementation where the lighting configuration comprises a full or partial dome light, these functions will effectively move a ring of light between the center and the outer edge of the dome light). In various implementations, the "rotate" option of the selection area 363 may be utilized for configurations such as groups of lighting channels forming pie segments, or similar geometric arrangements, for which a selection of this control (e.g., dragging a mouse cursor over the control) will "rotate" the segment around the lighting configuration, effectively changing the 2D (in-plane) direction of the lighting.

The "direct" control of the selection area 364 in various implementations may be utilized for groups of lighting channels that form a directional light source (e.g., such as indicated by the examples 442, 443, 444, etc. of FIG. 4). In various implementations, utilization of the direct control 364 (e.g., by dragging the cursor of a mouse over this control) may act like rotating a track ball and may change the 3D direction of the illumination (e.g., the focused illumination beam) of the group of lighting channels. In various implementations, alternatively or in addition to the direct control

364 (i.e., for determining a direction of the lighting of a group of lighting channels) an external input device (e.g., an input device 138 of FIG. 2) such as a physical track ball and/or joystick, etc. may be utilized to provide similar functionality for certain controls (e.g., for the rotate and direct controls of the selection areas 363 and 364, etc.). In various implementations, the "force exclusive groups" checkbox of the selection area 365 prevents a lighting channel from being assigned to multiple groups of lighting channels (e.g., such that no lighting channel may be shared between multiple groups of lighting channels in a layout). Such a setting may be desirable for certain implementations.

In various implementations, a factory-defined hardware configuration and/or a light source driver may be provided and loaded by the controller for the graphical user interface in order to establish the graphical user interface controls and parameters (e.g., such as the geometric layout of the light source display of the display area 360, the ranges of the sliders, and types of possible adjustments, such as for the RGB settings, and/or the brightness, with regard to an ability to utilize negative RGB settings, etc.). Alternatively or in addition, in some implementations a type of calibration routine may be utilized for determining lighting configuration options. For example, in one implementation, a type of calibration sphere, or other calibration object, may be placed in the field of view (e.g., under the camera 260 and as illuminated by the lighting configuration) and for which each available control of the lighting configuration may be adjusted, with an image captured for each modification, which may be analyzed and utilized to determine what options/lighting channels the lighting configuration has available (e.g., for use in determining available lighting channel groupings/optimizations, etc.).

In regard to the workpiece display of the display area 380, in various implementations a live or synthetic camera view of the workpiece 20 may be displayed. In various implementations, a synthetic view may be provided when negative RGB weights are utilized, for which two images may be collected and subtracted, and for which representations are provided with respect to any negative RGB results, as described herein. In the illustrated example, in the upper display area 380A, an Example A is provided corresponding to an edge selector region of interest of an edge detection tool EDT. This illustrates an example where it may be desirable to determine lighting optimization for robust edge detection. In the lower display area 380B, as part of an Example B, a defect region selector region of interest is illustrated (e.g., as part of a defect detection tool DDT, for detecting a defect DFT). This illustrates an example where it may be desirable to determine lighting optimization for defect detection.

In various implementations, such an edge detection tool EDT, or a defect detection tool DDT, may be displayed contextually depending on a selection made in the display area 390, such as depending on whether a selection is made for optimizing the lighting for one of: edge detection (e.g., of the selection area 391A), defect detection (e.g., of the selection area 391B), or points from focus (e.g., of the selection area 391C). In general, it may be characterized that the "optimized for" options of the display area 390 are for selecting what type of lighting optimization mode the automatic lighting optimization process will be performed for (e.g., in relation to establishing which adjustment algorithm, performance metrics, etc. may be utilized as associated with optimizing the lighting for a particular mode).

In various implementations, the "optimized" options in the display area 395 may be utilized to select which parameters (i.e., apart from the locations of the lighting channels, etc.) may be adjusted for the optimization or otherwise optimized. A selection of the checkbox for brightness (i.e., in the selection area 396A) automatically selects all three of R, G and B (i.e., for the red, green and blue lighting). When the checkbox for brightness in the selection area 396A is deselected, then any of the R, G and/or B options in the selection areas 396B, 396C and 396D, respectively, may be selected individually or in combination. It will be appreciated that the provided examples of parameters that may be configured is not intended to be exhaustive, and that other parameters that may be configurable may be provided with selection options in corresponding selection areas of the graphical user interface.

FIG. 4 illustrates examples of different groups of lighting channels (e.g., that may be represented in accordance with certain shapes). It will be appreciated that the shapes of FIG. 4 are for illustration purposes only, and that depending on the density of the lighting channels in a given lighting configuration, the illustrated shapes may be regarded as corresponding to a group of individual discrete lighting channels as occurring within the general area of the shape. The groups of lighting channels in FIG. 4 are arranged in sets, including sets 410, 420, 430, 440, 450, 460, and 470.

The set 410 includes a group of lighting channels 411, a group of lighting channels 412, a group of lighting channels 413, and a group of lighting channels 414. The set 410 may be characterized as corresponding to "dark field" groups of lighting channels (e.g., which in some implementation may be characterized as being at an angle from 45 degrees to 90 degrees from an optical axis of the lens/camera, and may in some instances be non-symmetric). The set 420 includes a group of lighting channels 421, a group of lighting channels 422, a group of lighting channels 423, and a group of lighting channels 424. The set 420 may be characterized as corresponding to "bright field" groups of lighting channels (e.g., which in some implementations may be characterized as being at an angle of 0 degrees to 45 degrees from an optical axis, and may in some instances be non-symmetric).

The set 430 includes a group of lighting channels 431, a group of lighting channels 432, a group of lighting channels 433, and a group of lighting channels 434. The set 430 may be characterized as corresponding to "diffused" groups of lighting channels (e.g. as may correspond to larger groups of lighting channels, which may be symmetric or non-symmetric). The set 440 includes a group of lighting channels 441, a group of lighting channels 442, a group of lighting channels 443, and a group of lighting channels 444. The set 440 may be characterized as groups of lighting channels that are "directional" (e.g., as may in some implementations be examples of a typically non-symmetric layout, as may include a small and focused group of lighting channels).

The set 450 includes a group of lighting channels 451 and a group of lighting channels 452. The set 450 may be characterized as corresponding to "grazing" groups of lighting channels (e.g., which in some implementations may be characterized as corresponding to a dark field at an angle close to 90 degrees from an optical axis of the lens/camera, and in some instances may be non-symmetric/directional). The set 460 includes a group of lighting channels 461, a group of lighting channels 462, a group of lighting channels 463, and a group of lighting channels 464. The set 460 may be characterized as being "concentric rings" types of groups of lighting channels (e.g., as may be characterized in some implementations as essentially including both "dark field" and "bright field" examples).

The set 470 includes a group of lighting channels 471, a group of lighting channels 472, a group of lighting channels 473, and a group of lighting channels 474. The set 470 may in some implementations be characterized as "pie segments" groups of lighting channels (e.g., with each group of lighting channels forming a shape or shapes corresponding to one or more pie segments). It will be appreciated that certain defect detection processes (e.g., for identifying scratches, pits, etc. in a surface of a workpiece), may in some implementations utilize a "dark field," "grazing," and/or "concentric rings" type of group of lighting channels (e.g., for which certain examples are illustrated in the sets 410, 450, and 460).

Figure 6:
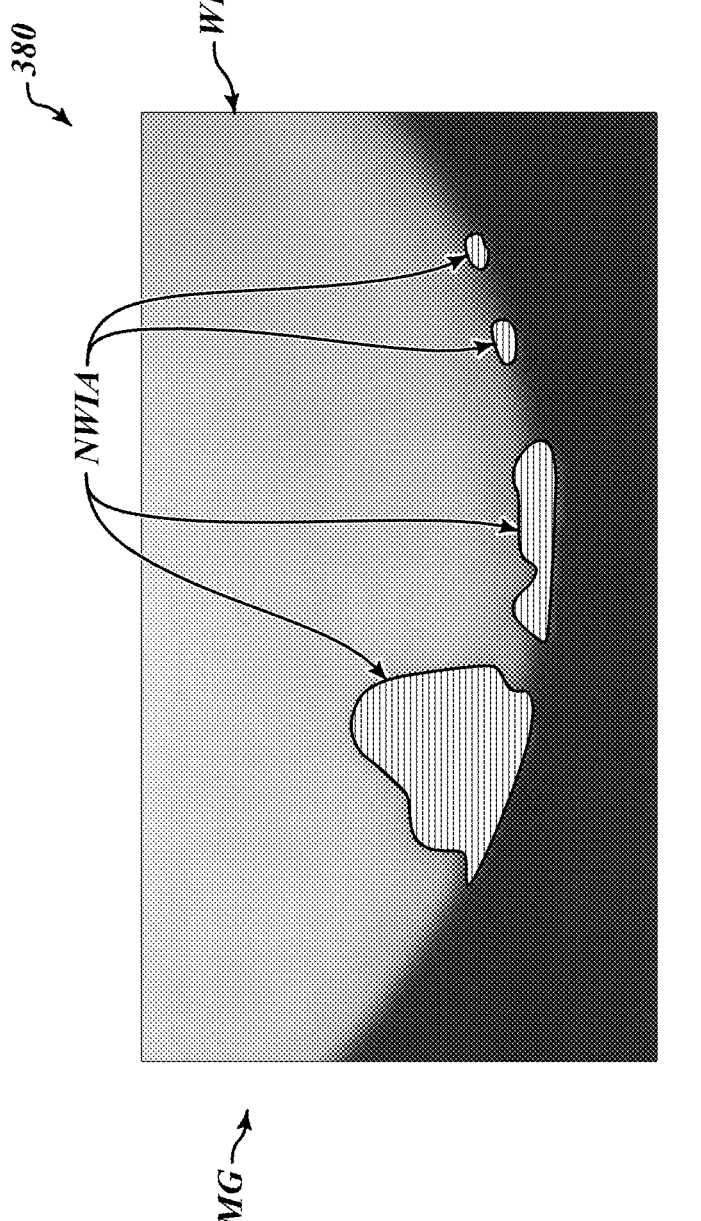
FIG. 6 illustrates an implementation of a technique for representing negative color weights in an image of a workpiece.

FIG. 6 illustrates an implementation of a technique for representing negative color weights (e.g., in an image IMG in the workpiece display 380 of FIGS. 3A and 3C for displaying a workpiece WP as illuminated by the current lighting settings). As described above with respect to the display areas 350 and 370, certain color light settings may have a negative weight. In the examples illustrated in the display areas 350 and 370 of FIGS. 3A and 3C, the red light setting is indicated to have a negative weight as corresponding to the −0.50 value. Since the actual negative values of color light settings cannot be displayed in an image, one technique is to instead display a negative weight indicator area, for indicating the areas on the workpiece with a negative color weight. In the example of FIG. 6, four negative weight indicator areas NWIA are displayed, as each corresponding to an area in which at least one component of the displayed color is negative.

As noted above, in various implementations, negative color lighting settings (e.g., for red, green and/or blue lighting settings) may be enabled. In various implementations, image feedback in the graphical user interface 300 may be provided when negative color lighting channel values are present in a specific image area (e.g., as illustrated in FIG. 6). In various implementations, such representations may be determined by acquiring two images, including an image illuminated with "negative" lighting channel weights, which is subtracted from an image illuminated with the positive lighting channel weights. In various implementations, a resulting difference image may be displayed including representations of negative values in the image. For example, an appropriate color, pattern, graphical effect, etc. may be utilized as part of a mapping convention for representing a negative color lighting channel value in a displayed image (e.g., as illustrated by the negative weight indicator areas NWIA in FIG. 6).

In various implementations, various techniques may be utilized for displaying negative color lighting channel weights. In certain implementations, false color techniques may be utilized, including mapping a range of negative and positive values to color ranges that may or may not have a basis in actual representations. Such may utilize a concept of a color map (e.g., a lookup table) that maps input values to specific colors. In one implementation, the mapping may include computing grey scale values for all RGB triplets in a standard way, including utilizing absolute values, and then negating the grey scale values if at least one of the RGB components is negative and which may utilize a possible range of −1 to +1 (e.g., as scaled to −255 to +255) of the grey scale values to index the color map. In various implementations, distinct textures (e.g., stripes, checker boards, etc.) that may be static or dynamic (e.g., moving, flashing, shimmering, or utilizing some other form of spatio-temporal modulation) may be utilized to emphasize the special negative values in a displayed image. In various implementations, certain distinct colors (e.g., including primary and/or saturated, such as red, green, blue or a distinct strong combination of RGB depending on which channels are negative) may be utilized and which may be static or dynamic (e.g., blinking at value-dependent frequencies or at a constant frequency, etc.).

In general, it will be appreciated that any method that will highlight the existence of negative RGB values in the image may be utilized. In certain implementations, it may be desirable to maximize the contrast of the areas where the negative RGB values appear (e.g., utilizing a color not otherwise present in the image, or utilizing grey scale if the image is otherwise colorful, or utilizing color if the image is otherwise in grey scale, etc.). With respect to the example of FIG. 6, if the rest of the image IMG is in grey scale, the negative weight indicator areas NWIA may be provided in color (e.g., a bright color that may be easily distinguishable from the grey scale, such as a bright blue, etc.). As another example, if the rest of the image IMG is in color, the negative weight indicator areas NWIA may be provided in grey scale or other format (e.g., such as may generally contrast with the rest of the image IMG). In various implementations, a negative weight indicator area NWIA may indicate that at least one of the red, green or blue colors has a negative value.

Figure 7:
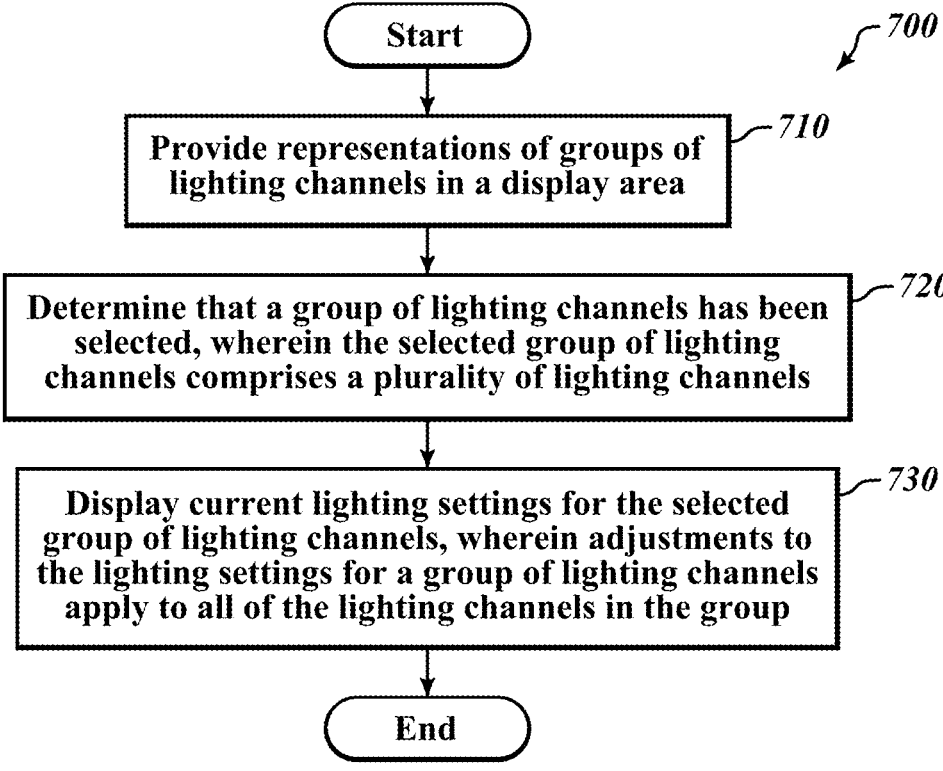
FIG. 7 is a flow diagram illustrating a routine for operating a system with groups of lighting channels.

FIG. 7 is a flow diagram of a routine 700 for operating a system with groups of lighting channels. At a block 710, representations are provided of groups of lighting channels in a display area. At a block 720, a determination is made that a group of lighting channels has been selected, wherein the selected group of lighting channels comprises a plurality of lighting channels. At a block 730, current lighting settings are displayed for the selected group of lighting channels, wherein adjustments to the lighting settings for a group of lighting channels apply to all of the lighting channels in the group.

Figure 8:
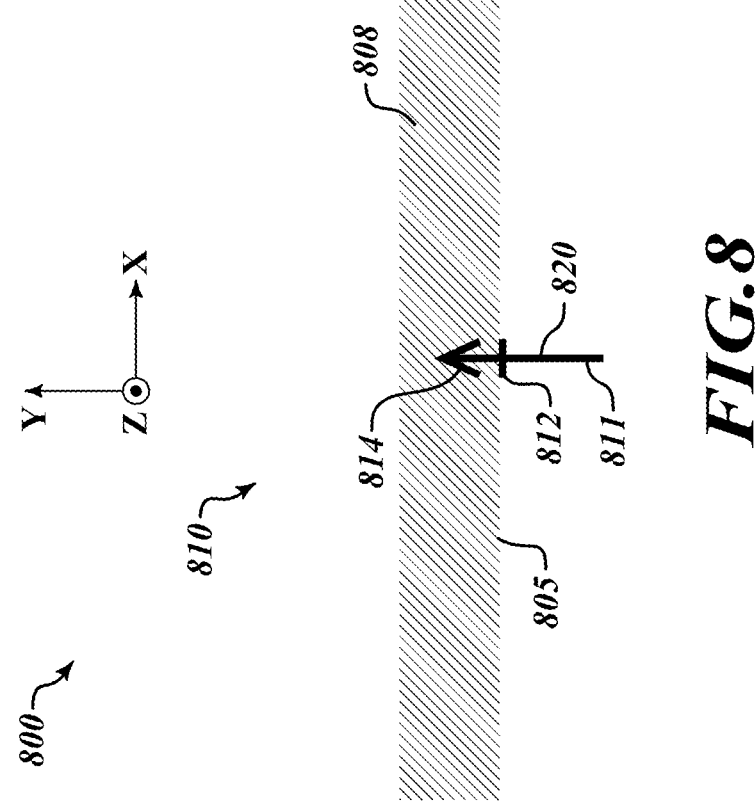
FIG. 8 is a diagram of an exemplary point tool overlaying a first edge of a portion of a workpiece in an image.
Figure 9:
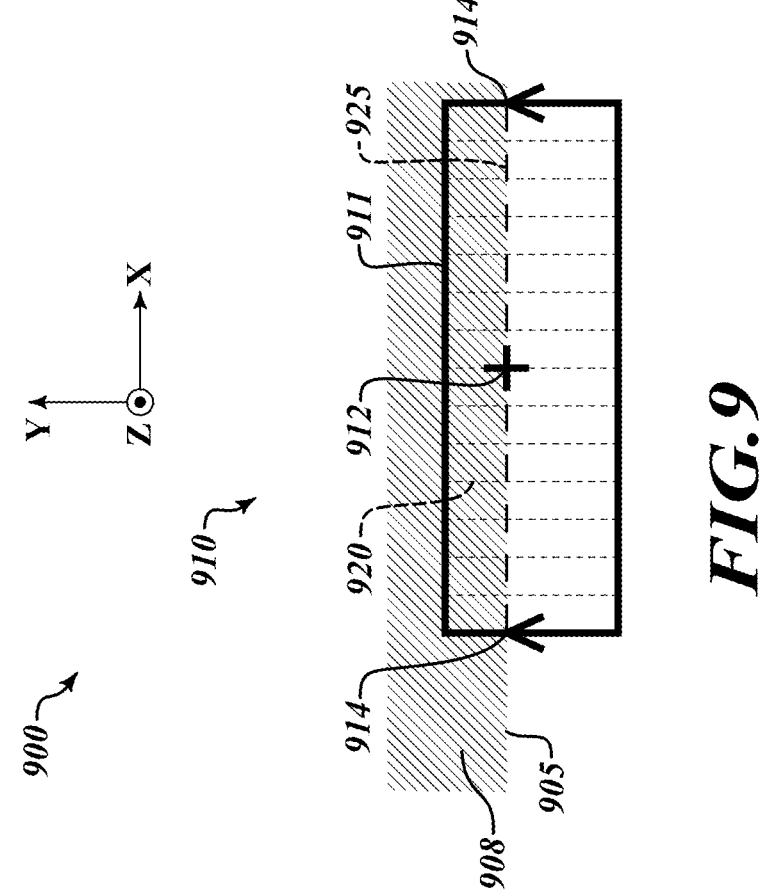
FIG. 9 is a diagram of an exemplary box tool overlaying a first edge of a portion of a workpiece in an image.
Figure 10:
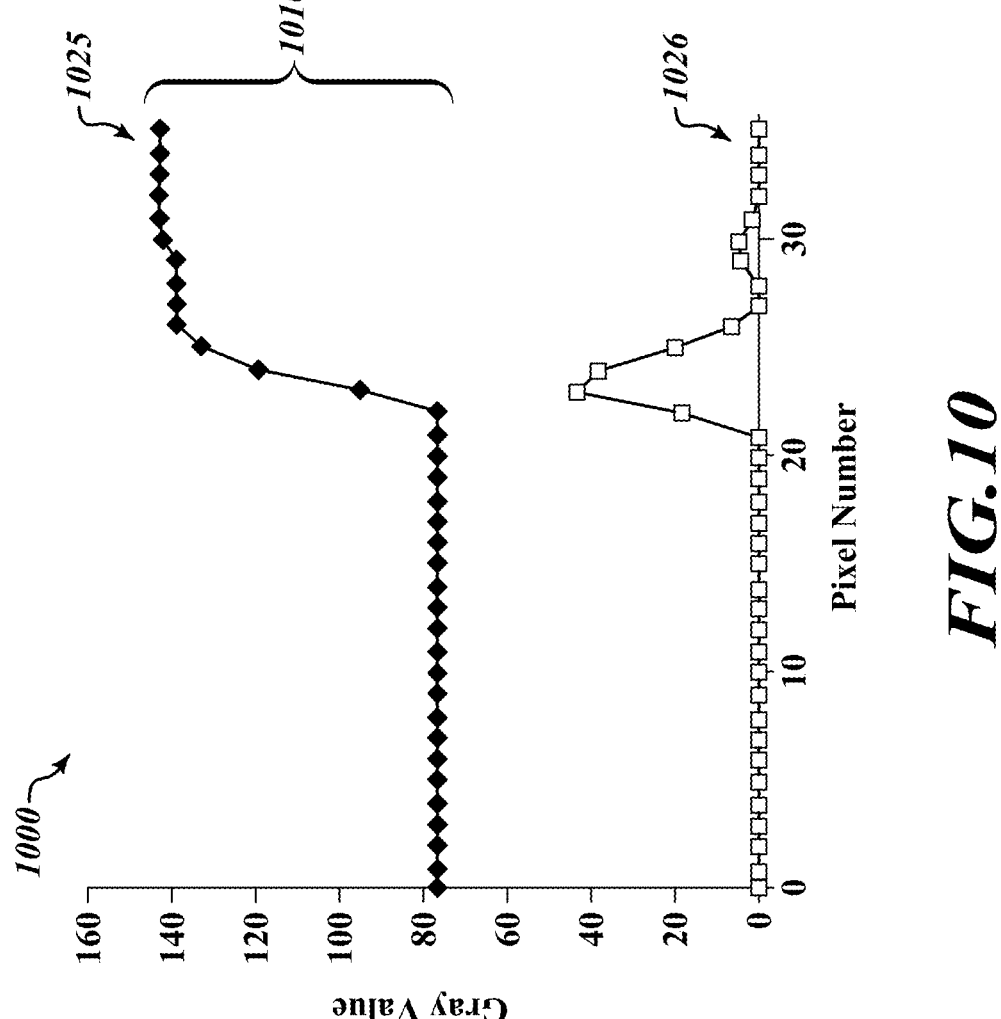
FIG. 10 is a diagram illustrating one exemplary method of determining a first edge location based on a set of pixel values.

In various implementations, scan lines and/or one or more edge tools are utilized (e.g., by the edge detection portion 144) to determine locations of edges on a workpiece. FIGS. 8-10 below will be described in terms of example operations of edge tools (e.g., point and box edge tools), which in certain embodiments may be, or may be analogous to, "video tools" which may utilize scan lines to determine edge locations. For example, in various implementations tool 143a and/or tool 143n, etc. of the video tool portion 143 of FIG. 2 may be, or may include utilization of features of, edge tools, etc. (e.g., as may in various implementations be utilized by, or in combination with, the edge detection portion 144). It will be appreciated that in various implementations, similar operations (e.g., including utilization of scan lines or similar techniques) may be performed to determine edge locations, which may be performed automatically, in some cases without otherwise displaying and/or utilizing other features of the "video tool" or other tool type features illustrated and described below with respect to the simplified examples of FIGS. 8-10. Various analogous video tools are described in U.S. Pat. Nos. 7,003,161; 7,030,351; 7,522,763; 7,567,713; and 7,627,162, each of which is hereby incorporated herein by reference.

FIG. 8 is a diagram of an exemplary point tool 810 overlaying a first edge 805 of a portion of a workpiece 20 at the boundary of a darker or shaded area 808 in an image 800 such as acquired by the camera 260. In FIG. 8, as well as figures described below, shaded areas such as the shaded area 808 are shown for purposes of illustration, to indicate pixels with relatively higher "gray values" (e.g., or other color values) in an image. In various implementations, higher gray values (e.g., or other color values) may correspond to relatively lower intensity pixels, or relatively higher intensity pixels, depending on the configuration.

As will be described in more detail below, the point tool 810 may be configured for determining the location of an edge point on an edge in the image, and similar operations may underlie the operation of another type of tool (e.g. a box-type edge tool) that locates multiple edge points on an edge, as will be described in more detail below in reference to FIG. 9. In certain implementations, the point tool 810 may include a body 811, an edge selector 812, and a polarity indicator arrowhead 814. The arrowhead 814 may generally point from light-to-dark, or dark-to-light, across an edge to enhance edge-finding reliability in certain situations, as explained in the incorporated references. In the illustration of FIG. 8, the body 811 obscures a nominal scan line 820 defined by, and nominally coinciding with, the body 811. Scan lines (820 and 920) will also be illustrated and described in more detail below with reference to FIG. 9.

In various implementations, certain of the operations described below (e.g., utilizing the scan lines for determining an edge location) may be performed automatically by the machine vision inspection system 100 (e.g., without displaying the corresponding video tool features on a display). In operation, the machine vision inspection system 100 may be configured to automatically select and utilize a point tool and/or corresponding operations (e.g., utilizing scan line(s)) or a user may select the point tool 810 or corresponding operations. The system or user may identify an edge feature to be detected by placing the body 811 over the edge feature and placing the edge selector 812 as close as possible to the edge, at a desired location along the edge. The point tool body 811 may be oriented to define and indicate a desired scan line orientation across the edge (e.g., which for simplicity in the illustrated example is parallel to the x-axis of the illustrated x-y coordinate system but may alternatively be at an angle relative to the x and y axes within the x-y coordinate system in certain implementations). In FIG. 8, and other figures herein, image pixels are arranged in rows along the x-coordinate direction and columns along the y-coordinate direction. The arrow 814 points along a reference direction or polarity to be associated with the edge detection. In operation, once the point tool 810 is configured (and/or once corresponding operations are automatically determined and/or performed), the instructions of an underlying edge point locating routine may be executed to perform operations that analyze intensity profile data points (e.g., pixel intensity data) associated with a scan line that nominally coincides with the body 811 of the point tool 810, and perform various operations to detect the edge location of the underlying feature. As will be described in more detail below with respect to FIG. 10, in various exemplary embodiments, the edge point locating routine of the point tool 810 may determine an edge location based on the magnitude of the gradient along an intensity profile associated with the scan line.

FIG. 9 is a diagram of an exemplary box tool 910 overlaying a first edge 905 of a portion of a workpiece 20 at the boundary of a shaded area 908 in an image 900. In various implementations, the edge detection tool EDT of FIG. 3C may be a box tool such as that of FIG. 9 and/or may operate similarly to such a box tool. In various implementations, the box tool 910 may include a region of interest (ROI) indicator 911, polarity indicator arrows 914 along the side, and an edge selector 912 that is positioned on the desired edge to be detected. Within the box tool 910, nominal scan lines 920 may be indicated, which the box tool 910 generates and uses for determining edge points. Along each of the nominal scan lines 920, the box tool operates to determine an edge point of the underlying feature, as previously described for the scan line 820 of the point tool 810 of FIG. 8. As shown in FIG. 9, and as will be described in more detail below, a line 925 may be fit to the set of determined edge points, to determine the location and orientation of the edge 905.

In operation, the box tool 910 is selected and/or otherwise configured to identify an edge feature to be detected. The ROI indicator 911 may be positioned, sized and rotated (e.g., automatically or by an operator), such that the ROI includes the portion of the edge feature to be detected, and the edge selector 912 may be positioned to more precisely identify the edge to be detected at a desired location along the edge. The ROI indicator 911 may be oriented to define and indicate a desired scan line orientation across the edge. More generally, the orientation of the overall ROI indicator 911, the portions of the ROI indictor that include the arrows 914, or the orientations of the nominal scan lines 920 and/or corresponding operations may each be used to define and/or indicate the scan line orientation. The arrows 914 define the polarity to be associated with the edge detection. Once the box tool 910 is configured, the instructions of an underlying edge point locating routine may be executed to perform operations that analyze intensity profile data to detect edge points along each of the scan lines and fit a line to the detected edge points, as described in greater detail below.

To summarize, in general, edge points may be determined by various tools and/or corresponding operations, which in various implementations may fit geometric forms to the edge points in order to determine locations of corresponding underlying image features (e.g., as part of a process for determining the precise locations of edges of features on workpieces, etc.). In one conventional method of operating a tool, depending on the type of tool (e.g. point tool and box tool), one or more nominal scan lines are defined or generated (e.g., within a ROI or otherwise, such as according to defined tool parameters). For each nominal scan line, a set of intensity profile data point locations are determined that approximate the nominal scan line. Intensity values associated with the data point locations are determined, to define the intensity profile associated with the nominal scan line. Then, in one embodiment, an edge detection algorithm analyzes gradients along the intensity profile to find the location along the intensity profile that corresponds to the maximum gradient magnitude, as described in more detail below with reference to FIG. 10. The maximum gradient location along the intensity profile is used to determine the edge point location in the image that is associated with the nominal scan line.

FIG. 10 is a diagram of a graph 1000 illustrating one exemplary method of determining an edge location based on an intensity profile 1010. The intensity profile 1010 comprises a set of image pixel intensity (e.g., gray or other color) values 1025 corresponding to positions of a scan line (e.g. such as one of the scan lines 820 or 920 shown in FIG. 8 or 9, respectively). The data points or positions representing the scan line are labeled as "Pixel Numbers" from 0-35 along the horizontal axis. Beginning from data point 0, the pixel intensity values initially indicate a relatively lighter region up to approximately data point 23, which is then followed by a relatively darker region up to data point 35.

It will be appreciated that the values and illustrations in FIGS. 8, 9 and 10 have been simplified in various respects with regard to the current examples. For example, in FIGS. 8 and 9 the determined edge location is illustrated as being between a relatively lighter region (e.g., near white) and a darker region, while in certain actual embodiments the "lighter region" may have a higher gray or other color value. In addition, while the edges in FIGS. 8 and 9 are shown as being relatively "sharp" (i.e., with a relatively rapid transition between the lighter and darker regions), in certain actual embodiments the transition for the edges may occur over a number of pixels (e.g., as illustrated by the transition for the example gray values or other color values from the pixel 23 to the pixel 27 of FIG. 10).

Gradient magnitude values 1026 are derived from the pixel intensity values 1025 and are also shown in FIG. 10. Various conventional algorithms may be used to find the location along the horizontal axis that corresponds to a peak of the gradient magnitude (deemed to indicate the peak "contrast" between the pixel intensity values), and identify that location as an edge location. If there are multiple gradient magnitude peaks, then the video tool edge selector and/or orientation indicator (e.g. edge selector 812 and/or polarity indicator 814 of the point tool 810) may be used to assist the algorithm to identify the desired peak. In FIG. 10, the maximum gradient criterion (i.e., the gradient peak) indicates that the edge is located approximately at data point 23. By using methods that may include curve fitting, centroid determination, or the like, a gradient magnitude peak may be located relatively precisely between the intensity profile data points, which generally supports sub-pixel measurement resolution and repeatability when determining the location of the corresponding edge in the image. For example, while the gradient peak in the example of FIG. 10 is shown to be approximately at data point 23 (e.g., corresponding to pixel 23 in this example), it can be seen that another "near peak" occurs at data point 24 (pixel 24). This may indicate that a more precise determination of the edge location may correspond to a position between data points 23 and 24 (pixels 23 and 24), which may be determined by a process such as curve fitting, centroid determination, or the like. As a simplified concept, in an example where the data points 23 and 24 have a same gradient magnitude, such may correspond to an edge location exactly ½ way between the two (e.g., with an edge location corresponding to a data point/pixel location of 23.5).

The examples of FIGS. 8-10 are illustrated and described in relation to preferred lighting provided by a lighting configuration LC (e.g., with lighting as determined by a lighting optimization process as described herein). It will be appreciated that if less desirable/less optimal lighting were provided, such may result in significantly smaller and/or less well defined transition of the data points as corresponding to the edge. For example, the pixel values on different sides of the edge transition (e.g., for the pixels 0-23 as compared to the pixels 24-35) may have much smaller differences, and the gradient peak may be much lower, such as may result in a less accurate detection/determination of the position of the edge. Correspondingly, it may be desirable for lighting optimization that is performed in relation to edge detection, to ideally result in a region on at least one side of each edge having a maximized contrast relative to a region on the other side of the edge, and without having a significant percentage of the pixels near the edges intensity saturated. It is noted that such characteristics/goals of the lighting optimization for edge detection may be different than the characteristics/goals for lighting optimization for certain other types of processes (e.g., for defect detection and/or points from focus processes, etc.).

Figure 11:
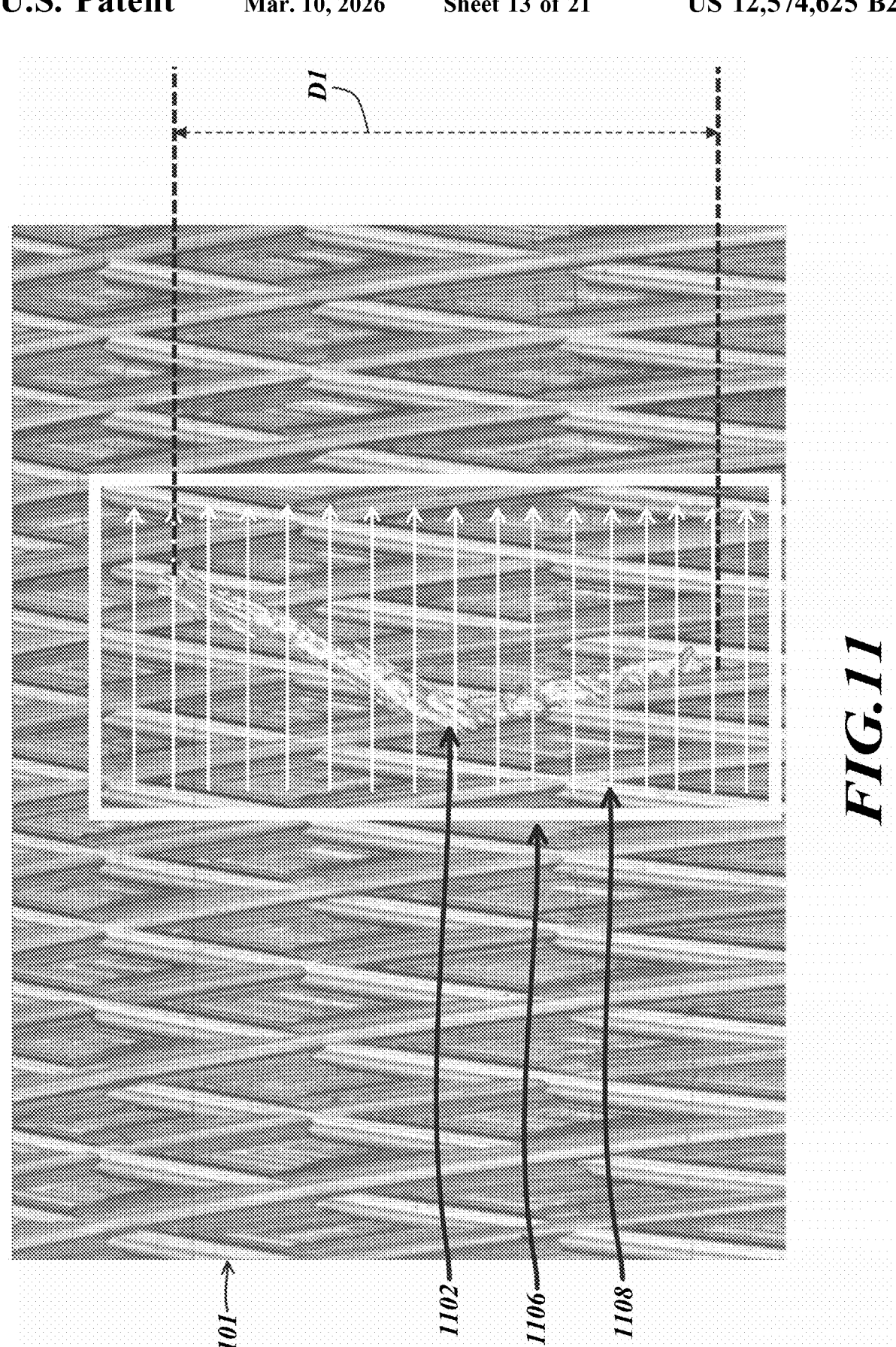
FIG. 11 is a diagram illustrating utilization of one or more video tools for performing metrology operations on a workpiece feature in an image of a workpiece.

FIG. 11 is a diagram illustrating utilization of one or more video tools for performing metrology operations on an image of a workpiece that includes a workpiece feature (e.g., for determining dimensions of the workpiece feature, etc.) In one example, the workpiece feature 1102 may correspond to a scratch defect, or other type of workpiece feature. As illustrated, for an image 1101 that includes a workpiece feature 1102, a video box tool 1106 includes scan lines 1108 (e.g., which may also or alternatively be representative of video point tools, etc.) which are utilized for determining the edge locations, dimensions, and/or other aspects of the workpiece feature 1102. In various exemplary implementations, the video box tool 1106 may be sized, positioned and rotated, until the box tool 1106 is indicative of, or defines, the region of interest (e.g., the area within the box tool 1106), and the arrows shown in FIG. 11 (e.g., representative of scan lines, point tools, etc.) may be utilized to determine the edge(s) of the workpiece feature 1102. In various exemplary embodiments, the video box tool 1106 may generally use one or more conventional edge gradient(s) along the edge(s) of the workpiece feature 1102 in the region of interest, and the edge(s) of the workpiece feature 1102 may be determined based on the local magnitudes of the edge gradient(s) along the various scan lines 1108, etc.

In various exemplary implementations, such metrology operations may also include performing certain morphological filtering or other filtering (e.g., to distinguish the edges of the workpiece feature/scratch from the machined pattern of the workpiece, for which certain types of such filtering are described in U.S. Pat. No. 7,522,763, which is hereby incorporated herein by reference in its entirety). As shown in FIG. 11, in the display area included in the image, the box tool 1106 with the scan lines 1108 is utilized to determine the edge locations (e.g., the outer edges or perimeter) of the workpiece feature 1102. Based on such determinations, the video tool and/or other metrology operations may include determining a dimension D1 of the workpiece feature (e.g., corresponding to a length or other dimension of the workpiece feature 1102). In various exemplary implementations, the box tool 1106, scan lines 1108 and/or other video tools and/or metrology operations may be utilized to determine other dimensions of the workpiece feature 1102 (e.g., width, depth, etc.) For example, as described herein, the points from focus portion 146 may perform operations for determining three dimensional surface profile data from which the Z-height dimensions of the workpiece feature (e.g., including determining the depth of the workpiece feature/scratch relative to other portions or features of the workpiece surface, etc.) may be determined.

As noted above, the workpiece feature 1102 may in some implementations correspond to a scratch defect 1102 on the workpiece. In various implementations, in relation to the operations of the defect detection portion 145 and/or the lighting optimization portion 147, a user may provide images with examples of scratch defects similar to the scratch defect 1102. As one example, the provided images may be of similar portions of workpieces (e.g., for which the types of machining marks formed on the surfaces of the portions are similar or nominally the same in each image and the primary difference between the images is the characteristics of the respective scratch defects). In one example implementation, such images may be included as part of a training set of images for training.

In one example implementation, the image of FIG. 11 may be an example of an image which may be analyzed by the defect detection portion 145 to detect the scratch defect 1102. In various implementations, the defect detection portion 145 may have been well trained for being able to properly detect the scratch defect 1102 (e.g., as having been trained by training images including the similar portions of workpieces and scratch defects having certain similar characteristics as the scratch defect 1102). In various implementations, certain additional processes may be performed with respect to the example scratch defect 1102. For example, one or more metrology processes may be performed in conjunction with the defect detection process, for which various dimensions or other characteristics of the scratch defect 1102 may be determined.

As part of the general operations of the defect detection portion 145, some defects that are detected may warrant further metrology or inspection to determine additional defect parameters. For example, as noted above, various types of analysis and/or processing of the image that includes the scratch defect 1102 (e.g., utilizing the edge detection portion 144) may enable determination of the XY position and approximate XY area and/or other dimensions of the scratch defect 1102 (e.g., utilizing video tools and/or other operations as described above). If the 3D nature of the potential defect is important (e.g., if a scratch must be deeper than some value to be considered a defect), then the defect detection portion 145 may initiate a points from focus process (e.g., of the points from focus portion 146, such as for acquiring a 3D point cloud of the affected region to determine the depth of the scratch defect 1102, etc.) As will be described in more detail below, different lighting optimization may correspond to each of these different types of processes (e.g., for defect detection, edge detection, points from focus, etc.)

Figure 12:
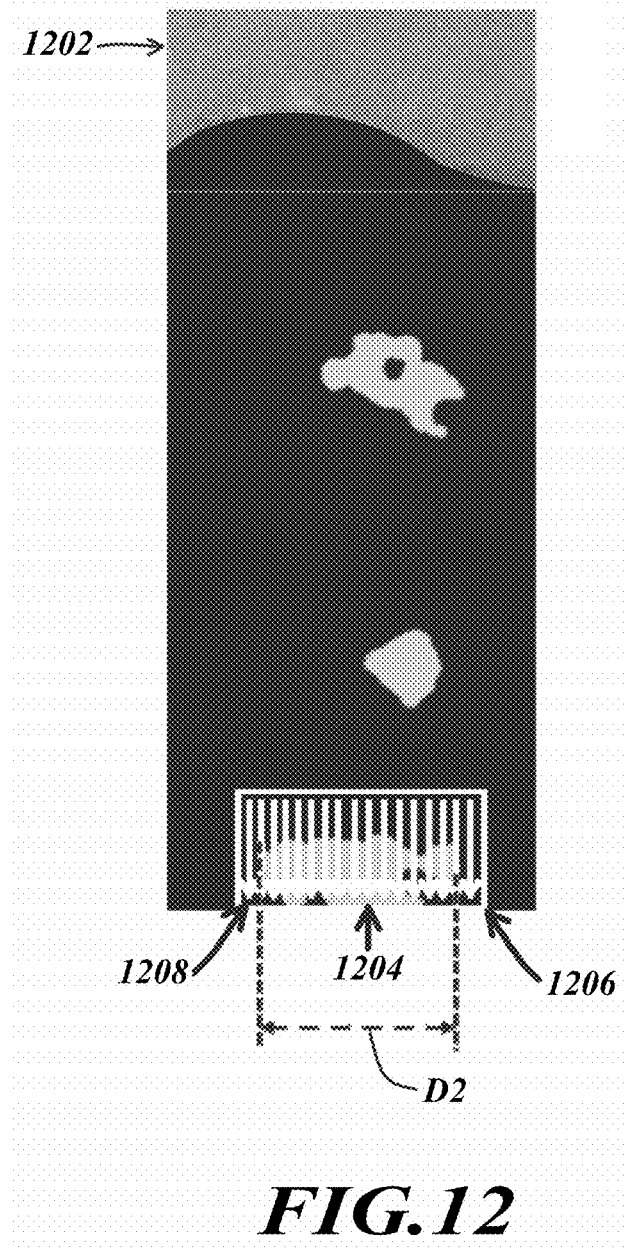
FIG. 12 is a diagram illustrating utilization of one or more video tools for performing metrology operations on a workpiece feature in an image of a workpiece.

FIG. 12 is a diagram illustrating utilization of one or more video tools for performing metrology operations on a workpiece feature in an image of a workpiece (e.g., for determining dimensions of the workpiece feature, etc.). In one example, the workpiece feature 1202 may correspond to a defect, or other type of workpiece feature (e.g., similar to the example of FIG. 11). As illustrated, for an image 1202 that includes a workpiece feature 1204, a video box tool 1206 includes scan lines 1208 (e.g., which may also or alternatively be representative of video point tools, etc.) which are utilized for determining the edge locations, dimensions, and/or other aspects of the workpiece feature 1204. In various exemplary implementations, the video box tool 1206 may be sized, positioned and rotated, until the box tool 1206 is indicative of, or defines, the region of interest (e.g., the area within the box tool 1206), and the arrows shown in FIG. 12 (e.g., representative of scan lines, point tools, etc.) may be utilized to determine the edge(s) of the workpiece feature 1204. In various exemplary embodiments, the video box tool 1206 may generally use one or more conventional edge gradient(s) along the edge(s) of the workpiece feature 1204 in the region of interest, and the edge(s) of the workpiece feature 1204 may be determined based on the local magnitudes of the edge gradient(s) along the various scan lines 1208, etc.

Various other processes may also or alternatively be performed, such as thresholding and/or forming a binary image (e.g., as part of a defect detection process, etc.). As shown in FIG. 12, in the display area included in the image, the box tool 1206 with the scan lines 1208 is utilized to determine the edge locations (e.g., the outer edges or perimeter) of the workpiece feature 1204. Based on such determinations, the video tool and/or other metrology operations may include determining a dimension D2 of the workpiece feature (e.g., corresponding to a length or other dimension of the workpiece feature 1204). In various exemplary implementations, the box tool 1206, scan lines 1208 and/or other video tools and/or metrology operations may be utilized to determine other dimensions of the workpiece feature 1204

(e.g., width, depth, etc.) For example, as described herein, the points from focus portion 146 may perform operations for determining three dimensional surface profile data from which the Z-height dimensions of the workpiece feature (e.g., including determining the depth of the workpiece feature/defect relative to other portions or features of the workpiece surface, etc.) may be determined.

As noted above, similar to the example of FIG. 11, the workpiece feature 1202 may in some implementations correspond to a defect 1202 on the workpiece. In various implementations, in relation to the operations of the defect detection portion 145 and/or the lighting optimization portion 147, a user may provide images with examples of defects similar to the defect 1202. As one example, the provided images may be of similar portions of workpieces (e.g., for which the types of surfaces of the portions are similar or nominally the same in each image and the primary difference between the images is the characteristics of the respective defects). In one example implementation, such images may be included as part of a training set of images for training.

In one example implementation, the image of FIG. 12 may be an example of an image which may be analyzed by the defect detection portion 145 to detect the defect 1202. In various implementations, the defect detection portion 145 may have been well trained for being able to properly detect the defect 1202 (e.g., as having been trained by training images including the similar portions of workpieces and defects having certain similar characteristics as the defect 1202). In various implementations, certain additional processes may be performed with respect to the example defect 1202. For example, one or more metrology processes may be performed in conjunction with the defect detection process, for which various dimensions or other characteristics of the defect 1202 may be determined. As will be described in more detail below, different lighting optimization may correspond to each of these different types of processes (e.g., for defect detection, edge detection, points from focus, etc.)

Figure 13:
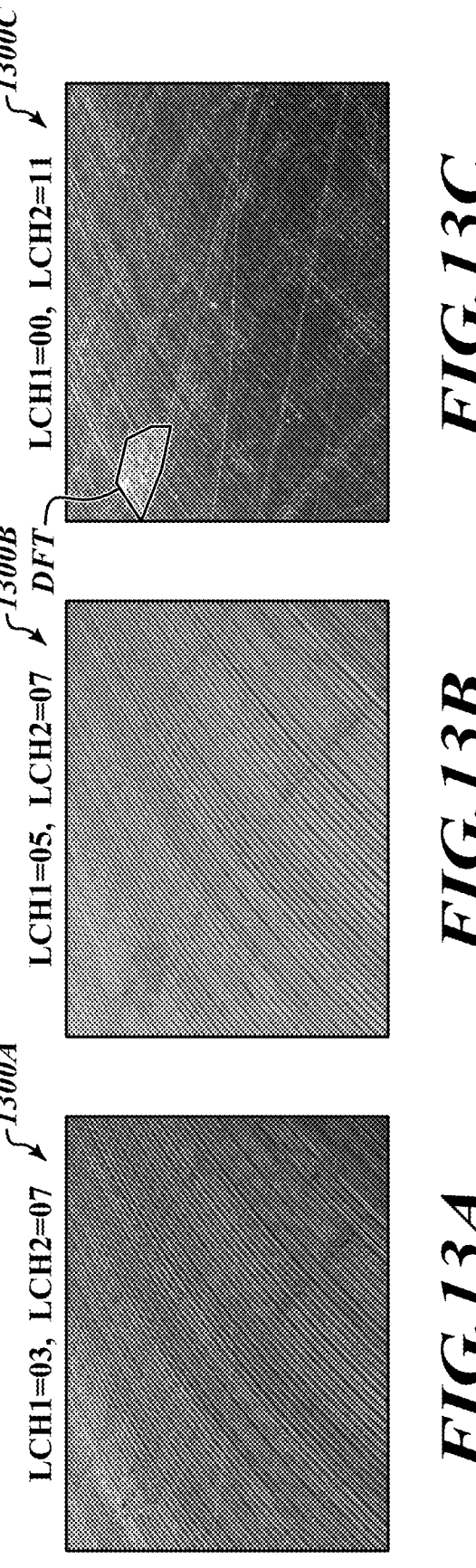
FIGS. 13A-13C illustrate images that are acquired with different settings for lighting channels, such as may affect the visibility of different workpiece features such as defects.

FIGS. 13A-13C are diagrams illustrating certain principles in relation to a defect detection process (e.g., as performed by a defect detection portion 145). In various implementations, as part of such a defect detection process, it may be desirable to provide lighting that enables surface texture to be visible, without under or over-exposing any portion of the corresponding surface. FIGS. 13A-13C illustrate different settings for certain example lighting channels, which correspondingly illustrate how certain surface texture features and/or defects may be more or less visible or otherwise detectable. The examples of FIGS. 13A-13C are in regard to a surface of a machined aluminum plate, which includes ridges.

FIGS. 13A-13C illustrate images 1300A-1300C that are acquired with different settings for lighting channels LCH1 and LCH2. In various implementations, the lighting channel LCH1 may correspond to a coaxial lighting channel (e.g., as provided by the lighting channel 240 in the example of FIG. 2). In various implementations, the lighting channel LCH2 may correspond to a single lighting channel, or may be representative of the settings for a group of lighting channels, (e.g., of a dome light or a ring light, such as provided in accordance with the lighting configuration 230 of the example of FIG. 2). FIG. 13A illustrates the image 1300A as acquired with illumination of the workpiece surface as provided with the lighting channel LCH1 having a setting at 3 and the lighting channel LCH2 as having a setting at 7. In the resulting image 1300A, the surface of the workpiece is somewhat dark, with some visibility of the grooves in the surface. In FIG. 13B, the setting of the lighting channel LCH1 is at 5 and the setting of the lighting channel LCH2 is at 7. This combination of lighting for illuminating the surface of the workpiece results in the image 1300B, in which the surface is somewhat brighter than that in the image 1300A, and with the grooves in the workpiece surface having a somewhat different level of visibility.

In FIG. 13C, the setting of the lighting channel LCH1 is at 0, and the setting of the lighting channel LCH2 is at 11. These settings for the lighting channels in combination illuminate the workpiece as resulting in the image 1300C. It can be seen in the image 1300C, that there are certain features on the workpiece surface that are more visible, in comparison to the images 1300A and 1300B, in which such features are less visible. For example, certain scratches that are generally horizontally oriented are more visible in the image 1300C, as is a defect DFT illustrated in the upper left corner of the image. In this example, in order for the defect to be relatively more visible, it is desirable for the lighting channel LCH1 to have relatively lower setting (e.g., a setting of 0) and for the lighting channel LCH2 to have a relatively higher setting (e.g., a setting of 11). As noted above, in general for defect detection processes, it may be desirable to have visibility of certain surface texture of the workpiece surface (e.g., as corresponding to the type of defects that are being detected) without under or over-exposing those portions of the workpiece surface.

Figure 14:
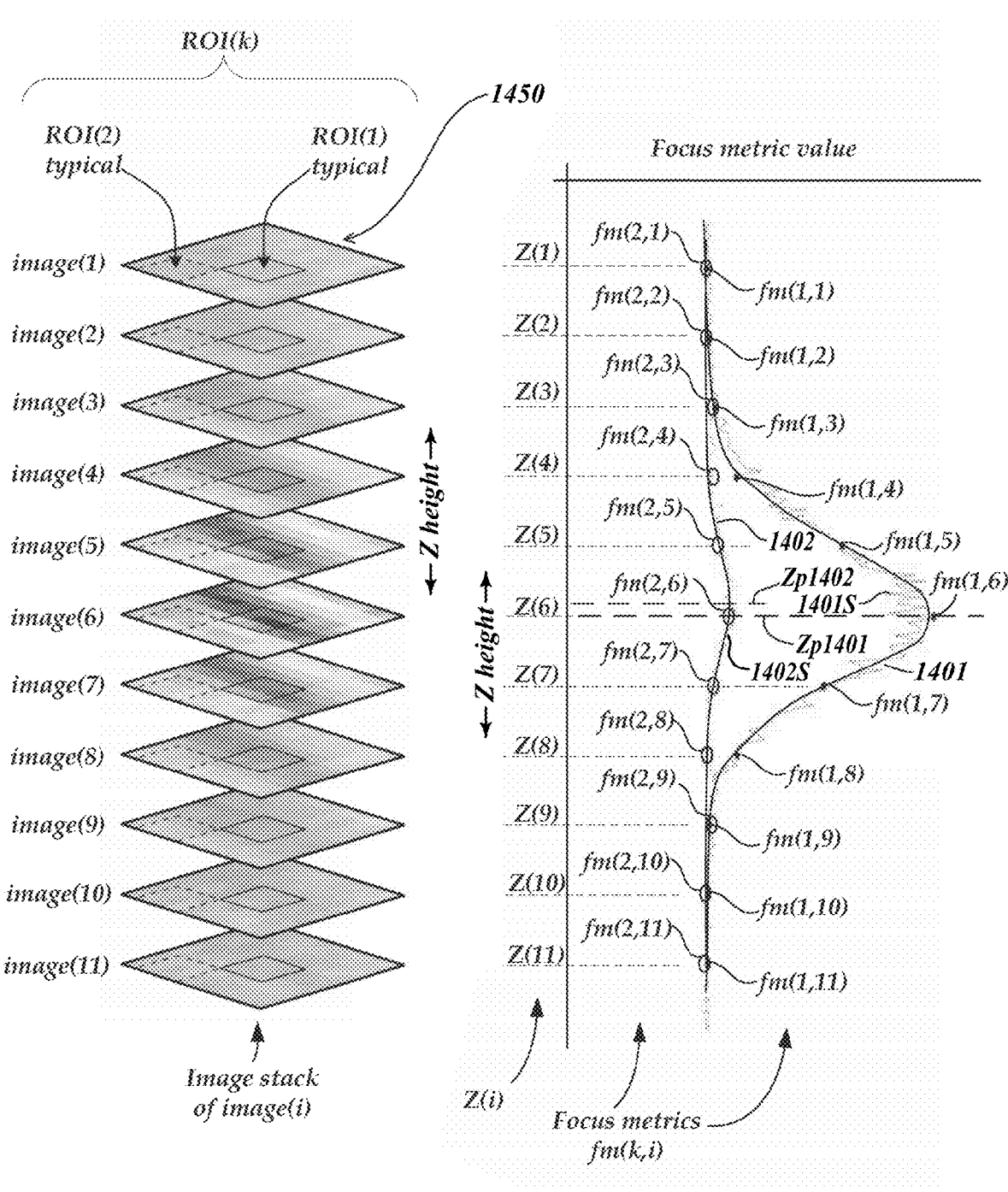
FIGS. 14A and 14B are diagrams illustrating contrast focus curves as may result from characteristics of lighting in corresponding regions of interest and as may be utilized for points from focus processes.

FIGS. 14A and 14B are diagrams illustrating contrast focus curves as may result from characteristics of lighting in corresponding regions of interest and as may be utilized for points from focus (e.g., as performed by the points from focus portion 146). As will be described in more detail below with respect to FIGS. 14A and 14B, in various implementations (e.g., as part of a points from focus process) the camera 260 is utilized to acquire an image stack comprising a plurality of images of the workpiece surface with the lighting, wherein each image of the image stack corresponds to a different Z-height. Focus curve data (e.g., for which the visible level of contrast may depend on the lighting) is determined based at least in part on an analysis of the images of the image stack, wherein the focus curve data indicates 3 dimensional positions (e.g., including Z-heights as well as relative x-axis and y-axis positions) of a plurality of surface points on the workpiece surface.

As illustrated in FIGS. 14A and 14B, contrast focus curves 1401 and 1402 may result from characteristics of lighting in corresponding regions of interest on a workpiece. It is generally desirable for lighting to result in sufficient contrast in images so that the peak of a contrast curve can be accurately localized and reliably distinguished from noise for all desired regions of interest. As will be described in more detail below, focus curve data may be determined from analysis of an image stack (e.g., as part of points-from-focus (PFF) processes/measurement operations), which indicates 3-dimensional positions of surface points on the surface of the workpiece.

FIGS. 14A and 14B illustrate how an image stack obtained by the system 100 (e.g., with lighting provided by the lighting channels of a lighting configuration LC) may be utilized to determine the Z-heights of points on a workpiece surface. In various implementations, the image stack is obtained by the system 100 (e.g., in accordance with operations of the points from focus portion 146), to determine three dimensional profile data (e.g., including Z-heights of points on the workpiece surface, etc.). The PFF image stack may be processed to determine or output a Z-height coordinate map (e.g. a point cloud) that quantitatively indicates a set of 3 dimensional surface coordinates (e.g., corresponding to a surface shape or profile of the workpiece).

In the PFF analysis as described herein, each of the focus curves 1401 and 1402 (as shown in FIG. 14A) corresponds to a single point on the workpiece surface. That is, the peak of each focus curve indicates the Z-height of the single point along the direction of the optical axis OA of the vision components portion 200 of the system 100. In various implementations, the PFF type analysis repeats this process for multiple surface points (e.g., each with a corresponding region of interest) across the workpiece surface such that an overall profile of the workpiece surface can be determined. In general, the process may be performed for the multiple surface points that are within a field of view (i.e., as captured within the images of the image stack), where for each image of the image stack, a particular ROI(i) corresponds to a particular point on the workpiece surface (e.g., with the point at the center of the ROI).

FIGS. 14A and 14B are aligned relative to one another along the Z-height axis shown in the figures. FIG. 14A is a representative graph 1400A illustrating two examples of fit focus curves 1401 and 1402, and FIG. 14B is a diagram of a variable focus image stack 1400B which includes two different regions of interest ROI(k), in particular ROI(1) and ROI(2), that correspond to the data points fm(1,$i$) and fm(2,$i$) corresponding to the two different focus curves 1401 and 1402, respectively, of FIG. 14A. The regions of interest ROI(k) are included in an imaged surface region of a workpiece.

Regarding the term "region of interest", it will be appreciated that some "single point" autofocus tools return a single Z-height corresponding to an entire region of interest. However, known "multi-point" type autofocus tools may return multiple Z-heights corresponding to individual "sub-regions of interest" (e.g. a grid of sub-regions of interest) within a global region of interest defined by the multi-point type autofocus tool. For example, such sub-regions of interest may be manually and/or automatically defined as centered on each (or most) pixels within the global region of interest. Thus, in some cases, ROI(1) and ROI(2) may be regarded as representative sub-regions of interest within a global region of interest. However, the essential point is that a Z-height may be established for any defined autofocus region of interest (e.g., whether it is a region of interest of a single point autofocus tool, or a sub-region of interest within a global region of interest defined by a multi-point autofocus tool). Thus, it will be understood that when the term region of interest is used in relation to establishing a Z-height, that sub-regions of interest (e.g. within a global region of interest defined by a multi-point autofocus tool) may be encompassed within the meaning of that term. For simplicity of the current illustrations, the regions of interest ROI(1) and ROI(2) are shown to be relatively small (e.g. 3×3 pixels), although it will be appreciated that larger regions of interest (e.g., 7×7 pixels, etc.) may be utilized in various implementations as part of such processes, etc.

As shown in FIG. 14B, each of the images image(1)-image(11) of the image stack image(i) include the centrally located region of interest ROI(1) for which the determined focus metric values correspond to the focus metric data points fm(1,$i$) on the focus curve 1401. The region of interest ROI(1) is schematically indicated in FIG. 14B as including a relatively high level of contrast (e.g. in image(6)), corresponding to the relatively greater focus metric values shown on the focus curve 1401. Similarly, each of the images image(1)-image(11) of the image stack image(i) include the peripherally located region of interest ROI(2) for which the determined focus metric values correspond to the focus metric data points fm(2,$i$) on the focus curve 1402. The region of interest ROI(2) is schematically indicated in FIG. 14B as including a relatively low level of contrast (e.g. in image(6)), corresponding to the relatively lesser focus metric values shown on the focus curve 1402.

As shown in FIG. 14A, each focus metric value fm(1,$i$) or fm(2,$i$) may be regarded as sampling continuous underlying focus data 1401S or 1402S, respectively. It may be seen in FIG. 14A that the underlying focus data 1401S or 1402S is relatively noisy (e.g. due to the small size of the corresponding regions of interest). However, in the case of the focus curve 1401, due to higher contrast in the corresponding region of interest the focus metric values in the vicinity of the focus curve peak (e.g. near Zp1401) are relatively large compared to the size of the "noise component" in the underlying focus data. In contrast, in the case of the focus curve 1402, due to low contrast in the corresponding region of interest the focus metric values in the vicinity of the focus curve peak (e.g. near Zp1402) are relatively similar to the size of the "noise component" in the underlying focus data.

In one specific example, the higher focus metric values indicated in the focus curve 1401 may be due at least in part to lighting that is provided by the lighting configuration on the surface area in the region of interest ROI(1) resulting in high contrast in focused images. In comparison, the lower focus metric values indicated in the focus curve 1402 may be due at least in part to lighting that is provided by the lighting configuration on the surface area in the region of interest ROI(2) resulting in little contrast in focused images. In any case, it will be appreciated that because of the low "signal to noise" associated with the lower peak of the focus curve 1402, as compared to relatively high signal to noise associated with the peak of the focus curve 1401, that the estimated Z-height of the focus peak Zp1402 of the focus curve 1402 is less reliable or more uncertain than the estimated Z-height of the focus peak Zp1401 of the focus curve 1401 (e.g., in some instances the data of the focus curve 1402 may be considered so unreliable and/or uncertain that no focus peak determination may reliably be made, as may be regarded as corresponding to a "gap" in the focus curve data for the workpiece surface).

Briefly summarizing in relation to FIGS. 14A and 14B, for points from focus operations, a camera 260 may move (e.g., as moved by a motor 294), or a VFL lens 270 may be utilized, to vary a focus position of the system through a range of Z-height positions Z(i) along a z-axis (e.g., the focusing axis or optical axis OA) and the camera 260 may be utilized to capture an image(i) at each of a plurality of corresponding focus positions. For each captured image(i), a focus metric fm(k,i) may be calculated based on a region or sub-region of interest ROI(k) (e.g. a set of pixels) in the image and related to the corresponding focus position Z(i) (e.g., of the camera or as corresponding to the operations of the VFL lens) along the Z axis at the time that the image was captured. This results in focus curve data (e.g. the focus metrics fm(k,i) at the positions Z(i), which is one type of focus peak determining data set), which may be referred to simply as a "focus curve" or "autofocus curve". In one embodiment, the focus metric values may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

The Z-height (e.g. Zp1401 or Zp1402) corresponding to the peak of the focus curve, which corresponds to the best focus position along the Z axis, is the Z-height for the region of interest used to determine the focus curve. The Z-height corresponding to the peak of the focus curve may be found by fitting a curve (e.g. the curve 1401 or 1402) to the focus curve data (e.g. the data fm(1,$i$) or fm(2,$i$) and estimating the location of the peak of the fitted curve. It will be appreciated that while the image stack image(i) is shown for purposes of illustration as only including eleven images, in an actual embodiment (e.g., as part of a PFF process or otherwise) a larger number of images (e.g. 100 or 200 or more) may be utilized. Exemplary techniques for the determination and analysis of image stacks and focus curves are taught in U.S. Pat. Nos. 6,542,180 and 8,581,162, each of which is hereby incorporated herein by reference in its entirety. The differences between the curves 1401 and 1402 and the Z-heights Zp1401 and Zp1402, as well as the noted accuracy differences for the determinations of the corresponding three dimensional profile data, indicate the importance of the lighting optimization for determining desired lighting for the points from focus process (e.g., for which desired lighting in the region of interest ROI(1) results in the curve 1401 with the Z-height Zp1401, and less desired lighting in the region of interest ROI(2) results in the curve 1402 with the Z-height Zp1402). It is also noted that such characteristics/goals of the lighting optimization for points from focus (e.g., which include providing desired lighting over a range of focus positions, as opposed to at a single focus position) may be different than the characteristics/goals for lighting optimization for certain other types of processes (e.g., for edge detection and/or defect detection processes, etc.).

Figure 15:
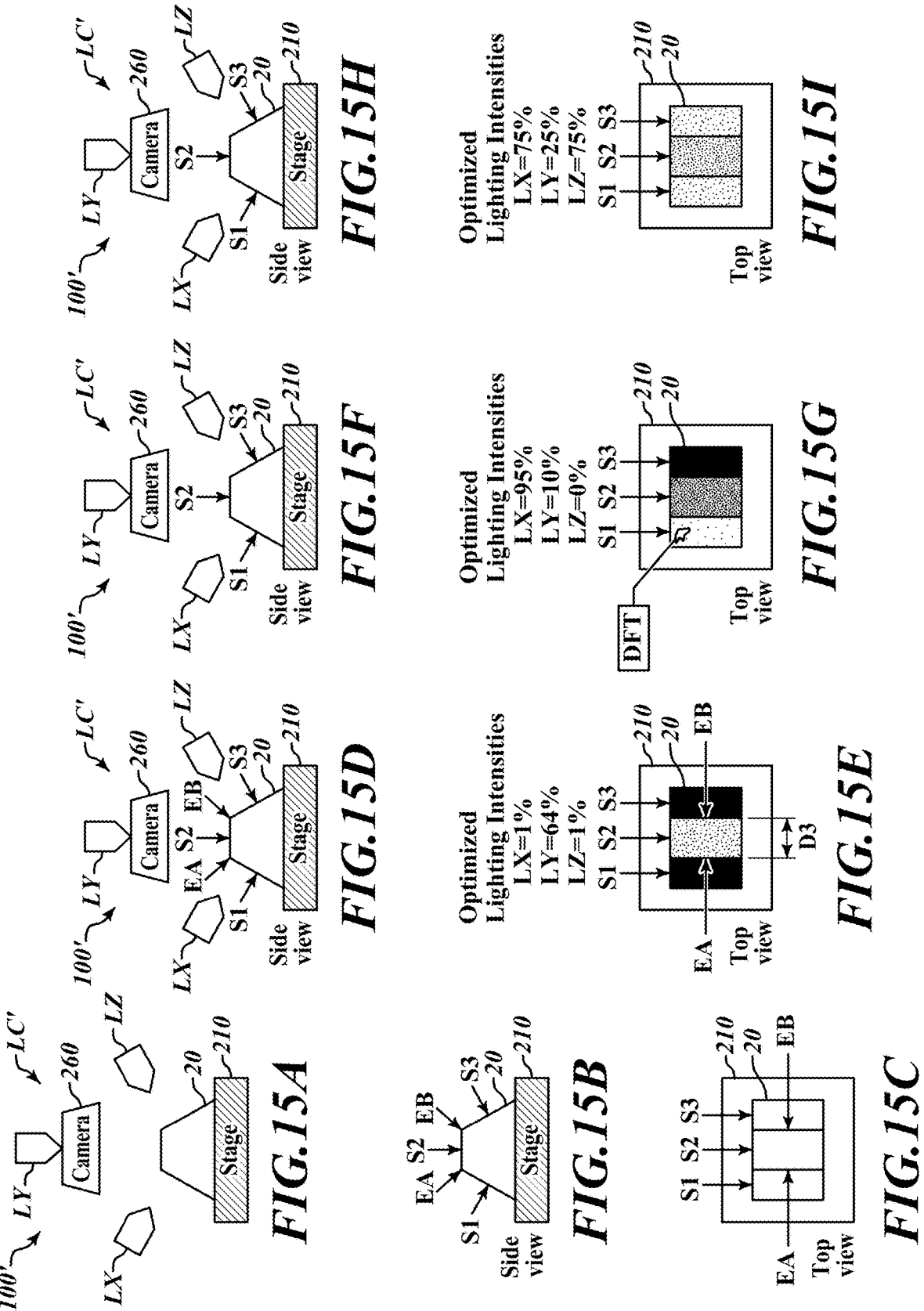
FIGS. 15A-15I are diagrams illustrating determinations of lighting optimization for different lighting optimization modes.

FIGS. 15A-15I are diagrams illustrating determinations of optimized lighting for different lighting optimization modes. FIG. 15A illustrates an inspection system 100', which may be similar to the inspection system 100 described above with respect to FIG. 2, and will be understood to operate similarly unless otherwise described below. The system 100' is illustrated as including a lighting configuration LC', a camera configuration 260 (e.g., which may include a lens), and a workpiece stage 210. A workpiece 20 is located on the stage 210 (i.e., for being illuminated by the lighting configuration LC' and for being imaged by the camera 260). In the simplified example of FIG. 15A, the lighting configuration LC' is illustrated as including at least lighting channels LX, LY, and LZ.

The lighting channels LX and LZ are noted to provide lighting at an angle (e.g., such as at an angle between 45 degrees and 90 degrees from an optical axis, such as an optical axis of the camera 260 and/or a lens in front of the camera 260, etc.). In relation to the example of FIG. 2, such lighting may come from certain lighting channels of the lighting configuration 230. The lighting channel LY provides axial illumination (e.g., which in relation to the example of FIG. 2 may be similar to the lighting provided by the lighting channel 240). In various implementations, the lighting channels LX, LY, and/or LZ in the illustration of FIG. 15A may be representative of individual lighting channels, or in some implementations may each be representative of a group of lighting channels in a corresponding position such as that illustrated in FIG. 15A.

With respect to the coaxial lighting as provided by the lighting channel LY, while for simplicity of the illustration of FIG. 15A the lighting channel LY is illustrated as being above the camera 260, in various implementations, the axial lighting may be provided in a manner similar to that illustrated in the example of FIG. 2 (e.g., where the reflective element 290 reflects the lighting from the lighting channel 240 downward in the axial path toward the workpiece 20, and with the correspondingly produced workpiece light 255 passing through the element 290 along the optical path toward the camera 260). As illustrated in FIG. 15A, similar to the example of FIG. 2, the workpiece 20 is located on the workpiece stage 210 (e.g., for which the position of the stage 210 may be adjustable) and such that the workpiece 20, or a desired portion thereof, is within the field of view (e.g., of the camera 260).

FIG. 15B is a diagram illustrating a side view, similar to that of FIG. 15A, of the workpiece 20 as located on the stage 210. As illustrated in FIG. 15B, the workpiece 20 has angled surfaces S1 and S3 and a horizontal top surface S2. An edge EA is illustrated between the surfaces S1 and S2, and an edge EB is illustrated between the surfaces S2 and S3. FIG. 15C is a top view of the workpiece 20 as located on the stage 210. As illustrated in FIG. 15C, the edge EA is between the sloped surface S1 and the horizontal top surface S2. The edge EB is between the horizontal top surface S2 and the sloped surface S3 of the workpiece 20.

FIGS. 15D and 15E are diagrams illustrating an implementation in which a lighting optimization process is performed for determining lighting for illuminating the workpiece 20 for a selected edge detection lighting optimization mode. More specifically, lighting is determined for enhancing the edges EA and EB (e.g., so that the edges EA and EB can be best detected, in relation to determining their precise positions on the workpiece 20, and in one example so a precise distance between the edges may be determined). In various implementations, to best detect the edges EA and EB for metrology purposes, ideally a region on at least one side of each edge will have a maximized contrast relative to a region on the other side of the edge, and without having a significant percentage of the pixels near the edges intensity saturated.

For such purposes, lighting may be determined that may have the surface S1 mostly dark (e.g., by having the lighting channel LX have a low intensity), and may have the surface S2 mostly bright, although preferably without saturation (e.g., such that some of the surface texture is still visible) by having a medium or medium-high intensity for the lighting channel LY, and having the surface S3 mostly dark by having the lighting channel LZ have a relatively lower intensity. As a specific numerical example in relation to such principles, in one implementation, the lighting intensity setting for the lighting channels LX and LZ may be 1 percent, while the lighting intensity setting for the lighting channel LY may be 64 percent. Such optimized lighting intensities are noted to produce the desired result, with the edges EA and EB enhanced in a resulting image that is acquired (e.g., with an image corresponding to the top view of FIG. 15E), such that the detection of the edges may be improved.

As indicated in FIG. 15E, an image acquired with optimized lighting, may be utilized to determine the precise locations of the edges EA and EB. In various implementations, an edge detection tool (e.g., as described herein in relation to FIGS. 8-10) may be utilized for determining the precise locations of the edges EA and EB. Once the precise locations of the edges EA and EB are determined, a distance D3 between the edges EA and EB may be determined, such as illustrated in FIG. 15E.

FIGS. 15F and 15G illustrate an implementation in which a lighting optimization process is performed for determining lighting for illuminating the workpiece 20 for a selected defect detection lighting optimization mode. In this particular example, it is desired to detect a defect DFT that may exist on the surface S1. In various implementations, to best illuminate and find defects on surface S1, it may be desirable for the light primarily from the lighting channel LX to be of relatively high intensity to reflect the lighting back from the angled surface S1 to the camera 260. In various implementations, one goal would be able to have good imaging of the surface texture for all of the surface S1, without under or over-exposing of any portions of the surface S1.

In relation to such objectives, lighting from the lighting channel LZ may have little or less effect on the illumination of surface S1, and may be optimized at a low value (e.g., for conserving energy), or at other possible values, since the lighting from the lighting channel LZ will have little effect on the defect detection on the surface S1. In various implementations, some portion of the lighting from the lighting channel LY may be helpful in lighting surface S1, such that the lighting channel LY may have an optimized setting at some low to medium value. As some specific numerical examples in relation to the illustration of FIG. 15G, the settings of the lighting channels (e.g., as corresponding to the lighting intensities in these examples) may correspond to lighting intensity settings for the lighting channel LX at 95 percent, for the lighting channel LY at 10 percent, and for the lighting channel LZ at 0 percent.

FIGS. 15H and 15I are diagrams illustrating an implementation in which a lighting optimization process is performed for determining lighting for illuminating the workpiece 20 for a selected points from focus lighting optimization mode. In the illustrated example, for the points from focus operations, it is desired to determine three-dimensional profile data for the workpiece 20, such as in relationship to all of the surfaces S1, S2, and S3. In various implementations, in relation to such a point-from-focus process, it may be desired to produce lighting that achieves relatively balanced lighting on all of the surfaces S1, S2, and S3 (e.g., so that none of the surfaces are saturated, and none of the surfaces are very dark, etc.). Due to the fact that the surfaces S1 and S3 are angled, as a general principal, more lighting may be needed from the lighting channels LX and LZ (e.g., for which a corresponding image may be acquired with the lighting that will have the surfaces S1 and S3 similarly illuminated in comparison with the surface S2). In various implementations, it may be desirable for the determined lighting to enable the texture on the surfaces S1, S2, and S3 to be clearly visible in a corresponding image. In accordance with such principles, as one specific numerical example in relation to the illustration of FIG. 15I for the lighting that is determined, the lighting channels LX and LZ may have lighting intensity settings of 75 percent, while the lighting channel LY may have a lighting intensity setting of 25 percent.

It will be appreciated that as part of the lighting optimization process, the settings of the lighting channels (e.g., as corresponding to the lighting intensity settings in the examples of FIGS. 15A-15I) may be adjusted for the determination of the optimized lighting intensities. For example, when the lighting optimization process is performed in relation to the selected edge detection lighting optimization mode, the process may be configured to have a surface on one side of each edge (e.g., surface S2) relatively bright without saturation, and to have the surfaces (e.g., surface S1 and surface S3) on the other sides of the edges mostly dark. In relation to these principles, the lighting optimization process may vary the settings of the lighting channels LX, LY, and LZ within ranges corresponding to these principles, and for which images may be captured with the different lighting settings, so as to determine lighting which best enhances the edges EA and EB. In various implementations, quality metrics (e.g., in relation to the enhancing of the edges) may be determined for each image and/or corresponding lighting settings, so as to determine the lighting settings and corresponding image with the best metrics. Similar varying of the lighting settings and utilization of quality metrics may be performed with respect to the lighting optimization processes of FIGS. 15F-15G (i.e., for the defect detection lighting optimization mode) and of FIGS. 15H-15I (i.e., for the points from focus lighting optimization mode).

Figure 16:
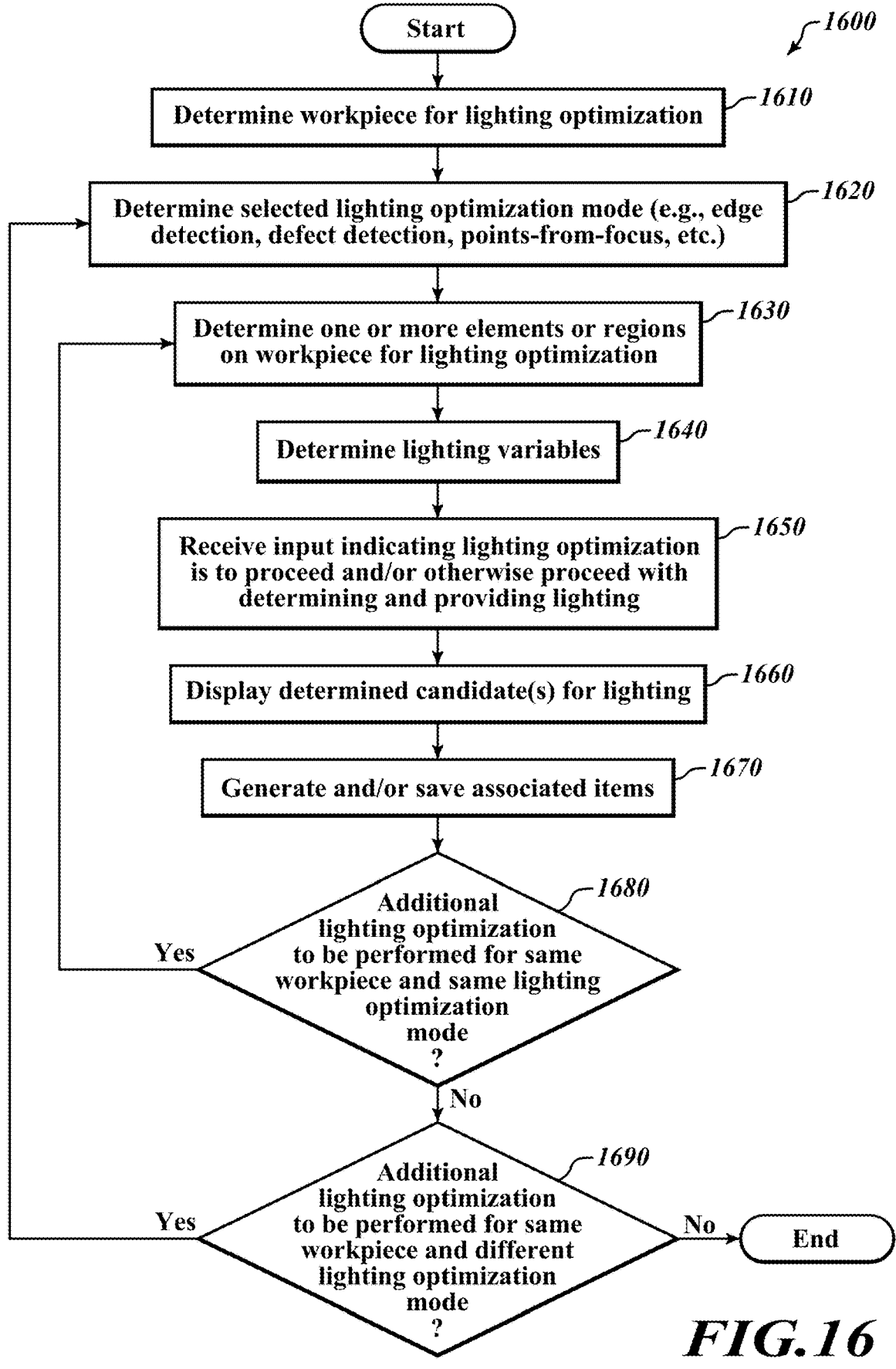
FIG. 16 is a flow diagram of a routine for determining lighting optimization for a workpiece (e.g., a new workpiece)

FIG. 16 is a flow diagram of a routine 1600 for determining lighting optimization for a workpiece (e.g., a new workpiece). At a block 1610, a workpiece is determined for lighting optimization. For example, a user may have a new workpiece for which lighting optimization is to be determined. In various implementations, the user may place the workpiece in the field of view of the system (e.g., under the camera 260 and lens 250 of FIG. 2) and where the workpiece may be illuminated by the lighting configuration LC of the system. In various implementations, the system is configured to recognize a new workpiece (e.g., which may not be a good match for any workpiece that is already in a workpiece database), and for which the system may provide a suggestion to the user for a new workpiece setup. In various implementations, the user may also select a new workpiece setup for an existing workpiece (e.g., in order to add a new lighting optimization mode, or a new region for lighting optimization, such as in a mode for which lighting optimization was previously determined, etc.). At a block 1620, a selected lighting optimization mode is determined (e.g., edge detection, defect detection, points-from-focus, etc.). For example, a user may select a lighting optimization mode.

At a block 1630, one or more elements or regions are determined on the workpiece for the lighting optimization. As an example, a user may accept or indicate one or more elements or regions on a workpiece for the determining of the lighting optimization. Such elements or regions may in various implementations be automatically identified, segmented, and/or suggested. As some examples, two or more edges may be indicated for edge detection, or a region potentially containing a defect may be indicated for surface defect detection. A user may be presented with options for selecting all or some of these auto-identified regions. In various implementations, elements and/or regions may be manually selected by a user. Certain manual selection techniques may include options such as a polygon tool to click around a perimeter of a feature, a live-wire tool to semi-automatically select an edge, a finger swipe or a pen drawing on a touchscreen device, or a simple mouse drag over a rectangular region, etc. In various implementations, for an edge detection lighting optimization mode, geometric elements may be automatically suggested or manually identified. For a defect detection lighting optimization mode or a points from focus lighting optimization mode, regions may be automatically segmented and suggested and/or may be manually identified.

At a block 1640, lighting variables are determined. In various implementations, a selection may be made (e.g., by a user) to optimize all possible lighting variables, or a selection may be made to optimize the lighting as constrained to fewer variables (e.g., as defined by a layout, grouping of elements, and/or other limiting options, such as selected in a graphical user interface, etc.). As an example, groups of lighting channels may be determined, and which may each be controlled as a group so as to share the same settings (e.g., RGB settings), such as part of the lighting optimization process. By enabling the lighting channels to be included in groups, and by adjusting each group of lighting channels as a single entity, the lighting optimization process may be made faster and/or easier by reducing the effective number of entities to be adjusted.

At a block 1650, an indication is received that lighting optimization is to proceed and/or a determination is otherwise made to proceed with the determining and providing of the lighting. In various implementations, such an indication may be provided by and correspond to a user making a selection in the user interface (e.g., a pressing of a start button). In various implementations, a progress indicator may be provided in a user interface (e.g., that indicates to a user that the lighting optimization determination/training is in progress).

At a block 1660, one or more determined candidates for the lighting are displayed or otherwise provided. For example, in various implementations, at the completion of the training/determination of the lighting, one or more candidates for the lighting (e.g., with a metric goal result indicator) may be displayed or otherwise provided (e.g., for consideration by a user). In various implementations, if a system determines that there is one clear best result based upon a metric goal, then only the one result may be provided and/or otherwise displayed. In various implementations, options may be provided (e.g., for a selection by a user) for choosing a preferred result from two or more options or to accept a single presented best result.

In various implementations, a user may choose to take a result and further manually adjust the lighting settings to see if a different result (e.g., as may be better for certain aspects) may be achieved (e.g., and for which a displayed metric goal may be updated and displayed in accordance with the corresponding changes that are manually made). In various implementations, a metric goal result may be determined and displayed both for each separate region and for a collection of regions (e.g., for all of the regions). In various implementations, the metric goals may be predefined for each lighting optimization mode. For example, for the edge detection lighting optimization mode, the metric goals may be in relation to how well a determined edge matches a profile of an ideal step edge, etc.

At a block 1670, associated items are generated and/or saved. The following are some examples of some associated items that may be generated and/or saved. One example is a trained or optimized lighting model including all of the layout/group/channel and/or other settings (e.g., in some instances as including some as made or selected by the user in the graphical user interface). Another example may include workpiece features (e.g., derived from an image or point cloud, depending on the processing and configuration) for automatically identifying a similar workpiece in the future. Another example may include information about the workpiece location and orientation. Another example may include an image of the workpiece with the optimized lighting (e.g., along with a date of the image, etc.). Another example may include the lighting optimization mode that was selected for the optimization. Another example may include a metric or score associated with a quality of the lighting optimization for the lighting optimization mode that was selected. Another example may include regions on the workpiece for which the lighting optimization was achieved relative to the workpiece location and orientation (e.g., so that the same regions may be found automatically on a new workpiece placed at a different location and orientation in the field of view of the system, such as in the field of view of the camera 260). Another example may include an image of the workpiece with neutral lighting (e.g., such as to be utilized as a workpiece identification image for subsequent user viewing, etc.).

At a decision block 1680, a determination is made as to whether additional lighting optimization will be determined for the same workpiece in the same lighting optimization mode. For example, a user may specify a different one or more elements or regions on the workpiece for the additional lighting optimization. If additional lighting optimization is to be performed, the routine returns to block 1630. At a decision block 1690, a determination is made as to whether additional lighting optimization is to be performed for the same workpiece and a different lighting optimization mode. If additional lighting optimization is to be performed, the routine returns to the block 1620, otherwise the routine ends.

As an example, in various implementations, it is possible that a single lighting optimization may not optimally illuminate all of the surfaces/edges of a workpiece in a desired manner for the selected lighting optimization mode. In such a circumstance, two or more lighting optimizations may be determined (e.g., in accordance with instructions from a user) for the same workpiece for the single lighting optimization mode that is selected for the lighting optimization. For example, in the edge detection lighting optimization mode, there may be a first determined lighting for horizontal edges and a second determined lighting for vertical edges on the workpiece.

Figure 17:
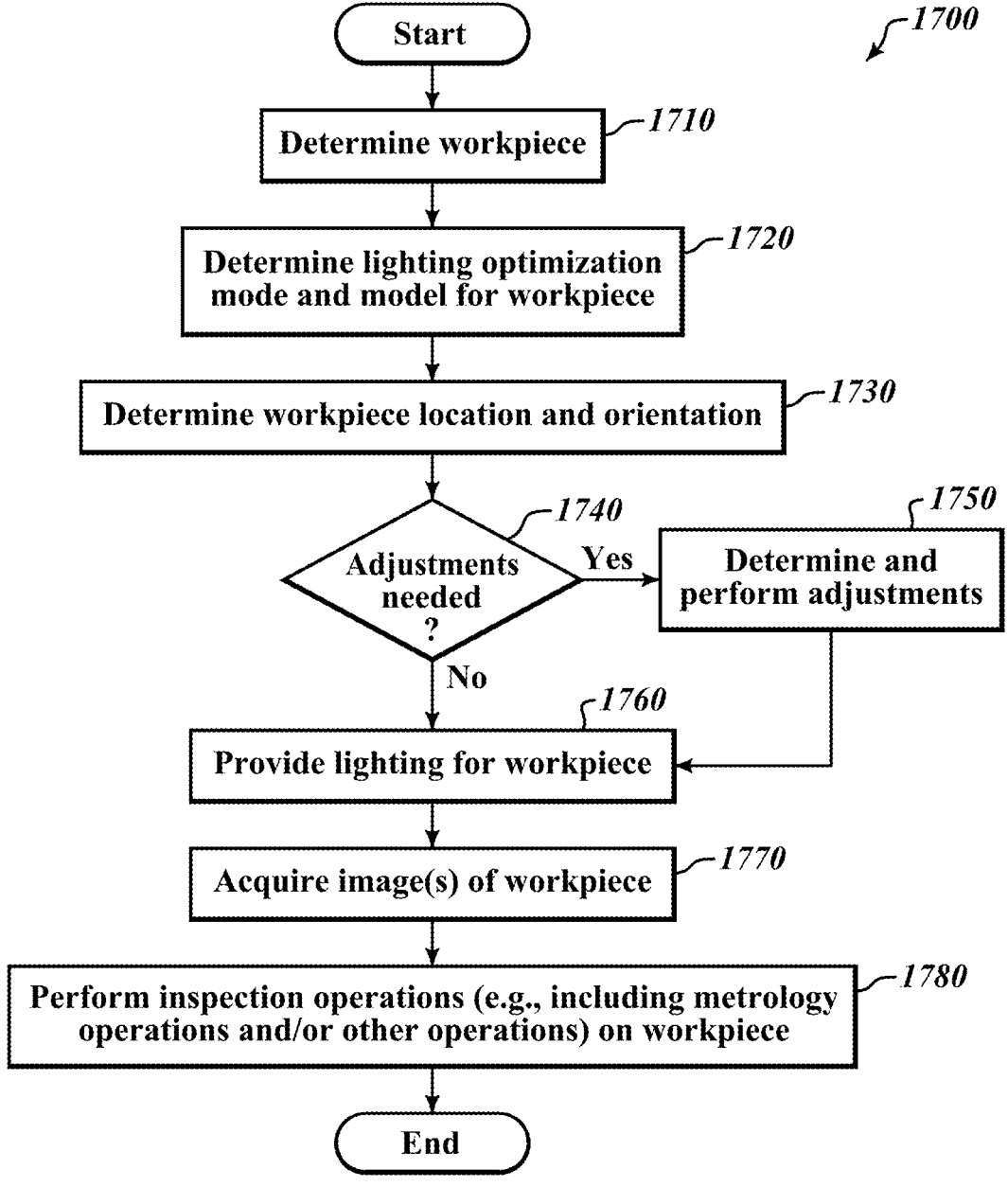
FIG. 17 is a flow diagram of a routine for providing lighting optimization for a workpiece (e.g., an existing workpiece)

FIG. 17 is a flow diagram of a routine 1700 for providing lighting optimization for a workpiece (e.g., in instances where the workpiece corresponds to a saved workpiece in a database, such as a workpiece for which the lighting optimization has already been determined in accordance with the routine 1600 of FIG. 16, etc.) At a block 1710, a workpiece is determined. For example, in various implementations, a user may place a workpiece in the field of view of the system (e.g., beneath the camera 260) and for which the system may automatically sense and image the workpiece. In various implementations, such sensing and/or imaging results may be utilized to automatically determine which workpiece (e.g., in an existing setup workpiece database) the current workpiece corresponds to. In various implementations, if there is some uncertainty (e.g., for matching the current workpiece to workpieces in the database), then neutral lighting images may be presented (e.g., to the user) of the best matching workpieces in the database, such as for a user to select a matching workpiece from the database.

At a block 1720, a lighting optimization mode and model are determined for the workpiece. A model is an optimization framework containing adjustable parameters that contribute to the control of the lighting elements being optimized. During model optimization, the parameters are varied by an optimization routine, based upon conventional or machine learning/artificial intelligence methods, to achieve lighting which results in workpiece image characteristics that are closest to a predefined mode-specific optimal goal. In various implementations, in relation to the current workpiece corresponding to a saved workpiece in the database, if for the saved workpiece there is only one lighting optimization mode and model, then the saved lighting optimization mode and model may be loaded/utilized automatically.

If more than one lighting optimization mode and model have been trained for the saved workpiece, then an option may be provided. For example, a user may be provided with an option for selecting one or more of the lighting optimization modes and models (e.g., for use in sequential imaging, or for which the processing may be set up to acquire an image for each lighting optimization mode and model and automatically process the acquired image accordingly. In various implementations, if a saved workpiece has two different lighting optimization modes and models, such as for edge detection and defect detection, the lighting for the edge detection may be utilized to acquire a first image (e.g., as may be sent to or otherwise utilized by an edge detection process, such as a metrology algorithm for edge determination and dimension/distance measurements, etc.) and the lighting for defect detection may be provided for acquiring a second image (e.g., as may be sent or otherwise provided to a defect detection process, etc.).

At a block 1730, a workpiece location and orientation are determined. For example, the workpiece location and orientation may be determined (e.g., automatically sensed) and compared with the location and orientation of the corresponding saved workpiece in the database (e.g., in accordance with the parameters that were utilized during the model training). At a decision block 1740, in relation to the location and orientation of the workpiece, a determination is made as to whether adjustments are needed. For example, if it is determined that the orientation and location of the current workpiece match the location and orientation of the workpiece as stored in the database, then no adjustments may be needed, for which the routine proceeds to a block 1760, as will be described in more detail below.

If at decision block 1740 it is determined that adjustments are needed, then the routine proceeds to a block 1750 where the adjustments are determined and performed. For example, if the workpiece location and orientation are different than those of the workpiece as saved in the database, then certain adjustments may be determined and performed. For example, the database and/or processing may have a physical model of the lighting and each of its elements in terms of the relative positions (e.g., as such as illustrated in FIGS. 3A and 3C in the display area 360 for the light source display). As one example, if the lighting elements are cylindrically symmetric about the optical axis (e.g., of the camera 260 of FIG. 2), then the lighting model may be automatically rotated to match the orientation of the current workpiece. This may be sufficient in certain instances, such as if it is determined that the workpiece is not also displaced from its original center (e.g., corresponding to a center of mass or a geometric center, etc.) location. If it is sensed that the workpiece has also been translated from the position of the workpiece as saved in the database, a recommendation may be provided to the user to make adjustments (e.g., performing transfer learning on the lighting model, such as starting with the rotated model and then adapting the lighting by a series of training steps for making improvements/adjustments to account for the workpiece displacement). In certain implementations, for a different location and orientation of a current workpiece, a re-optimization of the lighting may be determined.

Once the adjustments are performed at the block 1750, or if it is determined that no adjustments are needed at the block 1740, the routine proceeds to the block 1760 where the lighting is provided for the workpiece (e.g., for illuminating the workpiece for the corresponding inspection operations, etc.). At a block 1770, one or more images are acquired of the workpiece (i.e., as illuminated by the lighting). At a block 1780, inspection operations are performed on the workpiece (e.g., as may correspond to the selected lighting optimization mode, and as may include metrology or inspection operations such as edge detection, or defect detection, or points-from-focus, etc.). In various implementations, such inspection operations may be performed as part of a corresponding process (e.g., as performed by one of the portions 144, 145 or 146 of FIG. 2, etc.).

Figure 18:
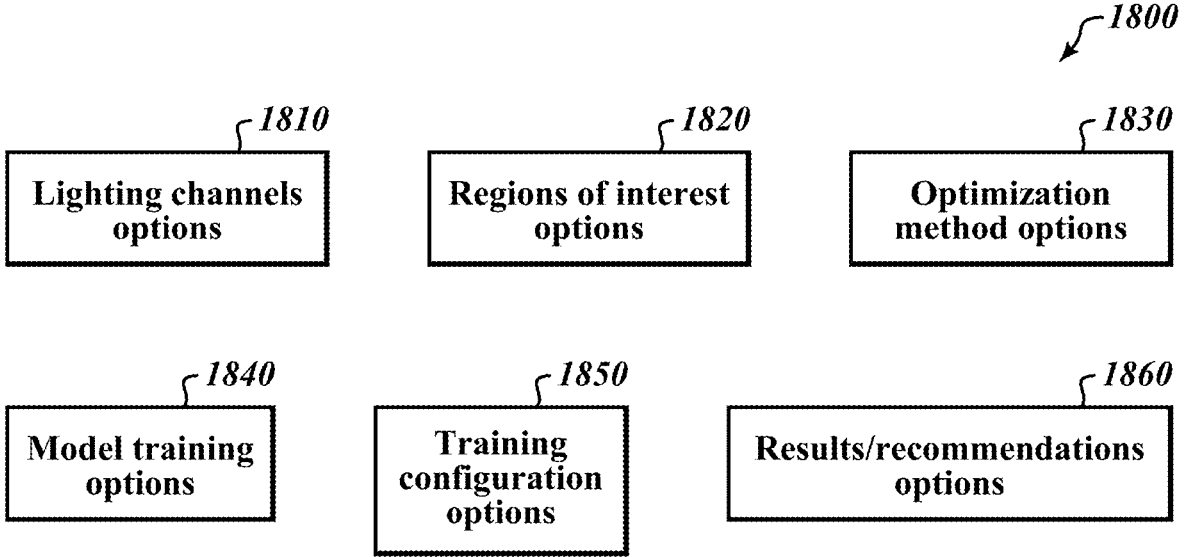
FIG. 18 is a diagram of a representation of options that may be provided in a system in relation to lighting optimization.

FIG. 18 is a diagram of a representation 1800 of certain options that may be provided in the system in relation to the lighting optimization. In various implementations, the options as described below may correspond to selection options as provided in a user interface, as otherwise provided to a user, and/or as may be automatically performed by the system, etc. As illustrated in FIG. 18, the various options include lighting channels options 1810, regions of interest options 1820, optimization method options 1830, model training options 1840, training configuration options 1850, and results/recommendations options 1860. In relation to the lighting channels options 1810, in various implementations, a user may be provided with an option of selecting/choosing certain desired lighting channels of the lighting configuration. In various implementations, a user may also have an option of leaving the lighting settings in a current state (e.g., as part of a default setting, etc.). In some such cases, all of the lighting channels will be utilized for the determination of the lighting optimization.

In relation to the regions of interest options 1820, in various implementations, options are provided (e.g., for selection by a user) corresponding to specific regions of interest on a workpiece. In various implementations, an option may also be provided (e.g., for selection by a user) of not selecting any specific region of the workpiece (e.g., not selecting any specific region in an image of the workpiece). If no specific regions are selected, the lighting may be optimized for the entire workpiece or a portion of the workpiece (e.g., that is included in the image). With regard to the optimization method options 1830, options may be provided for choosing from among more than one optimization method. For example, certain different optimization methods may utilize different algorithms, different learning, etc. for determining the optimization such as conventional optimization methods or machine learning/artificial intelligence methods.

With regard to the model training options 1840, options may be provided for choosing a pre-trained model (e.g., as stored in a database). In various implementations, options may be provided for altering (e.g., fine-tuning) an existing model (e.g., as stored in a database) for attempting to further optimize the lighting for the workpiece. In regard to the training configuration options 1850, upon selecting an option for altering (e.g., fine-tuning an existing model), an option may be provided for selecting certain parameters (e.g., such as a number of training epochs, such as corresponding to a training time, etc.). In various implementations, an option may also be provided for not altering such parameters and for leaving the current configuration as a default setting.

In relation to the results/recommendations options 1860, in various implementations, quality metrics may be provided (e.g., as displayed in the user interface, such as for review by a user). In instances where quality metrics are determined to be lower than desired (e.g., lower than a specified threshold), certain recommendations may be provided (e.g., as displayed in the user interface, such as for review by the user). For example, a request may be made for a user to select a region of interest for which the user would like to achieve a better lighting quality. As another example, a recommendation could indicate that if a pretrained model is used that a fine-tuning of the model may achieve better results. As another example, a recommendation could indicate that if the model has been fine-tuned, that a longer training or optimization of the model may improve the results.

Figure 19:
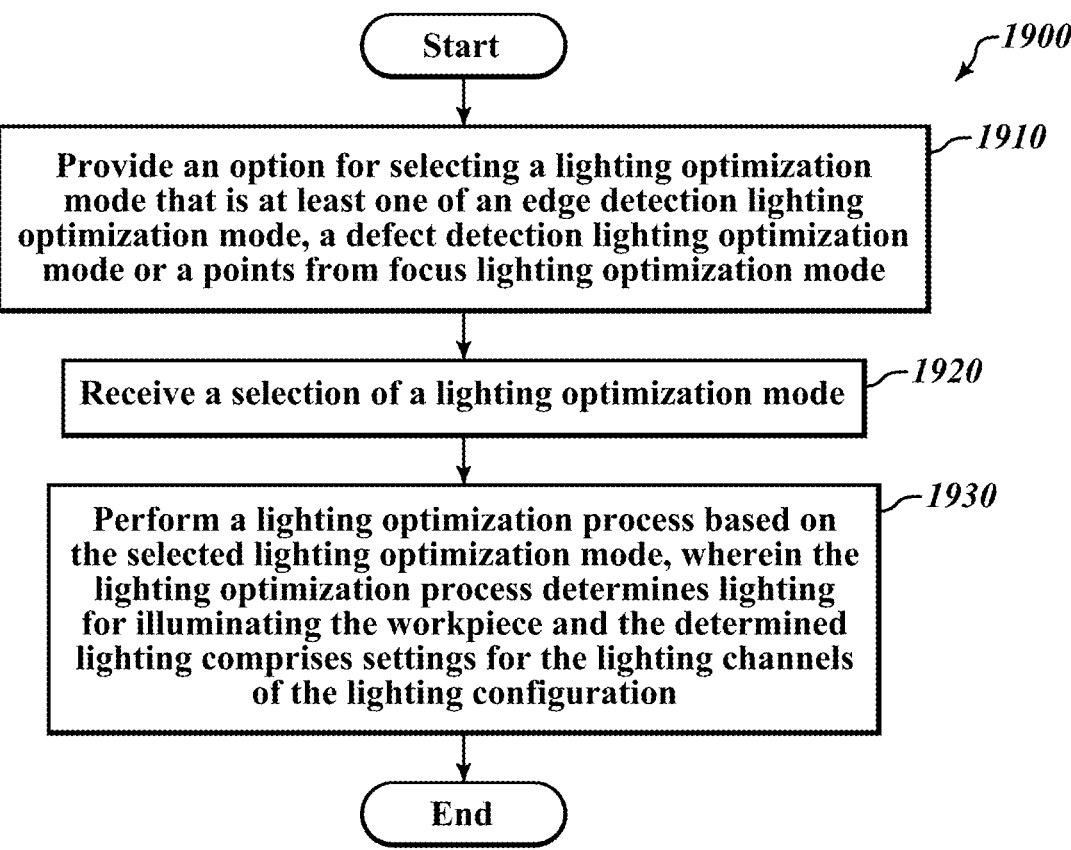
FIG. 19 is a flow diagram illustrating a routine for performing a lighting optimization process.

FIG. 19 is a flow diagram illustrating a routine 1900 for performing a lighting optimization process. At a block 1910, an option is provided for selecting a lighting optimization mode that is at least one of an edge detection lighting optimization mode, a defect detection lighting optimization mode, or a points from focus lighting optimization mode. In various implementations, there may be a most commonly used or user selected default mode that is automatically selected (e.g., unless a user or the system selects or indicates otherwise). At a block 1920, a selection is received of a lighting optimization mode. At a block 1930, a lighting optimization process is performed based on the selected lighting optimization mode, wherein the lighting optimization process determines lighting for illuminating the workpiece and the determined lighting comprises a setting for each of the lighting channels of the lighting configuration.

In relation to edge detection processes, it may generally be desirable for the lighting to be provided such that any resulting image and edge of interest will have high contrast (e.g., such as having a low-brightness value on one side, and a higher brightness value on the other side). In general, it is desirable for such a transition to occur over a minimum number of pixels (e.g., similar to a step function) which causes the gradient of the scan lines crossing the edge to have a large maximum value (e.g., such as illustrated in the data 1026 of FIG. 10). In various implementations, such conditions may be determined and/or further refined by optimization goals (e.g., as utilized in a lighting optimization process) which penalize having saturated pixels (i.e., full brightness pixels) in a region around the edge such as may result in the gradient curve having more of a gaussian type shape from having the brightness of one side of the edge unnaturally clipped at maximum brightness.

With regard to defect detection processes, in certain implementations the requirements for determining optimized lighting may be more variable than the relatively more defined requirements for edge detection processes. In some instances, optimized lighting for defect detection may at least partially be a function of the type of defects that are being detected. As an example, for flat surfaces that have raised or depressed defects (e.g., scratches, dents, bumps) the optimized lighting (e.g., best lighting) may be from the side (e.g., from a certain angle relative to the optical axis of the system, and which in some implementations may be referenced as dark field lighting). In contrast, for defects that may not have such characteristics, such as a contaminant on a surface that has minimal thickness and may be poorly illuminated with dark field lighting, such may require more bright field lighting that will enable viewing of the surface texture, brightness and/or color, etc. In some implementations, the lighting optimization process may utilize techniques for distinguishing between such types of defects and/or may receive user input regarding the types of defects.

In various implementations, as part of a lighting optimization process for being performed in relation to a defect detection process, it may be desirable to receive user input regarding information about the workpiece surface and/or defect characteristics for the defects that are to be detected. In some implementations, a defect detection process may be trained based on a user providing examples and indicating which pixels in the image of a workpiece represent a defect. For example, a user may indicate if a defect has certain characteristics (e.g., similar to a bump, or similar to a scratch or a pit) in relation to the surface of the workpiece, or alternatively if the defect is more likely to be in relation to surface texture, or other characteristics. As some other examples, the user may indicate whether a workpiece surface is highly reflective (e.g., polished metal) or less reflective (e.g., plastic, rough machined metal, etc.) and whether the workpiece has flat or curved surfaces. In various implementations, the system may be trained for determining optimized lighting for defect detection by having a workpiece placed in the field of view with the example defect indicated and/or with the pixels corresponding to the defect indicated. In such implementations, the defect detection process may include varying the settings of the lighting channels to determine which settings produce the best contrast and visibility for the specified defects.

In various implementations, indications of which pixels correspond to a defect may be provided in various ways (e.g., utilizing an automatic segmenting tool, painting the defect pixels, placing a bounding box around the defect, drawing an outline around the defect, etc.). In some implementations, a defect detection process may provide feedback to the lighting optimization process. In certain implementations, such feedback may include the defect detection process being run with the lighting as proposed by the lighting optimization process, and for which feedback may be provided that indicates the current ability of the defect detection process to accurately detect the defects with the proposed lighting.

In various implementations, a user may be able to select a lighting optimization mode, for which a lighting optimization process is performed based on the selected lighting optimization mode. Once the lighting optimization mode is selected, a lighting optimization process may automatically determine optimized lighting for a workpiece in the field of view. In various implementations, the lighting optimization process may proceed from a random or preset configuration, or from a pretrained model. In some implementations, a pretrained model may be automatically suggested by the system based on some amount of similarity of the workpiece to an existing workpiece as stored in a database, or in accordance with a selection by the user. In various implementations, the lighting optimization process may automatically determine and/or suggest regions of interest for lighting optimization (e.g., for which the lighting optimization process may be configured to automatically find edges and/or to automatically find surfaces, etc.). In such implementations, the system may be configured to enable the user to select automatically determined elements (e.g., edges, surfaces, etc.) of interest, or for which a user could accept all of the determined elements. In various implementations, a user may be able to accept one or more of the elements and then potentially augment the determined elements by manually inputting additional elements or regions that are of interest.

In various implementations, the system may be configured to enable the user to input workpiece regions (e.g., edges, surfaces, etc.) for which the lighting optimization process may be applied. In some implementations, the lighting optimization process may in at least some instances attempt to determine optimized lighting for the full image or a full portion containing the workpiece, in regard to the selected lighting optimization mode. In various implementations, the system may be configured to learn to recognize a workpiece (e.g., based on imaging, and/or other sensing, such as 3-D sensing, etc.) and automatically load the optimized lighting model/settings for the corresponding workpiece that is saved in the database, such as whenever a workpiece is placed within the field of view of the system (e.g., beneath the camera 260, etc.).

In various implementations, the lighting optimization process may be configured to detect the relative rotational orientation of the workpiece and to automatically rotate/ adjust the optimized lighting model/settings based upon knowledge of the arrangement of the lighting channels in the lighting configuration. In various implementations, the lighting optimization process and/or the system may be configured to automatically determine when a workpiece position, orientation, or geometry may have some change relative to when the original lighting optimization process was performed for the workpiece as saved in the database, and then suggest that the optimized lighting model be automatically adjusted, or reoptimized, etc. In various implementations, transfer learning may be utilized on an optimized lighting model to rapidly adjust the lighting to smaller changes in the workpiece location, orientation or geometry for a new identical or similar workpieces. In various implementations, the lighting optimization process and/or system may show to a user optimized lighting as applied to the workpiece and with an indicated optimization score, and for which the user may further be enabled to manually adjust the lighting settings, while updated optimization scores are provided during the adjustments and displayed to the user.

In various implementations, the system may be configured to perform a lighting optimization process for each of multiple lighting optimization modes as selected by a user and/or for multiple regions as selected for the lighting optimization process, in each case with sequential imaging of the workpiece as illuminated by the lighting that is determined. In various implementations, each image that is acquired for a different lighting optimization mode may be automatically sent to the proper post-processing portion (e.g., an image with optimized lighting for edge detection may be provided to an edge detection process, an image acquired with optimized lighting for defect detection may be provided to a defect detection process, and/or an image acquired with lighting optimized for points-from-focus may be provided to a points-from-focus process. In various implementations, the system may be configured to enable a user to control the independent lighting variables utilized for the lighting optimization process. For example, a user may specify or select certain groups of lighting channels, or may limit color adjustments to only include selected RGB lighting options, etc.

In various implementations, where a user selects a defect detection lighting optimization mode, the user may provide at least one example of a workpiece with a defect. The user may indicate the region of the defect (e.g., utilizing a bounding box, a pixel painting, indicating a boundary of a defect, utilizing a tool that attempts to automatically segment the defect region after a user selects a point inside the defect region, etc.). In this manner, the lighting optimization process may receive indications of which pixels in the image constitute the defect, and so the lighting optimization process may optimize the lighting to maximize the contrast of the region that includes the defect, on the specific workpiece surface (e.g., for both a current workpiece and future similar workpieces). In various implementations, the user may provide at least some information about the characteristics of the defects that are to be detected and/or about the characteristics of the workpiece surface.

In various implementations, the lighting optimization process may be configured to create surface lighting with either maximized texture or dark field lighting of the surface (s) of interest, depending on user supplied information regarding the characteristics of the defects that are to be detected. In various implementations, the lighting optimization process may be configured to communicate with a defect detection process that the optimized lighting is being determined for, for which the defect detection process may be configured to provide feedback regarding proposed lighting. For example, the defect detection process may receive a workpiece image with the proposed lighting, and may utilize the proposed lighting image for attempting to detect defects, and may provide feedback (e.g., data) indicating the accuracy with which the defect detection process was able to find defects (e.g., as corresponding to a known defect region, etc.).

In various implementations, a set of images may be acquired to be utilized by the lighting optimization process, for which each lighting channel, group of lighting channels, etc. that is to be utilized as part of the lighting optimization process is on in at least one of the images. In various implementations, a system may include a light source configuration in which one or more lighting channels may be physically moved (e.g., such as in regard to a height or directionality of the lighting channels) as electronically controlled and for which the lighting optimization process is configured to determine the settings for the lighting channels which may include determining the height and/or directionality of the lighting channels. In various implementations, the lighting optimization process may be configured to utilize negative RGB weights including the subtraction of one image from another.

In various implementations, when the edge detection lighting optimization mode is selected, the lighting optimization process may be configured to determine lighting that results in a high contrast step edge transition (e.g., to support accurate and repeatable determinations of an edge position, such as for determining measurements in relation to the edge position, such as a distance between edges, etc.). In various implementations, when the points-from-focus lighting optimization mode is selected, the lighting optimization process may be configured to determine lighting that results in high texture on all surfaces of interest, while minimizing saturation.

The following describes various exemplary embodiments of the present disclosure with various features and elements annotated with reference characters (i.e., reference numerals and reference letters) found in figures described herein. It should be understood that the reference characters are added to indicate exemplary embodiments, and the features and elements are not limited to the particular embodiments illustrated in the figures.

In accordance with one aspect, a system 100 is provided including a lens 250, a camera 260, a lighting configuration LC, one or more processors 125, and a memory 140. The lens 250 (e.g., an objective lens) is configured to input image light 255 arising from a workpiece 20, wherein the lens 250 is configured to transmit the image light 255 along an imaging optical path OPATH and has an optical axis OA. The camera 260 is configured to receive image light 255 transmitted along the imaging optical path OPATH and to provide images of the workpiece 20. The lighting configuration LC comprises lighting channels LCH (e.g., in some implementations including at least five lighting channels, or at least ten lighting channels, or at least twenty lighting channels, etc.) configured to illuminate the workpiece 20 for producing the image light 255.

The memory 140 is coupled to the one or more processors 125 and stores program instructions that when executed by the one or more processors 125 cause the one or more processors 125 to at least: provide representations of groups of lighting channels in a display area; determine that a group of lighting channels has been selected, wherein the selected group of lighting channels comprises a plurality of lighting channels; and display current lighting settings for the selected group of lighting channels, wherein adjustments to the lighting settings for a group of lighting channels apply to all of the lighting channels in the group.

As examples of such features, in the illustrations of FIGS. 3A-3C, the display area 320 includes a "group list", and the column 320A includes label indicators for a currently displayed set of groups, for which each label indicator (e.g., "group 1", "group 2", etc.) is a representation of a corresponding group of lighting channels. As another example, the Light Source Display in the display area 360 may also include representations of one or more groups of lighting channels. For a selection of a group of lighting channels, in various implementations a user may click on or otherwise select a displayed representation of a group of lighting channels (e.g., a user may have clicked on or otherwise selected the "group 3" representation in the display area 320), for which the system determines that the corresponding group of lighting channels has been selected. The settings for the selected group of lighting channels may then be displayed (e.g., the system displays the settings for the selected "group 3" in the Main Settings of the display area 350, both in the column 351D which indicates the corresponding values of the settings for the different light colors, and in the positions of the sliders in the selection areas 351A, 351B and 351C, and for which similar settings may be displayed in the display area 370, as described above). The sliders in the selection areas 351A, 351B and 351C may be characterized as adjustment elements, which are provided by the system and which enable the lighting settings of a selected group to be adjusted, and for which adjustments to the settings for a group of lighting channels apply to all of the lighting channels in the group.

In various implementations, the program instructions when executed by the one or more processors may further cause the one or more processors to perform steps such as those described below (and/or for which such steps may otherwise be performed). In various implementations, the steps described above and/or below (e.g., as characterized as being performed by the one or more processors or otherwise) may also or alternatively be performed as part of method and/or the system may be configured to perform the steps.

In various implementations, adjustment elements (e.g., the sliders in the selection areas 351A, 351B and 351C) may be provided which are configured to enable the lighting settings of a selected group to be adjusted. In various implementations, a visual representation (e.g., as provided in the display area 360) may be displayed of the lighting configuration including the lighting channels of the lighting configuration. The lighting channels of a currently selected group may be indicated as having been selected in the visual representation of the lighting configuration (e.g., in accordance with the selection indicators SI for the lighting channels LCH). A selection of an individual lighting channel in the visual representation of the lighting configuration may be enabled and an adding of the selected lighting channel to a currently selected group of lighting channels or a deleting of the selected lighting channel from the currently selected group of lighting channels may be enabled (e.g., a selected lighting channel LCH in the display area 360 may be added to a currently selected group or may be deleted from a currently selected group).

In various implementations, representations may be provided of lighting layouts (e.g., the display area 310 includes a "layout list", and the column 321A includes label indicators for a currently displayed set of lighting layouts, for which each label indicator (e.g., "layout 1", "layout 2", etc.) is a representation of a corresponding lighting layout), wherein at least some of the lighting layouts each comprise a plurality of groups of lighting channels (e.g., the currently selected "layout 1" is indicated to include 12 groups of lighting channels). In various implementations, a determination may be made that a lighting layout has been selected (e.g., in various implementations a user may click on or otherwise select a displayed representation of a lighting layout, such as a user clicking on or otherwise selecting the "layout 1" representation in the display area 310, for which the system determines that the corresponding lighting layout has been selected); and representations of groups of lighting channels that are included in the selected lighting layout may be displayed (e.g., representations of groups of lighting channels that are included in the selected "layout 1" are displayed in the column 320A of the display area 320). A selected group of lighting channels of a lighting layout may be enabled to be deleted from the lighting layout (e.g., the selection area 328 provides an option for deleting a selected group). In various implementations, one or more parameters may be displayed of a selected lighting layout (e.g., in the display area 330), and adjustments may be enabled of the one or more parameters of the selected layout (e.g., for which one such parameter may be a number of segments, and the selection area 331 in the column 330A indicates that the current number of segments is set to 5 segments, and includes up and down arrows which may be utilized for increasing or decreasing, in this case for increasing or decreasing the number of segments).

In various implementations, saving lighting settings for a lighting layout may be enabled, and recalling the saved lighting settings for the lighting layout may be enabled. In various implementations, the lighting layout and the lighting settings may be saved in different files. As one specific example, for a layout stored in a file named "RingLight", the lighting settings may be stored in files named "RingLight_scheme001", "RingLight_scheme002", etc. In various implementations, each of the files (e.g., named "RingLight_scheme001", "RingLight_scheme002", etc.) may include a set of lighting settings that is for the corresponding layout. From this example, it will be understood that there may be a plurality of sets of lighting settings for a lighting layout, and that in some implementations each set of lighting settings may be stored in a different file.

In various implementations, an adjustment element is provided that enables a representation of a group of lighting channels to be at least one of rotated, expanded, contracted or directed (e.g., the "expand," "rotate," or "direct" control of the respective selection area 362, 363 or 364). The adjustment may correspond to maintaining a same shape of the group of lighting channels but with at least some different lighting channels included in the shape as the shape is rotated, expanded, contracted or directed.

In various implementations, the lighting settings are configured to enable adjustments including for one or more positive or negative color lighting settings (e.g., in the examples illustrated in the display areas 350 and 370, the red light setting is indicated to have a negative weight as corresponding to the −0.50 value). In various implementations, the implementation of the one or more negative color lighting settings comprises acquiring two images, including a first image with the one or more positive color lighting settings (e.g., with the 0.30 green light setting and the 0.15 blue light setting) and a second image with absolute values for the one or more negative color lighting settings (e.g., with the absolute value, or 0.50 value, of the red light setting), and subtracting the second image from the first image. In various implementations, an image may be displayed corresponding to the pixel values resulting from the subtraction of the second image from the first image, wherein pixels in the displayed image that correspond to a negative value are displayed with a representation that indicates a correspondence to the negative value (e.g., In the example of FIG. 6, four negative weight indicator areas NWIA are displayed, as each corresponding to an area in which at least one component of the displayed color is negative).

In various implementations, an image is displayed of the workpiece as acquired by the camera with current lighting settings, wherein the image is displayed in a workpiece display area (e.g., in the display area 380). A representation (e.g., the edge detection tool EDT or the defect detection tool DDT) may be provided in the workpiece display area corresponding to at least one of edge detection operations or defect detection operations on a corresponding area of the workpiece.

In accordance with another aspect, a method is provided for operating the system. The method includes: providing representations of groups of lighting channels in a display area; determining that a group of lighting channels has been selected, wherein the selected group of lighting channels comprises a plurality of lighting channels; and displaying current lighting settings for the selected group of lighting channels, wherein adjustments to the lighting settings for a group of lighting channels apply to all of the lighting channels in the group.

In accordance with another aspect, the system is configured to: provide representations of groups of lighting channels in a display area; determine that a group of lighting channels has been selected, wherein the selected group of lighting channels comprises a plurality of lighting channels; and display current lighting settings for the selected group of lighting channels, wherein adjustments to the lighting settings for a group of lighting channels apply to all of the lighting channels in the group.

In accordance with another aspect, the system 100 is provided including the lens 250, the camera 260, the lighting configuration LC, the one or more processors 125, and the memory 140. The memory 140 is coupled to the one or more processors 125 and stores program instructions that when executed by the one or more processors 125 cause the one or more processors 125 to at least: provide an option for selecting a lighting optimization mode that that is at least one of an edge detection lighting optimization mode, a defect detection lighting optimization mode or a points from focus lighting optimization mode; receive a selection of a lighting optimization mode; and perform a lighting optimization process based on the selected lighting optimization mode, wherein the lighting optimization process determines lighting for illuminating the workpiece and the determined lighting comprises settings for the lighting channels of the lighting configuration. In various implementations, the option may be for selecting the lighting optimization mode from a set of lighting optimization modes (e.g., with the set including at least two of the edge detection lighting optimization mode, the defect detection lighting optimization mode and/or the points from focus lighting optimization mode, and wherein the different modes correspond to different lighting determinations). In various implementations, the option for selecting the lighting optimization mode may be provided in a user interface (e.g., in the display area 390 of FIG. 3C).

In various implementations, the edge detection lighting optimization mode is for optimizing the lighting for detecting one or more edges on the surface of the workpiece (e.g., including determining lighting configured to create a high contrast step edge transition to support accurate and repeatable determinations of edge positions, and for which contrast curve analysis may be utilized to determine edge positions, and for which distances between edges may be determined). In various implementations, the defect detection lighting optimization mode is for optimizing the lighting for detecting one or more defects on the surface of the workpiece (e.g., including determining lighting configured to create either surface lighting with either maximized texture or darkfield lighting of the surface(s) of interest, depending upon the characteristics of the defects that are to be detected, etc.) In various implementations, the points from focus lighting optimization mode is for optimizing the lighting for determining three dimensional profile data for the surface of the workpiece (e.g., including determining lighting configured to create balanced lighting on the different areas/surfaces of the workpiece, and for which at least one image stack may be acquired as comprising a plurality of images of the workpiece wherein each image of the image stack corresponds to a different focus position along the optical axis).

In various implementations, the program instructions when executed by the one or more processors may further cause the one or more processors to perform steps such as those described below (and/or for which such steps may otherwise be performed). In various implementations, the steps described above and/or below (e.g., as characterized as being performed by the one or more processors or otherwise) may also or alternatively be performed as part of method and/or the system may be configured to perform the steps.

In various implementations, one or more elements or regions may be determined on the workpiece for the lighting optimization. In various implementations, lighting variables may be determined for being utilized in the lighting optimization process. In various implementations, a result of the lighting optimization process may be displayed as including one or more determined candidates for the lighting for illuminating the workpiece.

In various implementations, a determination may be made that additional lighting optimization is to be performed for the same workpiece and the same lighting optimization mode but for a different one or more elements or regions on the workpiece, and for which the lighting optimization process is correspondingly performed for the different one or more elements or regions on the workpiece. In various implementations, a determination may be made that additional lighting optimization is to be performed for the same workpiece and a different lighting optimization mode, and for which the lighting optimization process may correspondingly be performed based on the different lighting optimization mode.

In various implementations, a lighting optimization model may be saved for the workpiece for which the lighting optimization model comprises the settings (e.g., a set of settings) for the lighting channels of the lighting configuration as corresponding to the determined lighting. In various implementations: a second workpiece (e.g., as placed in the field of view of the system) may be compared to the workpiece and determine similarities of the second workpiece; a determination may be made (e.g., based on the similarities of the second workpiece) that a saved lighting optimization model will be utilized for the lighting for the second workpiece; and the saved lighting optimization model may be recalled to provide the lighting for the second workpiece. In various implementations: a location and orientation may be determined of the second workpiece; a determination may be made (e.g., based on the location and/or orientation of the second workpiece) that adjustments are needed to the lighting in relation to the location and orientation of the second workpiece; and corresponding adjustments may be provided to the lighting based on the location and orientation of the second workpiece.

In various implementations, lighting may be provided for the second workpiece and one or more images of the second workpiece may be acquired as illuminated by the lighting. In various implementations, one or more inspection operations may be performed on the second workpiece, for which the one or more inspection operations correspond to the lighting optimization mode that was selected for the lighting optimization process. In various implementations (e.g., in which the edge detection lighting optimization mode is selected), the one or more inspection operations may comprise edge detection which is utilized to determine the locations of one or more edges on the second workpiece (e.g., and for which the one or more inspection operations may further comprise determining a distance between two edges on the second workpiece). In various implementations (e.g., in which the defect detection lighting optimization mode is selected), the one or more inspection operations comprise defect detection which is utilized to detect a defect on the second workpiece. In various implementations (e.g., in which the points from focus lighting optimization mode is selected), the one or more inspection operations comprise points from focus which is utilized to determine three dimensional profile data for the second workpiece.

In various implementations, a user is enabled to control independent lighting variables that are utilized as part of the lighting optimization process. For example, the user may be enabled to determine groups of lighting channels for which each group will be controlled/adjusted as a single entity, to determine ranges within which color adjustments may be made, to limit color adjustments to only be performed for select RGB colors, etc.

In various implementations, when the defect detection lighting optimization mode is selected, information may be received from a user regarding a workpiece with a defect where the user indicates a region of the defect, and for which the lighting optimization process utilizes the information to provide lighting that maximizes the contrast of the region. For example, the user may provide at least one example of a workpiece with a defect where the user indicates the region of the defect (e.g., such as by a bounding box, pixel painting, indicating the defect boundary, or using a tool that attempts to automatically segment the defect region if the user clicks inside the defect region, etc.) so that the lighting optimization process can know which pixels in the image constitute the defect and can optimize the lighting to maximize the contrast of this region on the specific workpiece surface for this workpiece and future similar workpieces.

In various implementations, when the defect detection lighting optimization mode is selected, information may be received from a user regarding characteristics of at least one of a defect or a surface of the workpiece, and for which the characteristics are utilized by the lighting optimization process. In various implementations, the characteristics are utilized to determine whether the optimized lighting will correspond to surface lighting with maximized texture or darkfield lighting of at least one surface of interest. In various implementations, the lighting optimization may be a function of the type of defect that is to be detected. For example, for flat surfaces that have raised or depressed defects (e.g., scratches, dents, bumps, etc.) the optimized lighting may correspond to darkfield lighting (e.g., corresponding to lighting from the side, such as at an angle between 45 degrees and 90 degrees from the optical axis OA). In contrast, a defect that does not have such characteristics (e.g., a contaminant or other defect on the surface that has minimal thickness) may be poorly illuminated with darkfield lighting and may require surface lighting with maximized texture (e.g., brightfield lighting that enables viewing of the surface texture, brightness, or color, for which such brightfield lighting may be at an angle between 0 degree and 45 degrees from the optical axis OA). In various implementations, the lighting optimization process is configured to be in communication with a defect detection process that evaluates proposed lighting and provides feedback on the accuracy with which the defect detection process is able to detect a known defect region as illuminated by the proposed lighting.

In various implementations, a set of images may be collected to be utilized for the lighting optimization process, and for which each lighting channel to be optimized is on in at least one of the images. In various implementations, one or more of the lighting channels of the lighting configuration may be movable lighting channels, and for which each movable lighting channel is configured to be controllable to move in relation to the other lighting channels of the lighting configuration for adjusting at least one of a position or direction of the lighting provided by the movable lighting channel, and for which the lighting optimization process includes optimizing at least one of the position or direction of the movable lighting channel. In various implementations, the lighting optimization process is configured to utilize negative color lighting channels through a process that includes subtracting one image from another.

In accordance with another aspect, a method is provided for operating the system for performing a lighting optimization process. The method includes: providing an option for selecting a lighting optimization mode that is at least one of an edge detection lighting optimization mode, a defect detection lighting optimization mode or a points from focus lighting optimization mode; receiving a selection of the lighting optimization mode; and performing a lighting optimization process based on the selected lighting optimization mode, wherein the lighting optimization process determines lighting for illuminating the workpiece and the determined lighting comprises settings for the lighting channels of the lighting configuration.

In accordance with another aspect, the system is configured to: provide an option for selecting a lighting optimization mode that is at least one of an edge detection lighting optimization mode, a defect detection lighting optimization mode or a points from focus lighting optimization mode; receive a selection of the lighting optimization mode; and perform a lighting optimization process based on the selected lighting optimization mode, wherein the lighting optimization process determines lighting for illuminating the workpiece and the determined lighting comprises settings for the lighting channels of the lighting configuration.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system, comprising:
a lens configured to input image light arising from a workpiece, wherein the lens is configured to transmit the image light along an imaging optical path and has an optical axis;
a camera configured to receive image light transmitted along the imaging optical path and to provide images of the workpiece;
a lighting configuration comprising at least ten lighting channels configured to illuminate the workpiece for producing the image light;
one or more processors; and
a memory coupled to the one or more processors and storing program instructions that when executed by the one or more processors cause the one or more processors to at least:
provide representations of groups of lighting channels which may be selected by a user in a user interface;
determine that a group of lighting channels has been selected from the groups of lighting channels in accordance with a corresponding representation of the group of lighting channels having been selected, wherein the selected group of lighting channels comprises a plurality of lighting channels;
provide adjustment elements in the user interface which are configured to enable current lighting settings for the selected group of lighting channels to be adjusted by a user; and
display the current lighting settings in the user interface for the selected group of lighting channels, wherein adjustments to the lighting settings for the selected group of lighting channels apply to all of the lighting channels in the selected group of lighting channels.

2. The system of claim 1, wherein the program instructions when executed by the one or more processors further cause the one or more processors to display a visual representation of the lighting configuration including the lighting channels of the lighting configuration.

3. The system of claim 2, wherein the lighting channels of a currently selected group are indicated as having been selected in the visual representation of the lighting configuration.

4. The system of claim 2, wherein the program instructions when executed by the one or more processors further cause the one or more processors to enable a selection of an individual lighting channel in the visual representation of the lighting configuration and enabling an adding of the selected lighting channel to a currently selected group of lighting channels or a deleting of the selected lighting channel from the currently selected group of lighting channels.

5. The system of claim 1, wherein the program instructions when executed by the one or more processors further cause the one or more processors to provide representations of lighting layouts which may be selected by a user in the user interface, wherein at least some of the lighting layouts each comprise a plurality of groups of lighting channels.

6. The system of claim 5, wherein the program instructions when executed by the one or more processors further cause the one or more processors to:
determine that a lighting layout has been selected from the lighting layouts in accordance with a corresponding representation of the lighting layout having been selected, wherein the representations of groups of lighting channels that are provided in the user interface are representations of groups of lighting channels that are included in the selected lighting layout.

7. The system of claim 6, wherein the program instructions when executed by the one or more processors further cause the one or more processors to enable a selected group of lighting channels of a lighting layout to be deleted from the lighting layout.

8. The system of claim 5, wherein the program instructions when executed by the one or more processors further cause the one or more processors to:
display one or more parameters of a selected lighting layout; and
enable adjustments of the one or more parameters of the selected layout.

9. The system of claim 5, wherein the program instructions when executed by the one or more processors further cause the one or more processors to enable saving lighting settings for a lighting layout and recalling the saved lighting settings for the lighting layout.

10. The system of claim 9, wherein the lighting layout and the lighting settings are saved in different files.

11. The system of claim 1, wherein the program instructions when executed by the one or more processors further cause the one or more processors to provide an adjustment element that enables a representation of a group of lighting channels to be at least one of rotated, expanded, contracted or directed.

12. The system of claim 11, wherein the adjustment corresponds to maintaining a same shape of the group of lighting channels but with at least some different lighting channels included in the shape as the shape is at least one of rotated, expanded, contracted or directed.

13. The system of claim 1, wherein the lighting settings are configured to enable adjustments including for one or more positive or negative color lighting settings.

14. The system of claim 13, wherein the implementation of the one or more negative color lighting settings comprises acquiring two images, including a first image with the one or more positive color lighting settings and a second image with absolute values for the one or more negative color lighting settings, and subtracting the second image from the first image.

15. The system of claim 14, wherein the program instructions when executed by the one or more processors further cause the one or more processors to display an image corresponding to the pixel values resulting from the subtraction of the second image from the first image, wherein pixels in the displayed image that correspond to a negative value are displayed with a representation that indicates a correspondence to the negative value.

16. The system of claim 1, wherein the program instructions when executed by the one or more processors further cause the one or more processors to display an image of the workpiece as acquired by the camera with current lighting settings, wherein the image is displayed in a workpiece display area of the user interface.

17. The system of claim 16, wherein the program instructions when executed by the one or more processors further cause the one or more processors to provide a representation in the workpiece display area corresponding to at least one of edge detection operations or defect detection operations on a corresponding area of the workpiece.

18. A method for operating a system,
wherein the system comprises:
  a lens configured to input image light arising from a workpiece, wherein the lens is configured to transmit the image light along an imaging optical path and has an optical axis;
  a camera configured to receive image light transmitted along the imaging optical path and to provide images of the workpiece;
  a lighting configuration comprising at least ten lighting channels configured to illuminate the workpiece for producing the image light;
the method comprising:
  providing representations of groups of lighting channels which may be selected by a user in a user interface;
  determining that a group of lighting channels has been selected from the groups of lighting channels in accordance with a corresponding representation of the group of lighting channels having been selected, wherein the selected group of lighting channels comprises a plurality of lighting channels;
  providing adjustment elements in the user interface which are configured to enable current lighting settings for the selected group of lighting channels to be adjusted by a user; and
  displaying the current lighting settings in the user interface for the selected group of lighting channels, wherein adjustments to the lighting settings for the selected group of lighting channels apply to all of the lighting channels in the selected group of lighting channels.

19. A system, comprising:
a lens configured to input image light arising from a workpiece, wherein the lens is configured to transmit the image light along an imaging optical path and has an optical axis;
a camera configured to receive image light transmitted along the imaging optical path and to provide images of the workpiece;
a lighting configuration comprising at least ten lighting channels configured to illuminate the workpiece for producing the image light;
wherein the system is configured to:
  provide representations of groups of lighting channels which may be selected by a user in a user interface;
  determine that a group of lighting channels has been selected from the groups of lighting channels in accordance with a corresponding representation of the group of lighting channels having been selected, wherein the selected group of lighting channels comprises a plurality of lighting channels;
  provide adjustment elements in the user interface which are configured to enable current lighting settings for the selected group of lighting channels to be adjusted by a user; and
  display the current lighting settings in the user interface for the selected group of lighting channels, wherein adjustments to the lighting settings for the selected group of lighting channels apply to all of the lighting channels in the selected group of lighting channels.

20. The method of claim 18, wherein the method further comprises:
providing representations of lighting layouts which may be selected by a user in the user interface, wherein at least some of the lighting layouts each comprise a plurality of groups of lighting channels; and
determining that a lighting layout has been selected from the lighting layouts in accordance with a corresponding representation of the lighting layout having been selected, wherein the representations of groups of lighting channels that are provided in the user interface are representations of groups of lighting channels that are included in the selected lighting layout.

* * * * *